US011016603B2

(12) United States Patent
Kong et al.

(10) Patent No.: US 11,016,603 B2
(45) Date of Patent: May 25, 2021

(54) ELECTRONIC DEVICE AND OPERATION METHOD THEREFOR

(71) Applicant: Samsung Electronics Co., Ltd., Suwon-si (KR)

(72) Inventors: Kyucheol Kong, Gumi-si (KR); Hyesoon Jeong, Chilgok-gun (KR); Dae-Sik Hwang, Daegu (KR); Songgeun Kim, Gumi-si (KR); Jeong-Jin Lee, Seoul (KR); Hoondo Heo, Suwon-si (KR); Hyun-Suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/322,021

(22) PCT Filed: Jun. 26, 2017

(86) PCT No.: PCT/KR2017/006696
§ 371 (c)(1),
(2) Date: Jan. 30, 2019

(87) PCT Pub. No.: WO2018/026102
PCT Pub. Date: Feb. 8, 2018

(65) Prior Publication Data
US 2019/0179487 A1 Jun. 13, 2019

(30) Foreign Application Priority Data
Aug. 1, 2016 (KR) .......................... 10-2016-0098226

(51) Int. Cl.
*G06F 3/041* (2006.01)
*G06F 3/0488* (2013.01)

(52) U.S. Cl.
CPC .......... *G06F 3/0418* (2013.01); *G06F 3/0416* (2013.01); *G06F 3/0488* (2013.01); *G06F 3/04886* (2013.01)

(58) Field of Classification Search
CPC .... G06F 3/0418; G06F 3/0488; G06F 3/0416; G06F 3/04886
See application file for complete search history.

(56) References Cited

U.S. PATENT DOCUMENTS

2012/0075212 A1* 3/2012 Park ...................... G06F 3/0488
345/173
2013/0222286 A1 8/2013 Kang et al.
(Continued)

FOREIGN PATENT DOCUMENTS

| EP | 2 434 385 A2 | 3/2012 |
| EP | 2 804 088 A2 | 11/2014 |

(Continued)

OTHER PUBLICATIONS

European Search Report dated Jul. 18, 2019, issued in European Patent Application No. 17837154.8.
(Continued)

*Primary Examiner* — Brent D Castiaux
(74) *Attorney, Agent, or Firm* — Jefferson IP Law, LLP

(57) ABSTRACT

Various embodiments of the present invention provide a method and apparatus for preventing a user's unintentional touch input in an electronic device. According to various embodiments of the present invention, an electronic device may comprise: a display for displaying a user interface; a memory; and a processor functionally connected to the display and the memory, wherein the processor is configured to set a touch blocking area in the edge area of the display, determine an exception area in the touch blocking area on the basis of the user interface, remove the determined exception area from the touch blocking area, so as to set a (Continued)

final touch blocking area, and process a touch event on the edge area on the basis of the final touch blocking area. Various embodiments are possible.

21 Claims, 37 Drawing Sheets

(56) References Cited

U.S. PATENT DOCUMENTS

| | | | |
|---|---|---|---|
| 2014/0289668 A1* | 9/2014 | Mavrody | G06F 1/1643 |
| | | | 715/781 |
| 2014/0327630 A1 | 11/2014 | Burr et al. | |
| 2015/0253891 A1 | 9/2015 | Westerman | |
| 2016/0070338 A1* | 3/2016 | Kim | G06F 3/0488 |
| | | | 345/173 |
| 2016/0110018 A1 | 4/2016 | Park | |
| 2016/0216793 A1 | 7/2016 | Choi et al. | |
| 2016/0283026 A1* | 9/2016 | Koike | G06F 3/04886 |
| 2017/0185212 A1 | 6/2017 | Jeong et al. | |

FOREIGN PATENT DOCUMENTS

| | | |
|---|---|---|
| JP | 5731466 B2 | 6/2015 |
| KR | 10-2011-0127555 A | 11/2011 |
| KR | 10-1403025 B1 | 6/2014 |
| KR | 10-2014-0092016 A | 7/2014 |
| KR | 10-2014-0138224 A | 12/2014 |
| KR | 10-2017-0076359 A | 7/2017 |
| WO | 2015/046756 A1 | 4/2015 |
| WO | 2016/004003 A1 | 1/2016 |

OTHER PUBLICATIONS

European Office Action dated Aug. 19, 2020, issued in European Patent Application No. 17 837 154.8.

* cited by examiner

ELECTRONIC DEVICE AND OPERATION METHOD THEREFOR

TECHNICAL FIELD

Various embodiments of the present disclosure relate to a method and an apparatus for processing a touch event to prevent an unintended touch input from a user in an electronic device.

BACKGROUND ART

With the recent enhancement of digital technology, various types of electronic devices such as mobile communication terminals, smart phones, tablet personal computers (PCs), electronic schedulers, personal digital assistants (PDAs), wearable devices, or the like are widely used.

In recent years, an electronic device having a flexible display and a curved display (or a bended display) which is implemented by combining the flexible display and the electronic device is developing and is being used. The flexible display may refer to a display that can be freely bent and unbent, and the curved display may refer to a display that maintains a bent state of the display in consideration of a design of an electronic device. An electronic device provided with a curved display can extend a display region to left and right side surfaces as well as a front surface of the electronic device. For example, when a curved display is applied to an electronic device, left and right edge portions of the display are made to be bent and make a screen be seen bigger. According to an embodiment, a display panel may be provided with a changed resolution such as 16:10, 16:11, rather than with a standard resolution (for example, 16:9). In addition, an electronic device which has a bezel region minimized, and accordingly, can extend a display, is developing and is being used to provide a wider screen in the electronic device.

For example, an electronic device implemented to have a curved display, a flexible display, or a narrow bezel can realize a wide screen. However, user's unintended touch inputs may frequently occur on an edge or a bent portion of a display of such an electronic device. According to an embodiment, when a user grips an electronic device with one hand, a touch error may occur due to an unintended touch input.

DISCLOSURE OF INVENTION

Technical Problem

To solve a touch error caused by an unintended touch input, an electronic device may process the inputted touch event by disregarding based on a touch area or a touch time.

However, since a related-art method processes (for example, disregards) a touch event based on a simple condition such as a touch area or a touch time, malfunction may occur when a touch sensor does not provide exact information. For example, when a user grips an electronic device with one hand and then scrolls using user's thumb, the inside of user's palm may touch a screen. Accordingly, the related-art method disregards the corresponding touch event based on an area condition, but, when a small area of the palm touches a sensor portion, the touch event may be recognized as a touch, and thus malfunction may occur. To solve this problem, the related-art method may consider a method of forcedly processing a part of both ends of the display not to respond to a touch. However, this method may cause a problem that a user's intended touch input cannot be processed on both ends of the display.

Various embodiments provide a method and an apparatus for preventing a user's unintended touch input in an electronic device.

Various embodiments provide a method and an apparatus for exactly filtering a user's intended touch event (for example, a meaningful user input) in an electronic device, which includes a touch screen with a narrow bezel region or includes a curved display.

Various embodiments provide a method and an apparatus for preventing malfunction of an electronic device caused by an unintended touch input by filtering a user's intended touch event.

Various embodiments provide a method and an apparatus which can set a touch blocking region (or a touch unprocessing region) in at least some region of a touch input-enabled region of an electronic device to prevent a user's unintended touch input, and can adaptively change the touch blocking region according to a user interface of an application.

Various embodiments provide a method and an apparatus which, when a screen is changed in an electronic device, can change at least some region of a predetermined touch blocking region, adaptively, according to a user interface caused by the change of the screen (for example, change to a touch region (a touch processing region, a touch-enabled (touch allowable) region)), and can extend the predetermined touch blocking region to a region to receive a user's intended touch input, and also, can prevent an unintended touch input.

Solution to Problem

An electronic device according to various embodiments of the present disclosure may include: a display configured to display a user interface; a memory; and a processor functionally connected with the display and the memory, wherein the processor is configured to: set a touch blocking region in an edge region of the display; determine an exception region in the touch blocking region, based on the user interface; set a final touch blocking region by removing the determined exception region from the touch blocking region; and process a touch event on the edge region, based on the final touch blocking region.

An operation method of an electronic device according to various embodiments of the present disclosure may include: setting a touch blocking region in an edge region of a display; determining an exception region in the touch blocking region, based on a user interface; setting a final touch blocking region by removing the determined exception region from the touch blocking region; and processing a touch event on the edge region, based on the final touch blocking region.

Various embodiments of the present disclosure to achieve the above-described objects may include a computer readable recording medium having a program recorded thereon to cause a processor to perform the above-described method.

Advantageous Effects of Invention

According to the electronic device and the operation method therefor according to various embodiments, in the electronic device having a touch screen with a narrow bezel region or a curved display, a user's intended touch event can be exactly filtered. According to various embodiments, by filtering the touch event, malfunction of the electronic device caused by a user's unintended touch input can be prevented. According to various embodiments, a touch blocking region (or a touch unprocessing region) may be set with respect to a substantially touchable region of the electronic device to prevent a user's unintended touch input, and the set touch blocking region (touch unprocessing region) may be adaptively changed (changed to a touch region (or a touch processing region, a touch-enabled (allowable) region)) according to a user interface of an application. For example, when the screen is changed due to execution of an application, a change of an application, a page change, or a scroll in the electronic device, at least some region of the touch blocking region may be changed to a touch input-enabled touch region according to a corresponding user interface, or other regions may be included as the touch blocking region. In various embodiments, by doing so, a predetermined touch blocking region may be extended to an exception region to receive (process) a user's intended touch input, and simultaneously, the remaining touch blocking region may be maintained to prevent an unintended touch input.

Accordingly, according to various embodiment, the accuracy of a user's intended touch input can be enhanced, and also, an unintended touch input can be prevented simultaneously. For example, according to various embodiments, a problem that a user's intended touch input on an edge region cannot be processed by fixedly setting a touch blocking region in the edge region of the display can be solved.

According to various embodiments, by setting a touch blocking region adaptively according to a user interface of an application, more regions can be extended as the touch blocking regions and can be processed. In various embodiments, by doing so, malfunction caused by an unintended touch input when the user grips the electronic device can be more effectively prevented. In addition, even when grip surfaces of the electronic device increase as in the case where users use electronic devices while lying, the efficiency of preventing malfunction caused by touches can be enhanced. The electronic device according to various embodiments can contribute to enhancing usability, convenience and competitiveness of the electronic device.

BEST MODE FOR CARRYING OUT THE INVENTION

Figure 1:
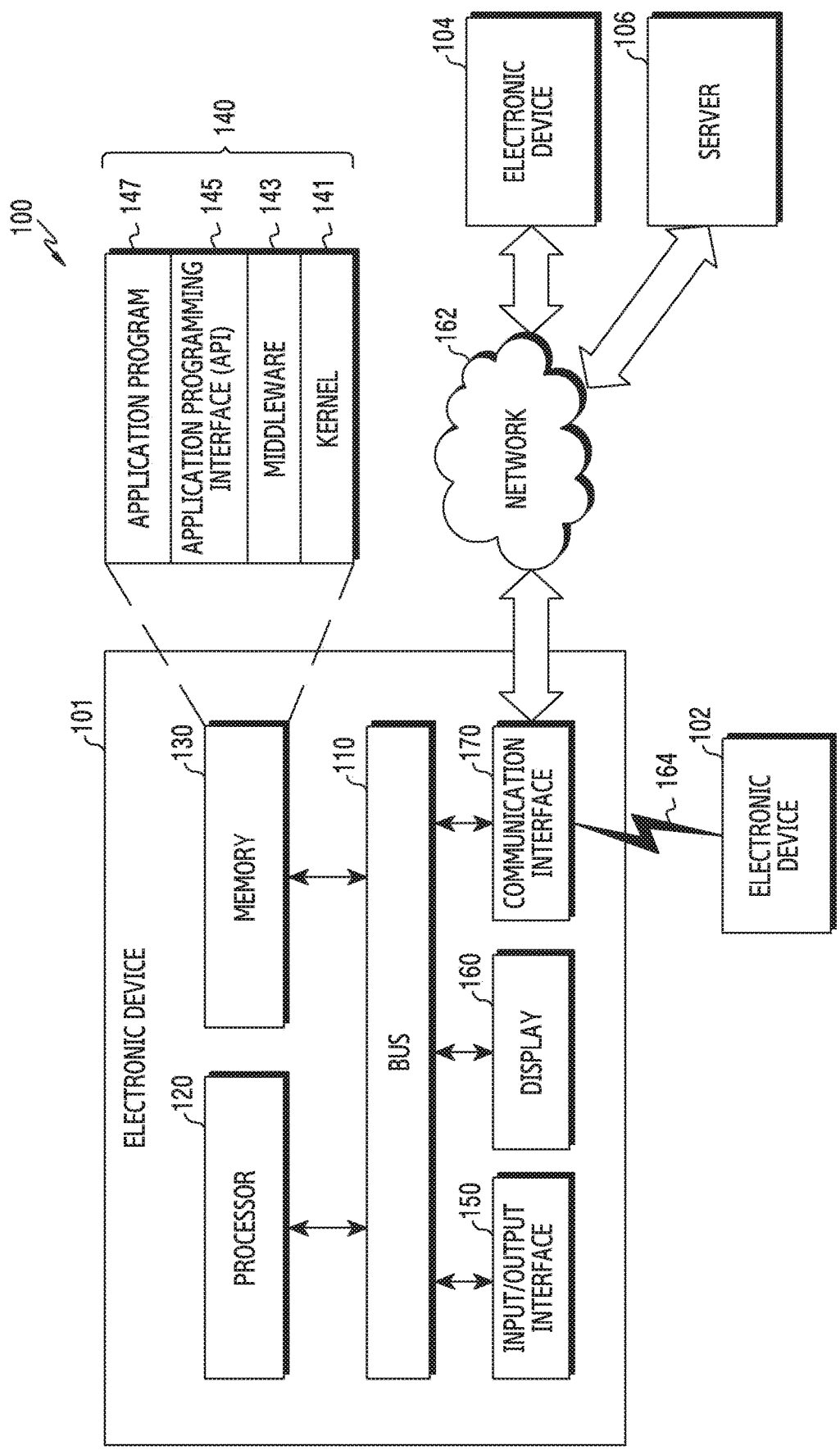
FIG. 1 is a view illustrating a network environment including an electronic device according to various embodiments of the present disclosure.

Hereinafter, various embodiments of the present disclosure will be described with reference to the accompanying drawings. It should be appreciated that various embodiments and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B" or "at least one of A and/or B" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., a third element).

The term "configured (or set) to . . . " used in the present disclosure may be interchangeably used with the terms "suitable for . . . ," "having the capacity to . . . ," "adapted to . . . ," "made to . . . ," "capable of . . . ," or "designed to" in a hardware or software level depending on the situation. In a certain situation, the term "a device configured to . . . " may refer to "the device being capable of . . . " with another device or parts. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

An electronic device according to various embodiments of the present disclosure may include at least one of smartphones, tablet PCs, mobile phones, video telephones, electronic book readers, desktop PCs, laptop PCs, netbook computers, workstations, servers, PDAs, portable multimedia players (PMPs), Motion Picture Experts Group (MPEG-1 or MPEG-2) Audio Layer 3 (MP3) players, medical devices, cameras, or wearable devices, or the like. The wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), bio-implantable circuits, or the like. According to embodiments, the electronic devices may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, media boxes (for example, Samsung HomeSync™, Apple TV™, or Google TV™), game consoles (for example, Xbox™ and PlayStation™), electronic dictionaries, electronic keys, camcorders, electronic picture frames, or the like.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, drones, automatic teller's machines (ATMs) of financial institutions, points of sales (POSs) of stores, or internet of things (for example, light bulbs, various sensors, sprinkler devices, fire alarms, thermostats, street lamps, toasters, exercise equipment, hot water tanks, heaters, boilers, and the like), or the like. According to an embodiment, the electronic devices may include at least one of furniture, a part of buildings/structures or cars, electronic boards, electronic signature receiving devices, projectors, or various measuring instruments (for example, water meters, electricity meters, gas meters, or wave meters, and the like), or the like. The electronic devices according to various embodiments may be flexible or may be a combination of two or more devices of the above-mentioned devices. Also, electronic devices according to various embodiments of the present disclosure are not limited to the above-mentioned devices. In the present disclosure, the term "user" may refer to a person who uses the electronic device or a device that uses the electronic device (for example, an artificial intelligence electronic device).

FIG. 1 is a diagram illustrating a network environment including an electronic device according to various embodiments.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101. An operation of processing (or controlling) the processor 120 according to various example embodiments will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The memory 130 may store one or more programs executed by the processor 120, and perform function for temporality storing data inputted and outputted by the processor 120. According to various embodiments of the present disclosure, the memory 130 may stores obtained data, data obtained in real time may stored in temporarily storing device and data determined to be stored may stored in long-time storable device. The memory 130 may include a computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. The API 145 is an interface through which the applications 147 control functions provided from the kernel 141 or the middleware 143, and may include, for example, at least one interface or function (e.g., instruction) for file control, window control, image processing, character control, and the like.

The input/output interface 150 may output the commands or data received from the other element(s) of the electronic device 101 to the user or another external device, or may transmit the command or data received from the user or the another external device to the other element(s) of the electronic device 101. For example, wired/wireless headphone port, external charger port, wired/wireless data port, memory card port, audio input/output port, video input/output port, earphone port may be included in the input/output interface 150.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The display 160, for example, may displays the user visual output. The visual output may be indicated in a form of a text, a graphic, a video or any combination thereof. The display 160 may displays User Interface (UI) regarding usage of the electronic device or Graphical UI.

According to various embodiment of the present disclosure, the display 160 may display various UI or GUI associated with an operation performed by the electronic device 101. In the electronic device 101 according to various embodiments, various examples of screens provided based on the UI is described according to figures illustrated as follows.

According to various embodiment of the present disclosure, the display 160 may includes a curved display (or a bended display) which is rolled, bended without damaged according to flexible substrates as thin as paper or flat display. The curbed display maintains bended shape and connected with a housing (e.g. bezel). According to various embodiment of the present disclosure, the electronic device 101 may be implemented in a form like the curved display, and be implemented as a displaying apparatus which is rolled or unrolled by the user such as flexible display. According to various embodiment of the present disclosure, the display 160 may get flexibility by substituting glass substrate with plastic film which covers the LCD of various displays described above.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system. Hereinafter, in the present disclosure, the "GPS" may be interchangeably used with the "GNSS".

The wired communication may include, for example, at least one of a Universal Serial Bus (USB), a High Definition Multimedia Interface (HDMI), Recommended Standard 232 (RS-232), and a Plain Old Telephone Service (POTS).

The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
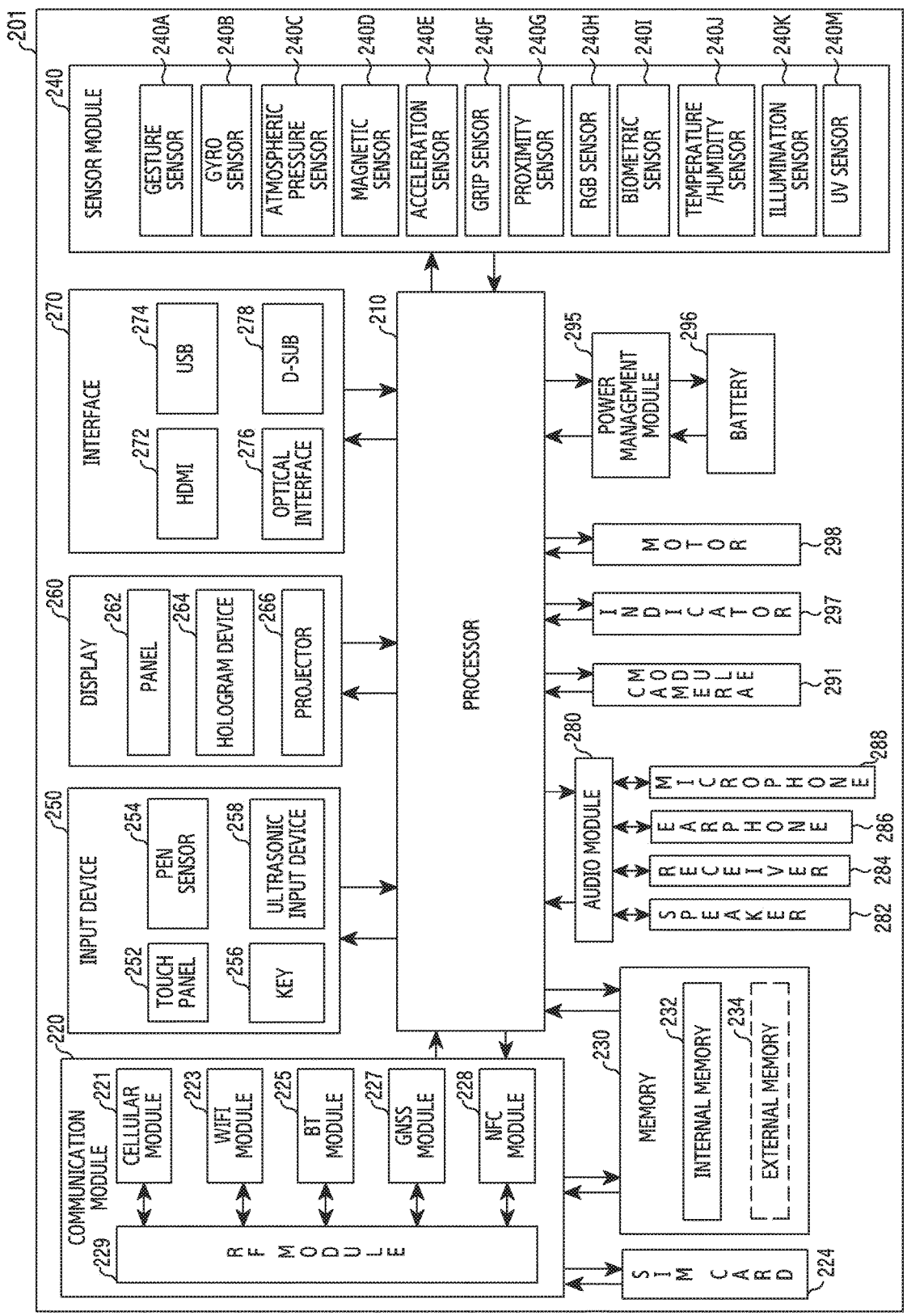
FIG. 2 is a block diagram of an electronic device according to various embodiments of the present disclosure.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. According to various embodiments of the present disclosure, because the components illustrated in FIG. 2 is not essential to electronic device 201, the electronic device 201 may includes further components than the components illustrated in FIG. 2, or may be implemented by less components than the components illustrated in FIG. 2. For example, the electronic device 201 according to various embodiments may not includes some of components according to its type. According to various embodiments, the aforementioned components of the electronic device 201 may disposed inside of a housing (or main body) of the electronic device 201 or may formed outside of the housing.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

According to various embodiments of the present disclosure, the processor 210 may controls overall operation of the electronic device 201. According to various embodiments, the processor 210 may include one or more processors. For example the processor 210 may includes a communication processor, an application processor, an interface (e.g. GPIO, general purpose input/output), or internal memory as distinct components or incorporated in one or more integrated circuit. In one embodiment, the AP performs various functions for the electronic device 201 by executing various software program, and the CP performs processing and controlling for audio communication and data communication. The processor 210 may enrolls for performing specific various functions corresponding to a software module (e.g. instruction set) by executing the specific software module stored in the memory 230.

According to various embodiments, the processor 210 may control operation of hardware module such as the audio module 280, the interface 270, the display 260, the camera module 291 or the like. According to various embodiments, the processor 210 may electrically connected to the display 260 and the memory 230 of the electronic device 201.

According to various embodiments, the processor 210 may process touch operation by setting, removing or adjusting of touch block area (or touch non-processing area). According to various embodiments, the processor 210 may, when screen transition occurs by executing the application, transition of the application, page or scroll, transition the at least portion of the touch block area to touch area according to corresponding user interface, or including other area into the touch block area.

According to various embodiments, the processor 210 may control detecting screen change, setting touch block area in an edge area in response to the screen change. According to various embodiments, the processor 210 may control determining exception area in the touch block area based on the UI, setting final touch block area by removing the determined exception area from the touch block area, processing touch event regarding the edge area based on the final touch area.

The processing (or controlling) operation of the processor 210 according to various embodiments is described in detail referring to attached figures.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227, an NFC module 228, and a Radio Frequency (RF) module 229. The communication module 220, for example, further comprises WiGig module (not illustrated). In one embodiments, WiFi module 223 and WiGig module (not illustrated) may be incomparably implemented in a form of a single chip.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP). According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The WiFi module 223 may indicate a module for establishing a wireless Internet connection and a wireless LAN link with another external electronic device (e.g., another electronic device 102 or server 106). The WiFi module 223 may be externally or internally mounted on the electronic device 201. As a wireless Internet technology, wireless fidelity (Wi-Fi), wireless broadband (Wibro), world Interoperability for microwave access (WiMax), high speed downlink packet access (HSDPA), millimeter wave (mmWave), or the like may be used. The WiFi module 223 may transmit or receive various data of the electronic device 201 to and from the outside, in conjunction with another external electronic device (e.g., another electronic device 104) connected to the electronic device 201 via a network (e.g., a wireless Internet network)(e.g., the network 162). The WiFi module 223 may always remain in a turned-on state or may be turned on/turned off according to the setting of the electronic device 201 or a user input.

The Bluetooth module 225 and NFC module 228 may, for example, indicate a short-range communication module for performing short-range communication. As a short-range communication technology, Bluetooth, Bluetooth low energy (BLE), radio frequency identification (RFID), infrared data association (IrDA), ultra wideband (UWB), Zigbee, near field communication (NFC), or the like may be used. The short-range communication module may transmit or receive various data of the electronic device 201 to and from the external electronic device, in conjunction with another external electronic device (e.g., another electronic device 102) connected to the electronic device 201 via a network (e.g., a short-range communication network). The short-range communication module (e.g. the Bluetooth module 225 and NFC module 228) may always remain in a turned-on state or may be turned on/turned off according to the setting of the electronic device 201 or a user input.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The memory 230 may store one or more programs, data or instructions associated with detecting a screen change, setting touch block area (or touch non-processing area) in an edge area in response to the screen change by processor. According to various embodiments, the memory 230 may store one or more programs, data or instructions associated with determining exception area in the touch block area based on the UI, setting final touch block area by removing the determined exception area from the touch block area, processing touch event regarding the edge area based on the final touch area.

The memory 230 may includes extension memory (e.g. external memory 234) or embedded memory (e.g. internal memory 232). The electronic device 201 may operated associated with web storage performing storage function of the memory 230 in the internet.

The memory 230 may stores one or more software (or software module). For example, the software components may comprises an operating system software module, communication software module, graphic software module, user interface software module, MPEG (moving picture experts group) software module, camera software module or one or more of application software module. Also, the module which is software components may expressed as set of instructions, therefore, the module may be expressed as an instruction set. The module may be expressed as a program. In various embodiments, the memory 230 may further comprises additional module (instructions) with aforementioned modules, or as necessary, do not use some of the modules (the instructions).

The operating system software module may comprise various software components to control general system operation. The controlling of the general system operation may refer to, for example, management and controlling memory, management and controlling storage hardware (device), or management and controlling power. Here, the operating system software module may perform function to facilitate communication between various hardware (device) and software component (module).

The communication software module may enable communication with other electronic devices, such as a wearable device, a smart phone, a computer, a server, or a portable terminal, via the communication module 220 or interface 270. Also, the communication software module may be configured with a protocol structure corresponding to the communication method.

The graphics software module may include various software components for providing and displaying graphics on the display 260. According to various embodiments, the term graphic may be used to mean text, web page, icon, digital image, video, animation, and the like.

The user interface software module may include various software components related to the user interface (UI). For example, it includes contents regarding how the state of the user interface is changed or under which conditions the change of the user interface state is made, and the like.

An MPEG module may include software components that enable processes and functions (e.g, creation, playback, distribution, and transmission of content, and the like) related to digital content (e.g., video, audio).

The camera software module may include camera-related software components that enable camera-related processes and functions.

An application module may include a web browser including a rendering engine, a email, an instant message, a word processing, a keyboard emulation, an address book, touch list, widget, digital right management (DRM), iris scan, context cognition, voice recognition, positioning (position) determining function, location based service, and the like. According to various embodiments, the application module may include instructions for processing the touch event by changing the touch blocking area of the display 260 according to the user interface.

The sensor module 240 may, for example, measure a physical quantity or sense the operating state of the electronic device 201 to convert the measured or sensed information into an electrical signal. The sensor module 240 may includes at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., RGB (red, green, blue), a medical sensor 240I, temperature-humidity sensor 240J, an illuminance sensor 240K, or a UV (ultra violet) sensor 240M. Additionally or alternatively, the sensor module 240 may include, for example, an e-nose sensor, an electromyography (EMG) sensor, an electroencephalogram (EEG) sensor, an electrocardiogram sensor an electrocardiogram sensor, an infrared (IR) sensor, an iris scan sensor, and/or a finger scan sensor. The sensor module 240 may further include a control circuit for controlling at least one or more sensors included in the sensor module 240. In some embodiments, the electronic device 201 further includes a processor configured to control the sensor module 240, either as part of the processor 210 or separately, to control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may be part of, for example, a touch panel or may include a separate recognition sheet. The key 256 may include, for example, a physical button, an optical key, or a keypad. The ultrasonic input device 258 can sense the ultrasonic wave generated from the input tool through the microphone 288 and identify the data corresponding to the ultrasonic wave detected. According to various embodiments, the input device 250 may include an electronic pen. According to various embodiments, the input device 250 may be implemented to receive a force touch.

The display 260 (e.g., the display 160) may include a panel 262, a hologram device 264, or a projector 266.

The panel 262 may be implemented to be, for example, flexible, transparent, or wearable. The panel 262 may be embodied as one or more module with the touch panel 252. In one embodiment, the panel 262 may include a pressure sensor (or force sensor) capable of measuring the intensity of the pressure on the user's touch. The pressure sensor may be integrated with the touch panel 252 or may be implemented by one or more sensors separate from the touch panel 252. The panel 262 may be seated in the display 260 and may sense user input contacting or approaching the surface of the display 260. The user input may comprise a touch input or proximity input based on at least one of a single-touch, a multi-touch, a hovering, or an air gesture. The panel 262 may receive user input to initiate operations associated with use of the electronic device 201 in various embodiments and may generate an input signal in accordance with the user input. The panel 262 may be configured to convert a change in capacitance, such as a pressure applied to a particular area of the display 260 or a specific area of the display 260, to an electrical input signal. The panel 262 can detect the location and area where an input tool (e.g., a user finger, an electronic pen, etc.) is touched or approximated on the surface of the display 260. In addition, the panel 262 may be configured to detect pressure (e.g., force touch) at the time of touch according to the applied touch method.

The hologram device 264 may show a three dimensional (3D) image in the air by using an interference of light. The projector 266 may project light onto a screen to display an image. The screen may be located, for example, in the interior of or on the exterior of the electronic device 201.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The interface 270 may receive data from another electronic device, or may receive power and communicate it to the respective configurations within the electronic device 201. The interface 270 may allow data within the electronic device 201 to be transmitted to other electronic devices. For example, a wired/wireless headphone port, an external charger port, a wired/wireless data port, a memory card port, an audio input/output port, a video input/output port, an earphone port, and the like may be included in the interface 270.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The audio module 280 may transmits the audio signal input from the processor 210 to an output device (e.g., a speaker 282, a receiver 284, or an earphone 286), and performs a function for transmitting an audio signal such as a voice received from an input device (e.g., the microphone 288) to the processor 210. The audio module 280 may output audio/sound data by converting the audio/sound data into audible sound under the control of the processor 210, and transmit the audio signal such as voice to the processor 210 by converting the audio signal into a digital signal.

The speaker 282 or the receiver 284 may output audio data stored in the memory or received from the communication module 220. The speaker 282 or the receiver 284 may output an acoustic signal associated with various operations (functions) performed in the electronic device. The microphone 288 may receive an external acoustic signal and process it as electrical voice data. The microphone 288 may be implemented with various noise reduction algorithms for eliminating noise generated while receiving the external acoustic signal. The microphone 288 may be responsible for input of audio streaming such as voice commands or the like.

The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp).

According to various embodiments, the camera module 291 may include a first camera (e.g., a color camera) to acquire color information and a second camera (e.g., an infrared (IR) camera) to acquire depth information (e.g., position information and distance information of a subject). For example, the first camera (e.g., a color camera) may capture a color image of the subject by converting a light inputted from the outside into am image signal. The camera module 291 may include an image sensor. The image sensor may be implemented as a CCD (charged coupled device) or a CMOS (complementary metal-oxide semiconductor). According to one embodiment, the first camera may be a front camera embedded on the front surface of the electronic device 201. According to various embodiments, the front camera may be replaced by the second camera, and may not be embedded at the front surface of the electronic device 201. According to various embodiments, the first camera may be placed together with the second camera on the front surface of the electronic device 201. According to one embodiment, the first camera may be a rear camera embedded on the rear surface of the electronic device 201. According to one embodiment, the first camera may be configured to include both the front camera and the rear camera, which are embedded on the front and back sides of the electronic device 201, respectively.

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include a a mobile TV supporting device (e.g., a GPU) to process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. Some of the above-described elements may be omitted from the electronic device (e.g., the electronic device 101, 201), or the electronic device may further include additional elements. Also, some of the hardware components according to various embodiments may be combined into one entity, which may perform functions identical to those of the relevant components before the combination.

Figure 3:
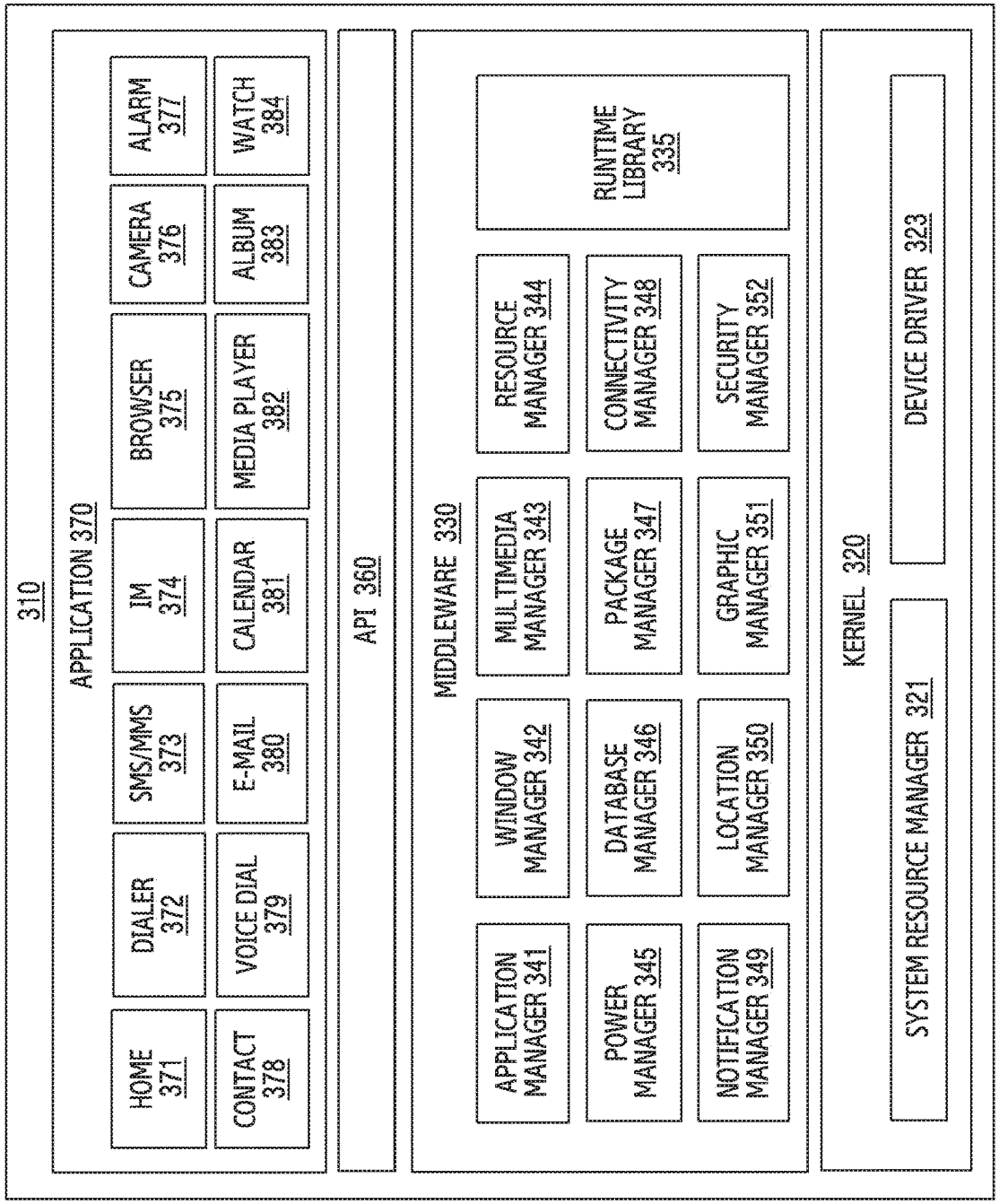
FIG. 3 is a block diagram of a program module according to various embodiments of the present disclosure.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320 (e.g., a kernel 141), middleware 330 (e.g., a middleware 143), an API 360 (e.g., an API 145), and/or applications 370 (e.g., an application program 147). At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide a function required in common by the applications 370, or may provide various functions to the applications 370 through the API 360 so as to enable the applications 370 to efficiently use the limited system resources in the electronic device.

According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370. The power manager 345 may, for example, manage a battery or power source and may provide power information required for the operations of the electronic device. According to an embodiment, the power manager 345 may operate together with a Basic Input/Output System (BIOS). The database manager 346 may generate, search for, and/or change a database to be used by at least one of the applications 370. The package manager 347 may manage installation or an update of an application distributed in a form of a package file.

For example, the connectivity manager 348 may manage wireless connectivity. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like.

According to an embodiment of the present disclosure, the middleware 330 may further include a telephony manager for managing a voice call function or a video call function of the electronic device or may include a middleware module that forms a combination of various functions of the above-described components. According to an embodiment, the middleware 330 may provide a module specialized for each type of OS in order to provide a differentiated function. The middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384, a health care (e.g., for measuring exercise quantity or blood sugar, etc.), or environment information (e.g., providing atmospheric pressure, humidity, or temperature information).

According to an embodiment, the applications 370 may include an information exchange application that supports information exchange between the electronic device and an external electronic device. The information exchange application may include, for example, a notification relay application for transferring specific information to an external electronic device or a device management application for managing an external electronic device. For example, the notification relay application may transmits notification information generated by other application of the electronic device to an external electronic device, or providing a user notification information that is received from the external electronic device. The device management application may install, delete, or update at least one function of an external electronic device that communicates with the electronic device (for example, a function of turning on/off the external electronic device itself (or some components thereof) or a function of adjusting the brightness (or resolution) of a display), applications that operate in the external electronic device. According to an embodiment, the applications 370 may include applications (for example, a health care application of a mobile medical appliance, and the like) designated according to the attributes of an external electronic device.

According to an embodiment, the applications 370 may include applications received from an external electronic device (for example, the server 106 or the electronic device 102 or 104). At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" used herein may include a unit including hardware, software, or firmware, and, for example, may be interchangeably used with the terms "logic," "logical block," "component" or "circuit". The "module" may be an integrally configured component or a minimum unit for performing one or more functions or a part thereof. The "module" may be implemented mechanically or electronically. For example, the "module" may include an application-specific IC (ASIC) chip, a field-programmable gate array (FPGA), and a programmable-logic device for performing some operations, which are known or will be developed. At least part of a device (for example, modules or functions thereof) or a method (for example, operations) according to various embodiments may be implemented by instructions stored in a computer-readable storage media (for example, the memory 130,) in the form of a programmable module. When the instruction is executed by a processor (for example, the processor 120), the processor may perform a function corresponding to the instruction.

A computer-readable recording medium may include a hard disk, a floppy disk, a magnetic media (for example, a magnetic tape), an optical recording media (for example, compact disc read only memory (CD-ROM) and a digital versatile disc (DVD), a magneto-optical media (for example, a floptical disk)), an internal memory, or the like. Also, an instruction may include a code generated by a compiler or a code executable by an interpreter. A module or a program module according to various embodiments may include at least one of the above-described elements, or a portion of the above-described elements may be omitted, or additional other elements may be further included. Operations performed by a module, a program module, or other elements according to various embodiments may, be executed sequentially, in parallel, repeatedly, or in a heuristic method. Also, at least part of operations may be executed in different sequences, omitted, or other operations may be added.

According to various embodiments, a recording medium may include a computer readable recording medium which has a program recorded thereon to execute various methods described below in the processor 120, 210.

According to various embodiments, an electronic device may include all devices that use one or more of various processors, such as an AP, a CP, a GPU, and a CPU. For example, an electronic device according to various embodiments may include an information communication device, a multimedia device, a wearable device, an IoT device, or various other devices corresponding to the aforementioned devices.

Hereinafter, an operation method and an apparatus according to various embodiments of the present disclosure will be described with reference to the accompanying drawings. However, since various embodiments of the present disclosure are not restricted or limited by the following features described below, it should be noted that the operation method and the apparatus can be applied to various embodiments based on the following embodiments. In various embodiments of the present disclosure described below, hardware-wise approach methods will be described by way of an example. However, various embodiments of the present disclosure include technology using both hardware and software, and thus do not exclude software-based approach methods.

Figure 4A:
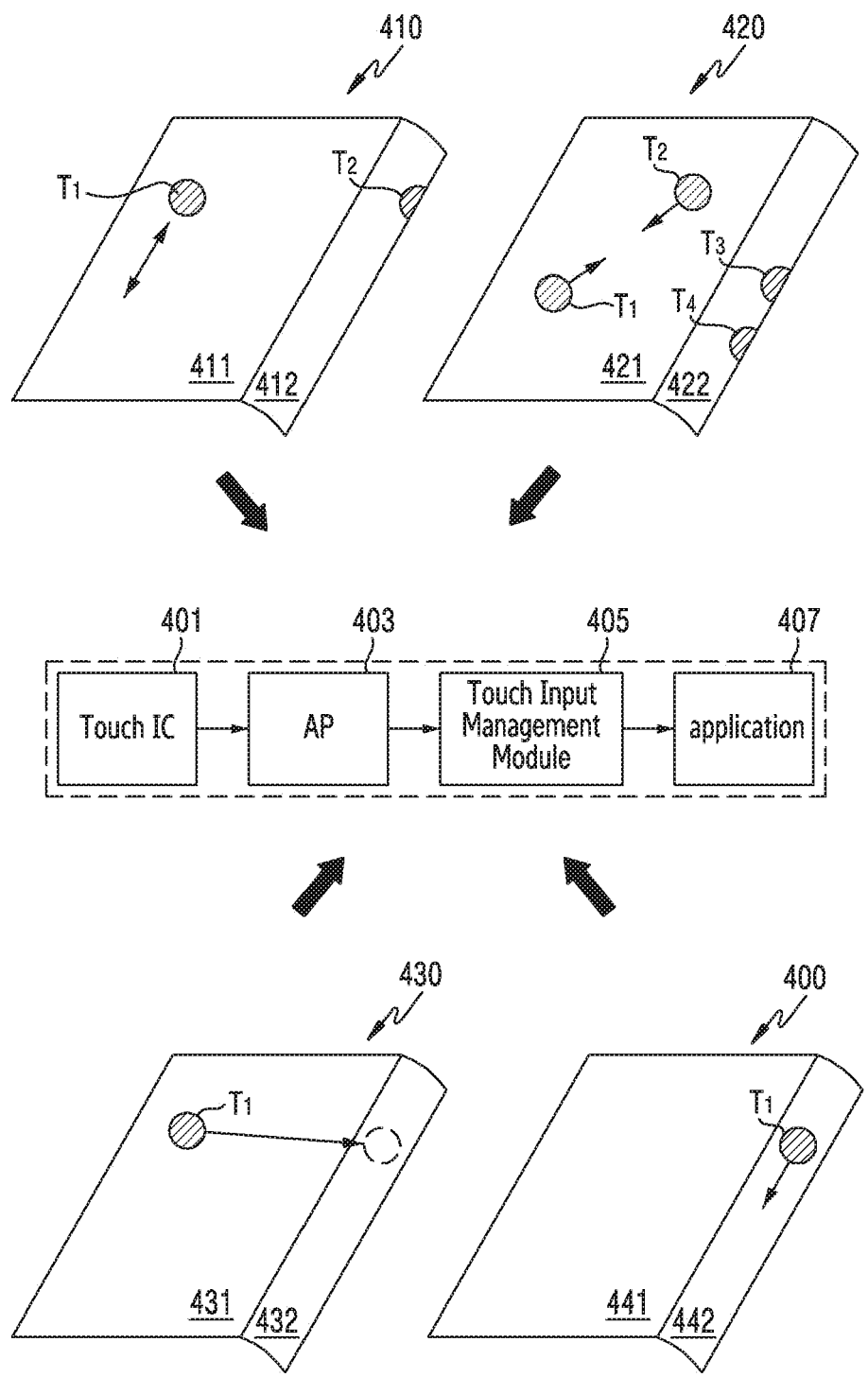
FIGS. 4A and 4B are views to illustrate a method of processing a touch input generated in an electronic device according to various embodiments of the present disclosure.

FIG. 4A illustrates a method of processing a touch input generated in an electronic device according to various embodiments of the present disclosure.

Referring to FIG. 4A, a display of the electronic device according to various embodiments may include at least two or more regions. According to various embodiments, a display (for example, example <410>) having a flat surface display region (for example, a region 411) and a curved display region (for example, a region 412) formed on a right side surface of the flat surface display region is illustrated for convenience of explanation, and other elements of the electronic device except for the display will not be illustrated.

According to various embodiments, the display of the electronic device may be functionally divided into two or more regions. For example, in example <410>, the display region 411 and the display region 412 form a single display panel, but functions of the corresponding regions may be distinguished from each other. For example, the display region 411 may be a region where a normal application (for example, a message application, a schedule management application, an Internet application, etc.) is executed, whereas the display region 412 may be a region where an icon of a frequently used application, etc. is displayed.

According to various embodiments, the region of the display may be divided in various ways. For example, the display may be divided into a main region and a sub region, a flat region and a curved region, a front surface region and a side surface region, a front surface region and a rear surface region, a region visible within a viewing angle and an invisible region, or a combination region of three or more of the above-mentioned regions. Alternatively, the display may be divided into a first region and a second region. Hereinafter, a region where a normal application is executed or a user intentionally inputs a touch event is distinguished as a main display region (or a first region), and a region where a user' unintended touch event input occurs relatively easily is distinguished as a sub display region (or an edge region, a second region, etc.). Distinguishing as described above is merely for convenience of explanation, and does not limit embodiments of the present disclosure.

The term "display" used in the present disclosure may be understood as a concept including a display supporting touch input functions of various types, such as an add-on type in which a touch screen panel (TSP) is coupled to an LCD panel, an on-cell type in which a touch screen panel is embedded in an LCD panel, and an in-cell type in which a touch function is embedded in an LCD panel.

According to various embodiments, a touch event inputted on the display may be processed by the processor 120, 210 including a processor circuit (for example, a processing circuitry) configured in the electronic device. For example, the touch event may be inputted based on a change in capacitance of a touch panel included in the display, and may include a down event, an up event, a continuous event, or a multi-touch event. The down event may indicate an event that is inputted by a user pressing the touch panel with an input device including a finger, a touch pen (electronic pen), or the like. In addition, the up event may indicate an event which is inputted by the user releasing an input means from the touch panel after inputting the down event. In addition, the continuous event may indicate an event which is inputted by the user changing the position of the input device while holding the pressing state on the touch panel, after inputting the down event. The continuous event may be referred to as a drag in the technical field to which the present disclosure belongs. In addition, the multi-touch event may indicate the user inputting the down events at two or more points of the touch panel.

According to various embodiments, when the touch event occurs, a touch IC 401 may determine whether the touch event occurs, a type of the touch event, and an occurrence point. An application processor (AP) 403 may determine which region of the functionally divided regions of the display the occurrence point of the touch event corresponds to, and may provide at least one piece of information of information regarding whether the touch event occurs, the type of the touch event, the occurrence point, and the occurrence region to a touch input management module 405.

Upon receiving the touch event, the touch input management module 405 may determine a method of processing the touch event, based on at least one piece of information of the type of the touch event, the occurrence point, and the occurrence region. For example, regarding the touch event, the touch input management module 405 may determine whether to store the touch event, to process the touch event by itself by deleting, or to transmit the touch event to an application 407. According to an embodiment, when the touch event is the down event and is inputted to a specific region, it may be additionally determined whether the down event corresponds to a grip, and, when the down event corresponds to the grip, the touch input management module 405 may process and delete the touch event by itself. Examples of these operations will be described in detail with reference to the drawings described below.

Hereinafter, a method for processing a touch input by filtering a user's intended touch event from among touch events inputted by the user will be described with reference to examples <410>, <420>, <430>, and <440> illustrated in FIG. 4A. It is assumed that reference numerals 411, 421, 431, 441 in examples 410, 420, 430, 440 indicate a region where a normal application is executed or the user intentionally inputs a touch event, and reference numerals 412, 422, 432, 442 indicate a region where a user's unintended touch event input occurs relatively easily as described above.

Example <410> of FIG. 4A illustrates an example of a user's drag operation on the display region 411 through a touch event T1. In this case, an unintended touch event T2 may occur first by an input device such as a user's hand fixing the electronic device or an electronic pen. The touch IC 401 may detect the touch event T1 and the touch event T2, and may provide information regarding occurrence points to the AP 403.

The AP 403 may determine which region of the display the touch event T1 and the touch event T2 are inputted to, respectively. For example, the AP 403 may determine that the touch event T1 is inputted through the region 411 and the touch event T2 is inputted through the region 412. The AP 403 may provide the touch event T2 inputted first to the touch input management module 405. For example, the AP 403 may provide information regarding the type of the touch event T2, the occurrence point, and the occurrent region to the touch input management module 405.

The touch input management module 405 may also receive information indicating that the touch event T2 is detected on the region 412. In response to the information regarding the touch event T2 being received, the touch input management module 405 may determine whether the touch event T2 corresponds to a grip or an intended touch.

According to an embodiment, the touch input management module 405 may determine whether a difference between a length of the longest portion (for example, a long axis) and a length of the shortest portion (for example, a short axis) of a shape of a touch region of the touch event T2 is less than or equal to a predetermined threshold value. When it is determined that the difference is less than or equal to the predetermined threshold value, the touch input management module 405 may determine that the shape of the touch region is close to a circular shape, and may estimate the touch event T2 as a touch input and may determine that the touch event is an intended touch. According to an embodiment, the touch input management module 405 may determine whether the difference between the length of the long axis and the length of the short axis of the shape of the touch region of the touch event T2 exceeds the predetermined threshold value. When it is determined that the difference exceeds the predetermined threshold value, the touch input management module 405 may determine that the shape of the touch region is close to an oval shape, and may estimate the touch event T2 as a grip input and may determine that the touch event corresponds to a grip. According to an embodiment, the touch input management module 405 may determine whether the touch event corresponds to a grip or a touch, based on a width (area) of the touch region or a touch input time. However, this should not be considered as limiting, and the touch input may be distinguished by various methods.

According to an embodiment, when it is determined that the touch event T2 is a grip, the touch input management module 405 may process and delete the touch event T2 by itself. According to another embodiment, even when it is determined that the touch event T2 is a touch since a small area of the user's palm touches in a circular shape, the touch input management module 405 may not directly transmit the touch event T2 to the application 407 and may temporarily store the touch event T2 since the touch event T2 is inputted through the region 412.

The AP 403 may transmit the touch event T1 to the touch input management module 405. In this case, the AP 403 may also provide information indicating that the touch event T2 occurs in the region 411. The touch input management module 405 may determine that the touch event T2 is already stored, and may delete the touch event T2 and may transmit only the touch event T1 to the application 407. As a result, a scroll caused by the touch event T2 is normally performed.

Example <420> of FIG. 4A illustrates an example in which the user performs a multi-touch function to zoom out an image through a touch event T1 and a touch event T2 on the region 421. In this case, a touch event T3 and a touch event T4 which are not intended may occur in the region 422 by an input device such as a user's hand griping the electronic device or an electronic pen. The touch input management module 405 may determine that the touch event T3 and the touch event T4 are a grip, and may delete the touch event T3 and the touch event T4. In addition, even when the touch event T3 and the touch event T4 are determined as touches since touch regions of the touch event T3 and the touch event T4 are close to a circular shape or have a small area, the touch input management module 405 may not directly transmit the touch event T3 and the touch event T4 to the application 407, and may store the same. Thereafter, when the touch event T1 and the touch event T2 detected from the region 421 are received, the touch input management module 405 may delete the touch event T3 and the touch event T4 which are already stored, and may transmit only the touch event T1 and the touch event T2 to the application 407. As a result, the touch event T1 and the touch event T2 which are intended by the user may be normally processed.

Example <430> of FIG. 4A illustrates an example in which a touch event T1 starting on the region 431 moves to the region 432. According to various embodiments, regarding a continuous event after the touch event T1 is inputted, the touch input management module 405 may continuously transmit the touch event inputted to the region 431 to the application 407, and may not directly transmit the touch event inputted to the region 432 to the application 407 and may store the touch event. Thereafter, when the continuous event inputted to the region 432 is not moved by longer than a predetermined distance, the touch input management module 405 may delete the touch event on the region 432 stored. According to various embodiments, even when the touch event T1 moves from the region 431 to the region 432, the touch input management module 405 may not directly transmit the touch event inputted to the region 432 to the application 407, and store the touch event, such that a function unintended by the user can be prevented from malfunctioning.

Example <440> of FIG. 4A illustrates an example in which a touch event T1 moves on the region 442 (for example, a scroll). The region 442 may be used as a region for adjusting brightness of the screen of the electronic device or a volume. According to various embodiments, when the user inputs the touch event T1 on the region 442, the touch input management module 405 may store the touch event T1, and thereafter, when the touch event T1 is continuously inputted as a continuous event and a moving distance is greater than or equal to a threshold value, the touch input management module 405 may transmit the continuous touch event T1 to the application 407. When the moving distance is less than or equal to the threshold value, the touch input management module 405 may estimate the touch event as a user's unintended touch event, and may delete the touch event T1. According to various embodiments, even when a touch-disabled region for preventing touch malfunction is not uniformly set in a portion close to the bezel of the electronic device, only a user's intended touch event can be filtered based on a moving distance of the touch event, etc., and accordingly, a malfunction problem of a function that is not intended by the user can be solved. Additional various embodiments to which the present disclosure is applicable will be described in detail with reference to the drawings presented below.

In various embodiments, the examples illustrated in FIG. 4A explain some of various types of input patterns that can be inputted to the electronic device, and are not intended to limit embodiments of the present disclosure.

According to various embodiments, elements configuring the operations of the present disclosure implemented by hardware and/or software as described in FIG. 4A may be expressed in various methods. For example, the touch IC 401 for determining the occurrence of a touch event and an occurrence point may be expressed as a determination module for an input position. In addition, the AP 403 may be expressed as a processor, a control module or a processing module. The touch event may be generated not only by a direct touch input to the display region, but also by a proximity touch input. The application 407 may refer to an application which is being executed or an application to be executed by the touch event. In various embodiments, the application 407 may operate on an application layer.

Figure 4B:
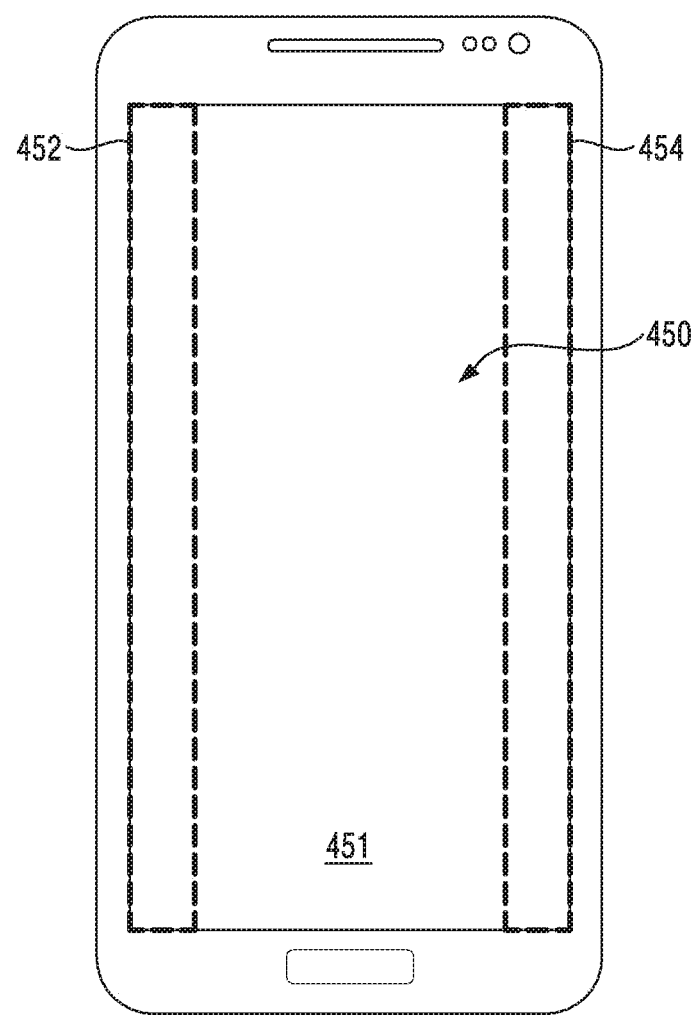

FIG. 4B illustrates a method for processing a touch input generated in the electronic device according to various embodiments of the present disclosure.

As shown in FIG. 4B, FIG. 4B is a view to illustrate a region of a display 450.

Referring to FIG. 4B, the display 450 may be divided into a first region 451 (for example, a main display region) and a second region 452, 454 (for example, a sub display region). The display 450 may distinguish a region where a normal application is executed or a user intentionally inputs a touch event as the first region 451, and a region where a user's unintended touch event input occurs relatively easily as the second region 452, 454.

According to various embodiments, the touch input management module 405 may process a touch event inputted to the second region 452, 454 in the same method as the method of processing the event inputted to the region 412, 422, 432, 442 as described above with reference to FIG. 4A. According to various embodiments, the touch input management module 405 may process a touch event inputted to the first region 451 in the same method as the method of processing the event inputted to the region 411, 421, 431, 441 as described above with reference to FIG. 4A.

Figure 5A:
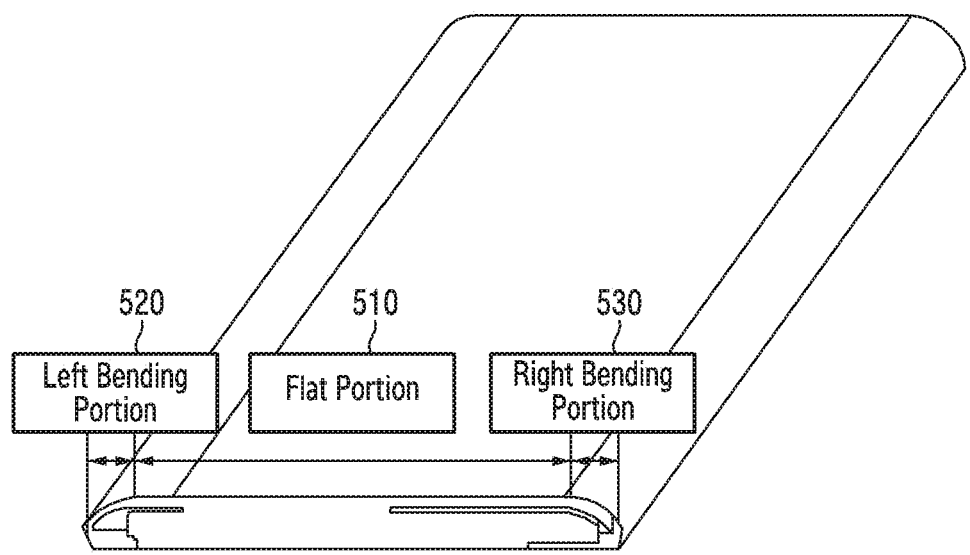
FIG. 5A is a view illustrating a display form of an electronic device according to various embodiments of the present disclosure.

FIG. 5A is a view illustrating a display form of an electronic device according to various embodiments of the present disclosure.

According to various embodiments, the electronic device may be a multi-surface display device having a plurality of display surfaces on a front surface thereof. For example, the display may include a first display disposed on a flat portion 510 of the front surface of the electronic device, a second display disposed on a left bending portion 520 of the front surface, and a third display disposed on a right bending portion 530.

According to various embodiments, the first display to the third display may face first to third directions, respectively, and the first to third directions may be different from one another. In various embodiments, a region displaying an image by means of the first display may be defined as a first display region, a region displaying an image by means of the second display may be defined as a second display region, and a region displaying an image by means of the third display may be defined as a third display region.

In various embodiments, the first display to third display may be continuously connected with one another. For example, the third display may be extended from the first display or the second display. Accordingly, at least a portion of the third display region may be extended from a periphery of the first display region or a periphery of the second display region. In various embodiments, at least one of the second display and the third display disposed on the left bending portion 520 and the right bending portion 530 may include a curved display.

FIGS. 5B, 5C, 5D, and 5E are views illustrating examples of screens configured in various methods in the electronic device including the plurality of displays according to various embodiments of the present disclosure.

According to various embodiments, the first display to the third display as described above with reference to FIG. 5A may be independently driven and may display different images, or may display a single image in a continuous form, under control of a processor. According to various embodiments, the processor may execute an application and may provide a user interface through the display, and, in response to a user input, the processor may control a screen displayed based on at least a part of the first display to the third display. Hereinafter, an example in which the processor controls a screen displayed on the first display to the third display according to various embodiments will be described.

Figure 5B:
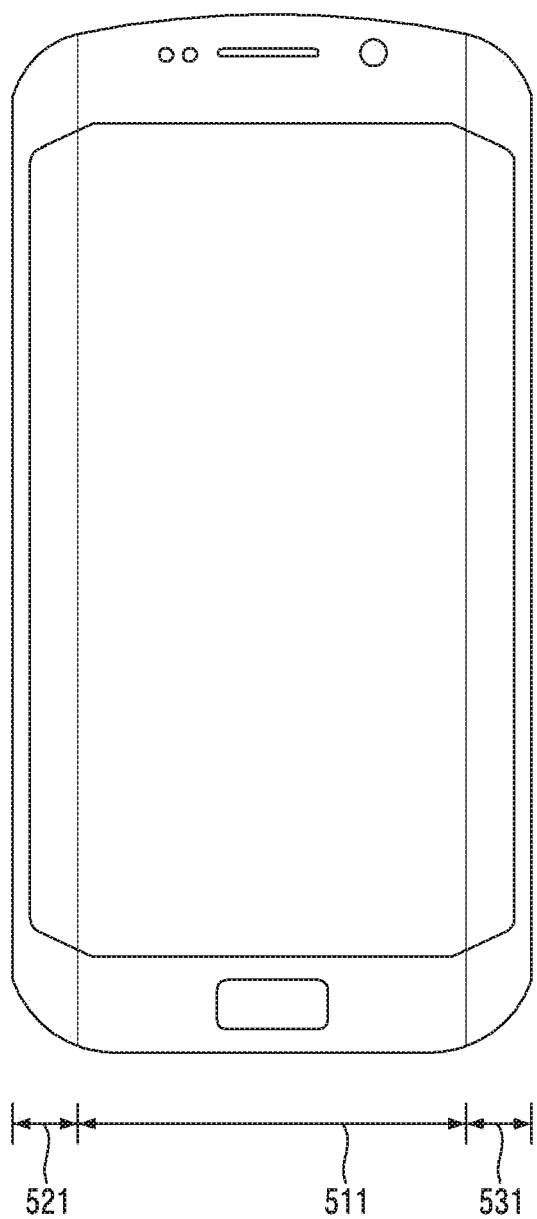
FIGS. 5B, 5C, 5D, and 5E are views illustrating screens configured in various methods in an electronic device including a plurality of displays according to various embodiments of the present disclosure.

Referring to FIG. 5B, the first display 511, the second display 521, and the third display 531 may display a single continuous screen on their respective display regions. For example, the second display region of the second display 521 may display a screen connected with a left screen of the first display region of the first display 511, and the third display region of the third display 531 may display a screen connected with a right screen of the first display region of the first display 511.

Figure 5C:
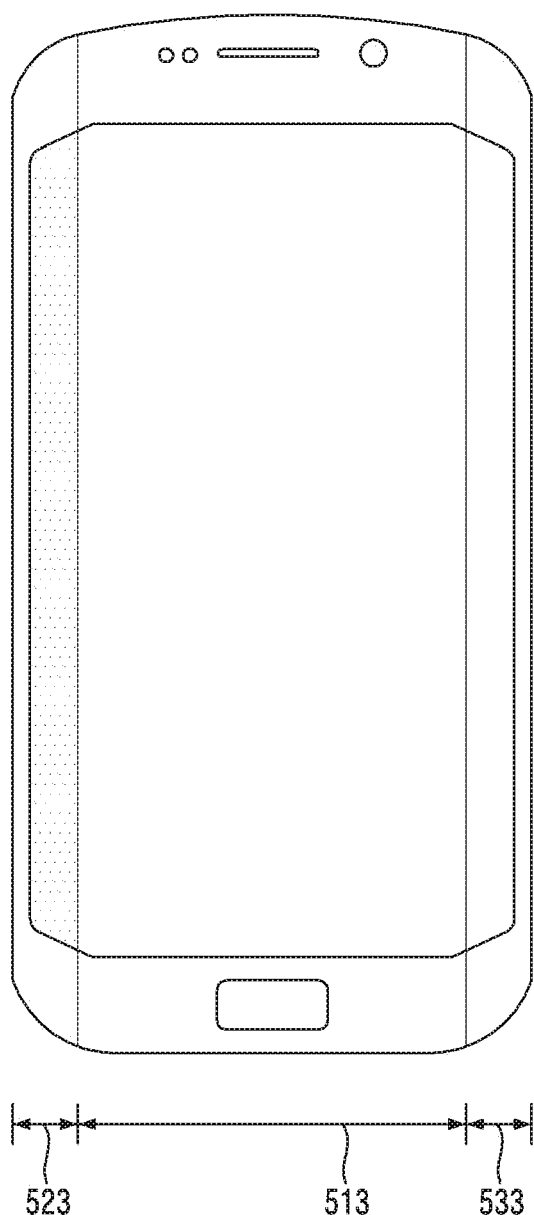

Referring to FIG. 5C, the first display 531 and the third display 533 may display a single continuous screen on their respective display regions, and the second display 523 may display another separate screen. For example, the third display region of the third display 533 may display a screen connected with a right screen of the first display region of the first display 513, and the second display region of the second display 523 may display a screen separate from a left screen of the first display region of the first display 513.

Figure 5D:
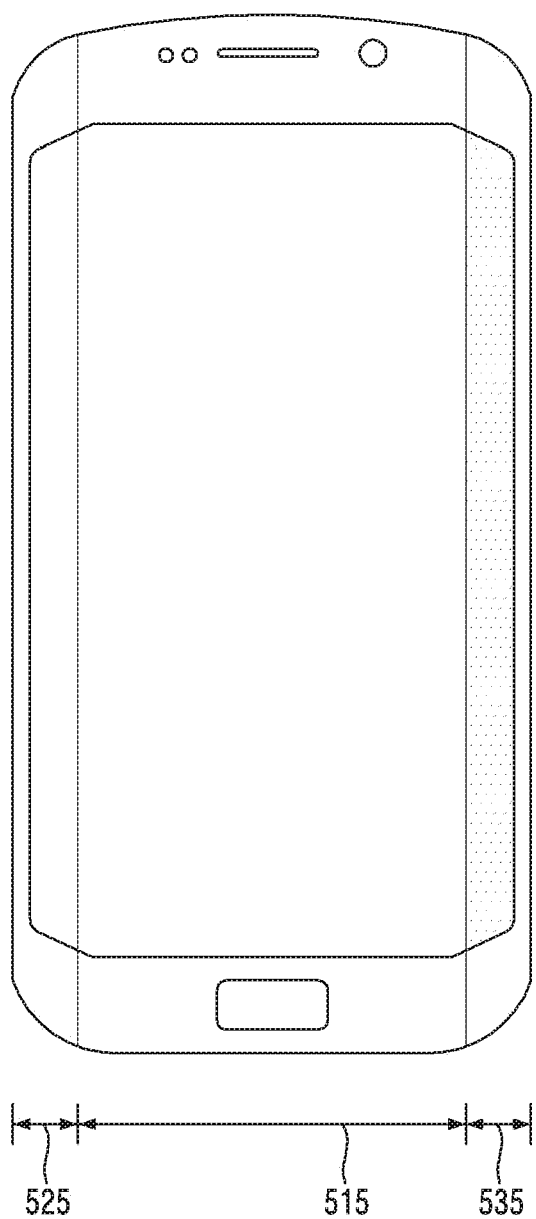

Referring to FIG. 5D, the first display 515 and the second display 525 may display a single continuous screen on their respective display regions, and a third display 535 may display another separate screen. For example, the second display region of the second display 525 may display a screen connected with a left screen of the first display region of the first display 515, and the third display region of the third display 535 may display a screen separate from a right screen of the first display region of the first display 515.

Figure 5E:
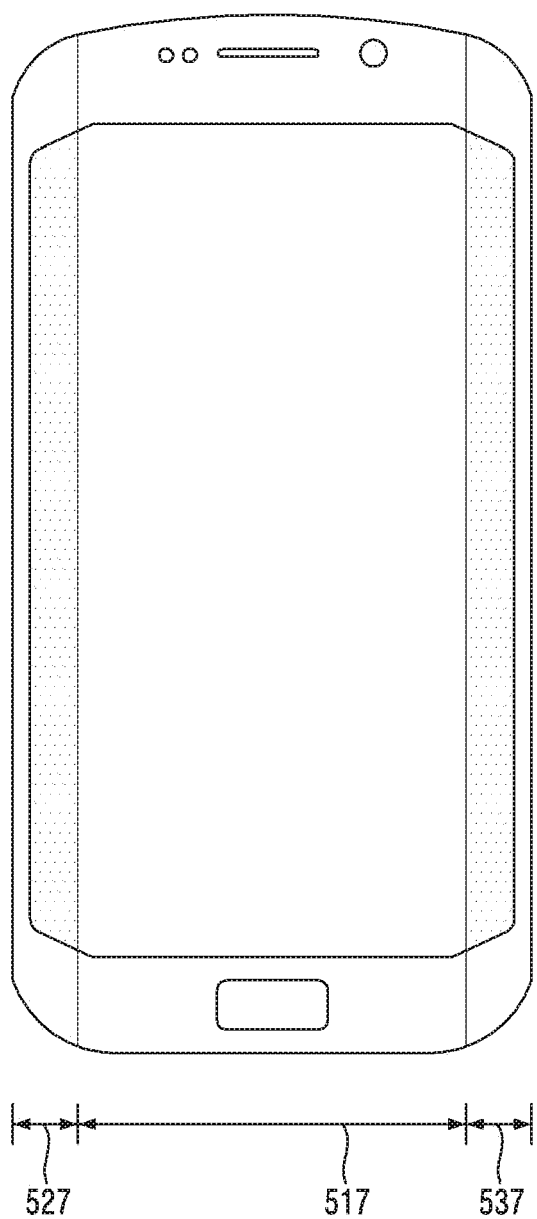

Referring to FIG. 5E, the first display 517, the second display 527, and the third display 537 may display separate screens on their respective display regions. For example, the first display region of the first display 517 may display a specific screen (for example, a first screen), the second display region of the second display 527 may display a screen (for example, a second screen) separate from a left screen of the first display region of the first display 517, and the third display region of the third display 537 may display a screen (for example, a third screen) separate from a right screen of the first display region of the first display 517.

According to various embodiments, the respective display regions (for example, the second display region, the third display region) of the second display 527 and the third display 537 may display different screens. According to various embodiments, at least one of the respective display regions (for example, the second display region, the third display region) of the second display 527 and the third display 537 may not display a screen and may operate in a turn-off state under control of the processor or according to a type of an application executed.

Figure 6A:
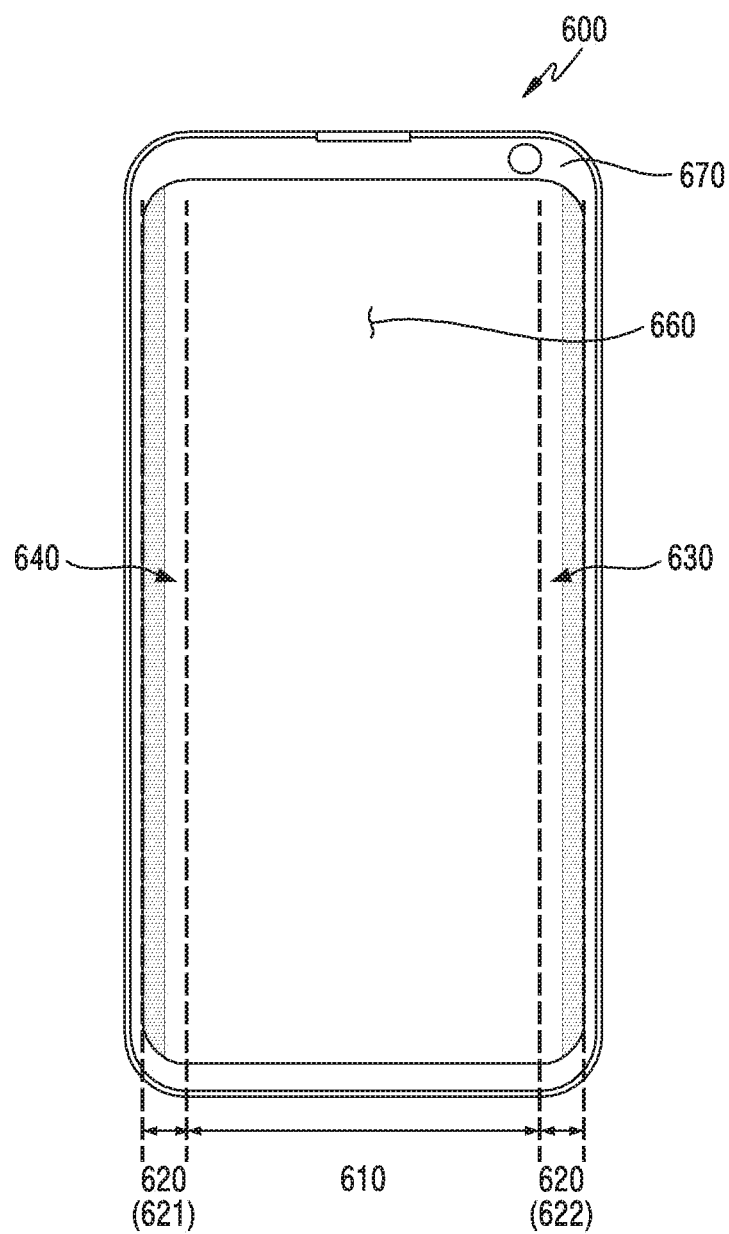
FIGS. 6A and 6B are views illustrating an example of an electronic device according to various embodiments of the present disclosure.
Figure 6B:
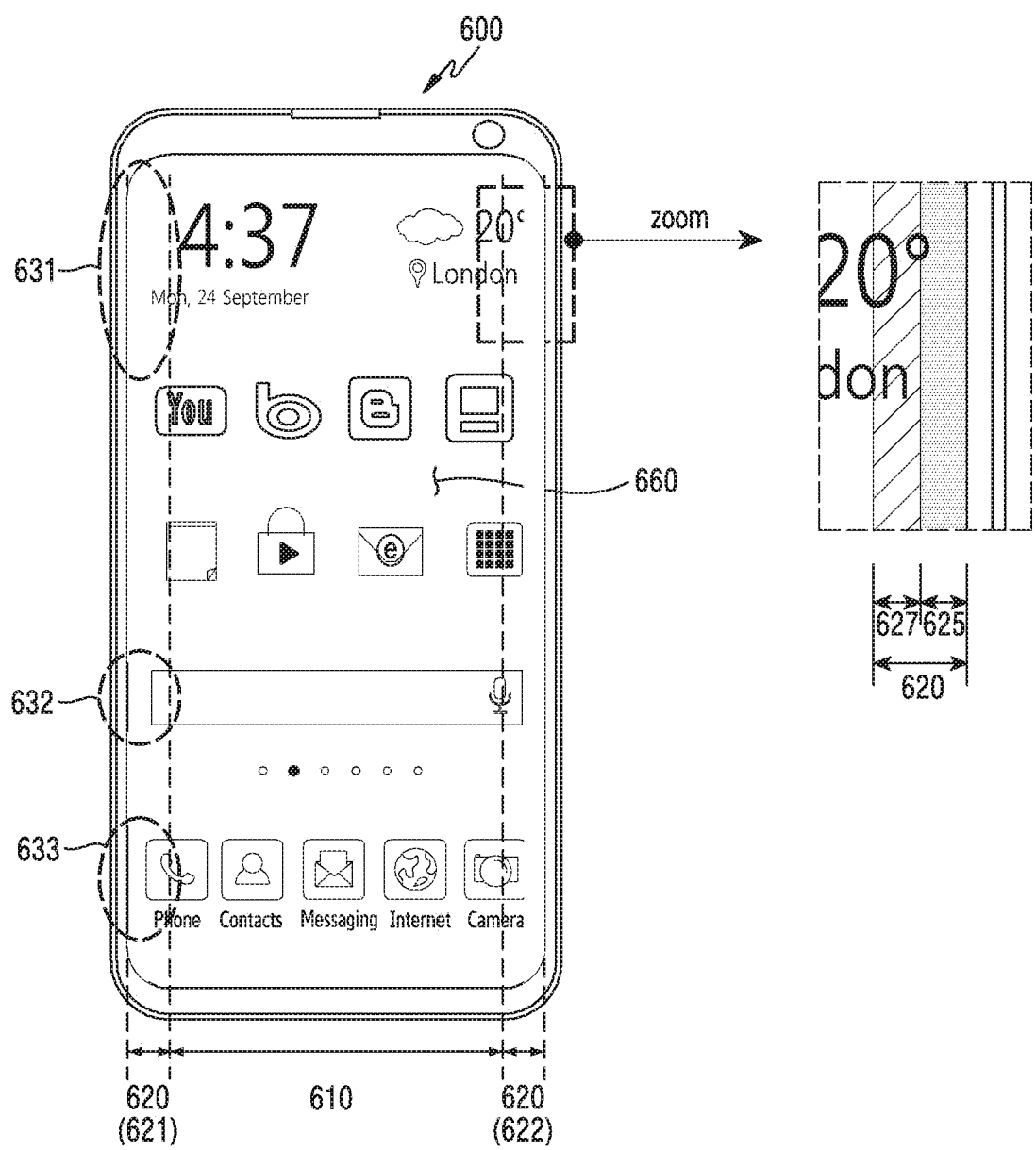

FIGS. 6A and 6B are views to illustrate an example of an electronic device according to various embodiments of the present disclosure.

FIGS. 6A and 6B illustrate an example of an electronic device 600 (for example, the electronic device 101 of FIG. 1, the electronic device 201 of FIG. 2) having a curved display (or a bended display). In various embodiments, it is illustrated that the electronic device 600 is an electronic device having a curved display, although it is not limited thereto. For example, in various embodiments, the electronic device 600 includes an electronic device without a bezel region or having a very narrow configuration, and for example, may include an electronic device having a flexible display or a flat surface display.

Referring to FIG. 6A, a display 660 (for example, the display 160 of FIG. 1, the display 260 of FIG. 2) of the electronic device 600 may be extended to at least one side surface of the electronic device 600 (for example, at least one surface of a left side surface, a right side surface, an upper side surface, or a lower side surface), and may be bent by a radius of curvature (for example, 5 cm, 1 cm, 7.5 mm, 5 mm, 4 mm, or the like) at which the curved display is operable, or less, and may be coupled to the side surface of a housing 670 (or a bezel). However, this should not be considered as limiting, and the display 660 according to various embodiments may be implemented at a right angle without a radius of curvature.

In various embodiments, a region formed on a front surface of the curved display 660 may be referred to as a main display region 610 (for example, a first display region), and a region extended from the main display region 610, bent toward at least one side surface of the housing 670, and appearing on the side surface of the housing 670 may be referred to as a sub display region 620 (or an edge area) (for example, a left sub display region 621 (for example, a second sub display region), a right sub display region 622 (for example, a third sub display region), an upper sub display region 624 (for example, a fourth sub display region), which will be described below, a lower sub display region 623 (for example, a fifth sub display region), which will be described below).

In various embodiments, the main display region 610 and the sub display region 620 are distinguished from each other for convenience of explanation, and do not mean as being physically divided from each other. According to various embodiments, the main display region 610 and the sub display region 620 may have at least one end formed in a bent shape, and the at least one bent end may be implemented by one curved display 660 extended to at least one side surface of the electronic device 600. According to various embodiments, the at least one bent end may be extended to the rear surface of the electronic device 600, and may be implemented according to an implementation method of the electronic device 600.

In various embodiments, the display 660 may support an input and an output, and may process an input and an output caused by the main display region 610 and the sub display region 620 simultaneously or individually.

According to various embodiments, a right hand mode and a left hand mode of the electronic device 600 may be defined by using an environment configuration provided by the electronic device 600, a separate application, or a user's grip state. In addition, the electronic device 600 may process an input and an output only by using the sub display region 620 on a side surface corresponding to a corresponding mode. For example, when the electronic device 600 is set to the right hand mode in the example of FIG. 6A, the input and the output are achieved through the sub display region 620 on the right side surface 630 when viewed in front of the electronic device 600, and, when the electronic device 600 is set to the left hand mode, the input and the output are achieved through the sub display region 620 on the left side surface 640 when viewed in front of the electronic device 600.

Referring to FIG. 6B, the sub display region 620 may include a dead zone 625. Hereinafter, a part or entirety of the sub display region 620 will be referred to as an edge region 620 for convenience of explanation, and the edge region 620 will be described as being divided into an edge zone 627 where a touch input is processed according to a condition or processed insensitively, and a dead zone 625 where a touch is not effective. For example, in various embodiments, each of the edge regions 620 may be divided into the edge zone 627 which allows a conditional input or is an insensitive region, and the dead zone 625 where a touch is not effective, and may operate.

In various embodiments, the sub display region 620 of the electronic device 600 may be identified as a physical region (for example, the whole region of the sub display region 620) in terms of display, and may be identified as an independent region (for example, at least two independent regions) in terms of touch. According to an embodiment, when the sub display region 620 is divided in terms of touch, the sub display region 620 may divided into a first partial region of the sub display region 620 (for example, an inside partial region 627 in the sub display region 620 (hereinafter, an edge zone)), and a second partial region of the sub display region 620 (for example, an outside partial region 625 in the sub display region 620) (hereinafter, a dead zone)). In other words, in various embodiments, the sub display region 620 may be a combination region of the dead zone 625 and the edge zone 627 in terms of touch. According to various embodiments, the region including the dead zone 625 and the edge zone 627 in terms of touch may be set to be the same as, larger (wider) than, or smaller (narrower) than the physical sub display region 620, according to settings of the electronic device 600.

Hereinafter, for convenience of explanation, the edge zone 627 may be used as a term indicating a region including the whole region or inside region of the sub display region 620, for example, indicating the sub display region 620 itself, and the dead zone 625 may be used as a term indicating an outside region of the sub display region 620, that is, a region which is set not to process a touch by default. For example, the dead zone 625 and the edge zone 627 may process only a specific touch input or may process a touch input according to a specific condition (for example, it is determined whether to process a first touch input according to a type of a second touch input, an input time difference, or the number of inputs). According to various embodiments, when the specific condition is not satisfied, the corresponding touch input may be recognized as a grip or an unintended input and may be disregarded (for example, an input event drop).

According to various embodiments, the electronic device 600 may control a touch input by distinguishing a region of the display 660 where a normal application is executed or the user intentionally inputs a touch event as the main display region 610 (for example, the first region), and distinguishing a region where a user's unintended touch event input occurs relatively easily as the sub display region 620 (for example, the second region). According to various embodiments, when the region of the display 660 includes a flat surface region and a curved region, the electronic device 600 may distinguish between a touch input on the flat surface region and a touch input on the curved region, and may control the touch input.

In various embodiments, it is assumed that a touch event by the user is a touch event inputted to the sub display region 620. For example, it is assumed that a touch event is inputted on a position which is set to a zone (for example, the dead zone 625) which does not receive an input of a touch itself with respect a part close to the bezel to prevent touch malfunction, or is inputted on a zone (for example, the edge zone 627) where an input of a touch itself is insensitively received or processed.

For example, according to a related-art method, when the user performs a touch input operation close to the bezel (for example, the sub display region 620, in particular, the dead zone 625), the electronic device 600 does not provide a function according to the touch input even if the touch input is a user's intended touch input. According to various embodiments, the electronic device 600 may not set the predetermined dead zone 625 (and/or the edge zone 627) as a zone which does not receive a touch input unconditionally, and may determine a component of a user interface on a position (and/or size) of the detected touch input, and may provide a function based on the touch event or may not provide the function.

In various embodiments, the dead zone 625 may indicate a region where a touch is not effective according to a user interface displayed through the display 660, that is, a region where a touch is not effective even when a touch event occurs (for example, a touch blocking region). In various embodiments, the edge zone 627 (including the edge region 620) may be a region which is insensitive to a touch on the display 660 (for example, an insensitive region).

For example, the edge region 620 may be a region which operates in response to a specific input (for example, a tap, a scroll, etc.) under a specific condition. According to an embodiment, the electronic device 600 may include the flat surface region (for example, the main display region 610) and the curved surface region (for example, the sub display region 620) (for example, the left sub display region 621, the right sub display region 622). In addition, in various embodiments, the display 660 of the electronic device 600 may include the dead zone 625 which is an input nonreception region for deleting (removing, unprocessing) a user's unintended touch event.

According to various embodiments, a touch input parameter for processing a touch input in the electronic device 600 may include at least one parameter of a width of the dead zone 625, a width of the curved surface region (for example, the sub display region 620), a position and a size of a touch region when a user's touch event is inputted, or a difference between a length of a long axis and a length of a short axis in the touch region. According to various embodiments, the type of the touch input parameter is merely an example and is not limited thereto.

According to various embodiments, at least some region or an entire region of the sub display region 620 (for example, the edge zone 627, the dead zone 625 in terms of touch) may be set (or adjusted, changed) to a touch blocking region (a touch unprocessing region) or a touch region (a touch-enabled region) in terms of touch. In various embodiments, the touch blocking region may be set to be turned on/off based on at least part or entirety of the edge zone 627 set to allow a touch to be effective under a specific condition, and the dead zone 625 set to allow a touch to be ineffective, which are divided in the sub display region 620.

For example, the touch blocking region may indicate a region in the sub display region 620 that is set to disregard a touch event in order to prevent a touch error caused by a user's unintended touch input. In various embodiments, the touch blocking region may include a region where a touch is not effective (for example, the dead zone 625). Alternatively, the touch blocking region may include a region in the touch insensitive region (for example, the edge zone 627) that is set according to a user interface. For example, the touch blocking region may be set to disregard a corresponding input according to a user interface, even in response to a specific input (for example, a tap, a scroll, etc.) set in the edge zone 627. Hereinafter, it is assumed that the touch blocking region is set in the entire region (for example, the dead zone 625, the edge zone 627) of the sub display region 620, and the touch blocking region is adjusted based on a user interface, for convenience of explanation.

According to various embodiments, the electronic device may set the touch blocking region to a tough region where a touch input is enabled by controlling (or adaptively removing or adjusting) the touch blocking region. According to an embodiment, the electronic device may change the touch blocking region to the touch input-enabled region by removing or adjusting the dead zone 625. According to an embodiment, the electronic device may change the touch blocking region to the touch input-enabled region by removing or adjusting the edge zone 627 and the dead zone 625. According to an embodiment, the electronic device may change the touch blocking region to the touch input-enabled region by removing or adjusting the edge zone 627.

According to various embodiments, the electronic device 600 can exactly filter a user's intended touch event by adjusting the touch blocking region made by the dead zone 625 and the edge zone 627 according to a user interface. According to various embodiments, adjusting the touch blocking region may include changing the touch blocking region to the touch region by removing at least part of the edge zone 627 and/or the dead zone 625 from the touch blocking region, or extending a setting range of the touch blocking region by including a least some region of the other region (for example, the main display region 610) than the touch blocking region in the touch blocking region.

In various embodiments, the dead zone 625 and the edge zone 627 may be adaptively changed according to a user interface displayed on the display 660. For example, as shown in FIG. 6B, based on whether at least some component of a user interface drawn on the display 660 (for example, various objects (for example, an icon, an image, a text, a link, or etc.) included in the user interface, for example, objects 631, 632, 633) is positioned on (or overlap) the sub display region 620 (for example, a region including the dead zone 625 and the edge zone 627, and hereinafter, referred to as the edge region 620 for convenience of explanation), or whether the component (for example, objects 631, 632, 633) is touchable on a corresponding position of the edge region 620, a setting value of the touch blocking region regarding at least part of the edge zone 627 and the dead zone 625 with respect to the corresponding region of the edge region 620 may be changed.

According to an embodiment, if the electronic device 600 includes a narrow bezel 670 region or a curved display as shown in FIGS. 6A and 6B, the user may frequently cause an unintended touch input on the edge region 620 due to the structure of the electronic device when gripping the electronic device 600 with one hand.

A related-art method disregards an inputted touch event based on a touch area or a touch time on the edge region 620 (for example, the dead zone 625, the edge zone 627) in order to solve a touch error problem. However, this may cause a problem that a user's intended touch input on the edge region 620 cannot be processed (for example, the touch is not effective). Various embodiments disclose a method and an apparatus which can exactly filter a user's intended touch event, and transmit the touch event to an application layer, thereby preventing malfunction. For example, according to various embodiment, when a touch input is processed on the edge region 620 (for example, the dead zone 625, the edge zone 627), the touch event by the user may be processed by additionally setting more regions to the touch blocking region in addition to the edge region 620, or by removing a part of the edge region 620 set as the touch blocking region from the touch blocking region, according to a user interface of an application.

According to an embodiment, the electronic device 600 may set the touch blocking region in each edge region 621, 622 differently according to a shape of a user interface provided on the left edge region 621 and the right edge region 622. According to an embodiment, the electronic device 600 may set at least some region of the touch blocking region in the edge region 620 as an exception region, according to a user interface specified to the edge region 620.

Figure 6C:
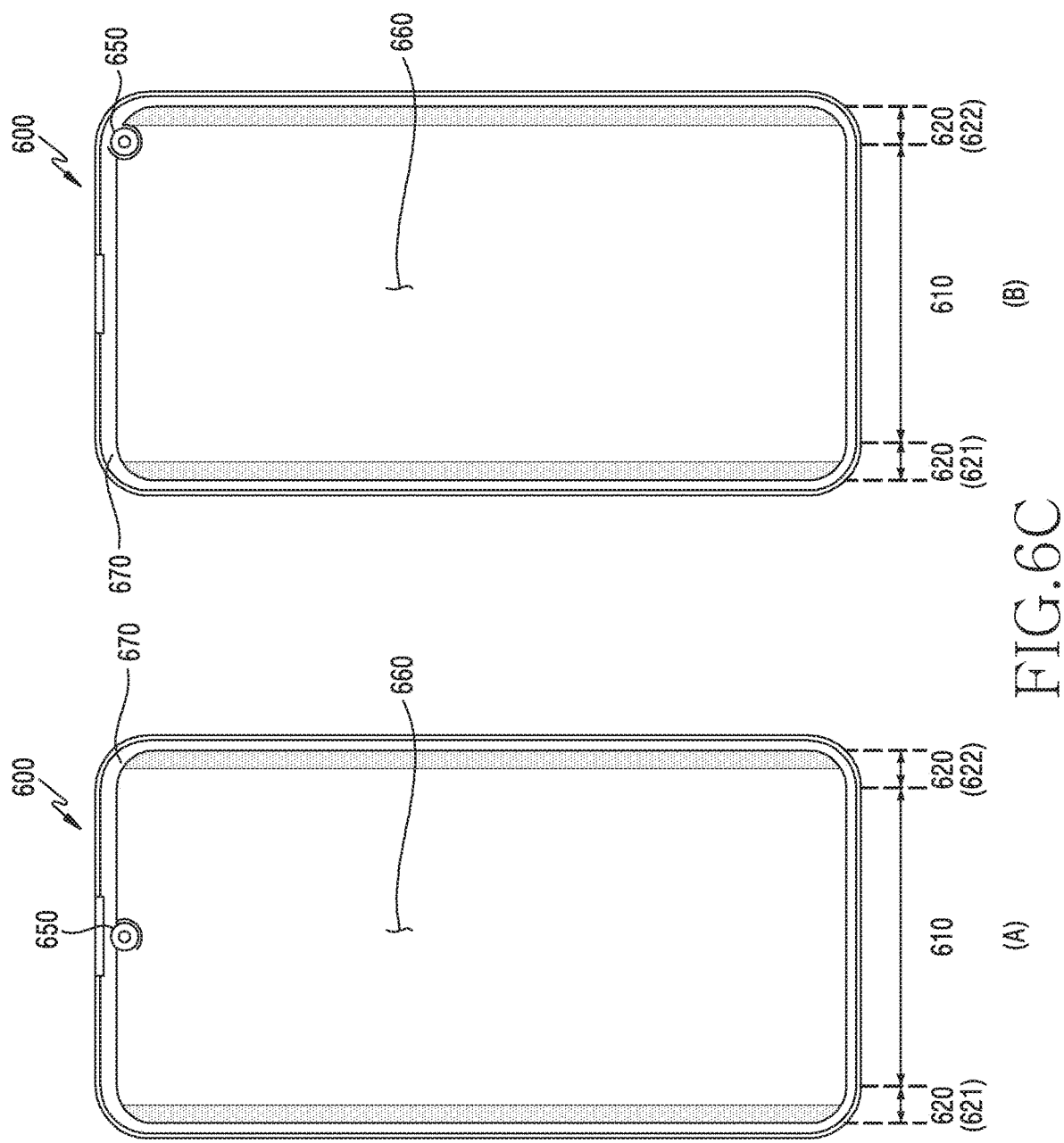
FIGS. 6C, 6D, and 6E are views illustrating another example of an electronic device according to various embodiments of the present disclosure.
Figure 6D:
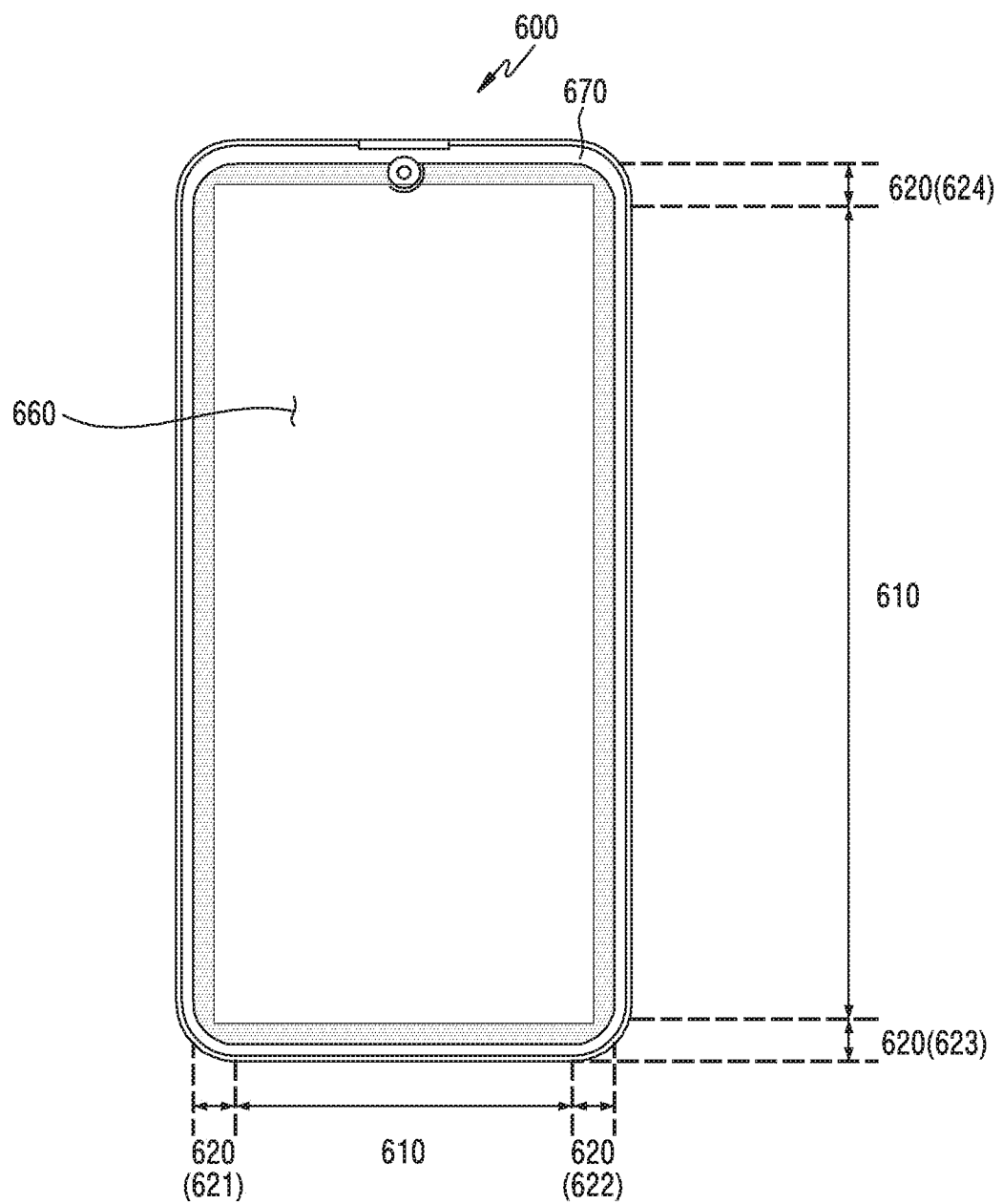
Figure 6E:
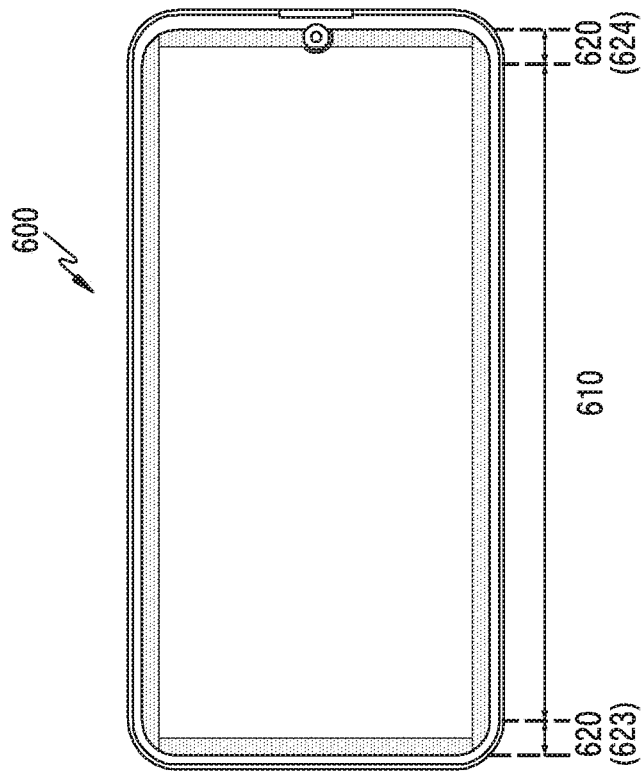
Figure 6E:
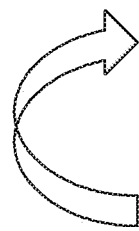
Figure 6E:
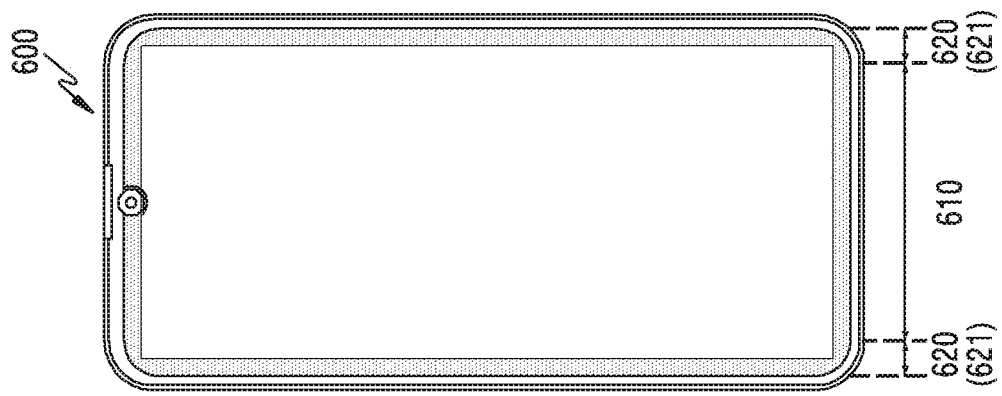

FIGS. 6C, 6D, and 6E are views illustrating another example of the electronic device according to various embodiments of the present disclosure.

For example, FIGS. 6C, 6D, and 6E illustrate an example of an electronic device 600 of a different form (for example, the electronic device 101 of FIG. 1, the electronic device 201 of FIG. 2) having a curved display (or a flexible display). For example, the electronic device 600 illustrated in FIGS. 6C, 6D, and 6E may have a narrower bezel region that that of the electronic device 600 illustrated in FIGS. 6A and 6B, and the front surface of the electronic device 600 may be implemented by the display 660. For example, the electronic device 600 illustrated in FIGS. 6C, 6D, and 6E may be an electronic device implemented in the form of a front facing display.

The electronic device 600 may have a camera 650 (for example, a front facing camera) positioned on the region of the display 660. For example, example <A> of FIG. 6C illustrates that the camera 650 is positioned on the center of the upper end of the electronic device 600, and example <B> of FIG. 6C illustrates that the camera 650 is positioned on a side surface of the upper end (for example, a right upper end) of the electronic device 600. However, this should not be considered as limiting, and the electronic device according to various embodiments may be implemented by using various displays, and arrangements of other devices such as a front facing camera may be designed according to a display coupling structure.

As shown in FIGS. 6C and 6D, the electronic device 600 may include the main display region 610 and the sub display region 620 (or the edge region) (for example, the left sub display region 621, the right sub display region 622, the upper sub display region 624, the lower sub display region 623) which is extended from the main display region 610, is bent toward at least one side surface (for example, the left side surface, the right side surface, the upper side surface, or the lower side surface) of the housing (or bezel) 670, and appears on the side surface of the housing 670, as described above with reference to FIGS. 6A and 6B. In various embodiments, the main display region 610 and the sub display region 620 are distinguished from each other for convenience of explanation, and do not mean as being physically divided.

In various embodiments, FIG. 6C illustrates an example in which the display 660 of the electronic device 600 is extended to the left side surface and the right side surface of the electronic device 600, and is coupled to the side surfaces (for example, both side surfaces) of the housing 670 (or bezel). For example, the sub display region 620 (for example, the left sub display region 621, the right sub display region 622) is configured on both side surfaces from the main display region 610.

In various embodiments, FIG. 6D illustrates an example in which the display 660 of the electronic device 600 is extended to the left side surface, right side surface, upper side surface or lower side surface of the electronic device 600, and is coupled to at least part of the side surface (for example, upper, lower, left, or right side surface) of the housing 670 (or bezel). For example, the sub display region 620 (for example, the left side sub display region 621, the right sub display region 622) (for example, the first sub display region) may be configured on the left and right side surfaces from the main display region 610, and the sub display region 620 (for example, the upper sub display region 624, the lower sub display region 623) (for example, the second sub display region) may be configured on the upper and lower side surfaces. In various embodiments, the display 660 of the electronic device 600 may be extended to at least one side surface (for example, at least one surface of the left, right, upper, or lower side surface), and may configure one or more sub display regions 620 (for example, 621, 622, 623, 624) according to an implementation form of the display 660. In various embodiments, the touch blocking region may be adjusted based on the four surfaces of the electronic device 600 (for example, the sub display region 620 on the left side surface, right side surface, upper side surface, or lower side surface).

As shown in FIG. 6E, the electronic device 600 may distinguish between the first sub display region 620 (for example, 621, 622) and the second sub display region 620 (for example, 623, 624) according to an operation mode (for example, a landscape mode or a portrait mode) of the electronic device 600, and may operate. For example, the electronic device 600 of FIGS. 6D and 6E may be an electronic device having an upper, lower, left, or right flexible display, or an electronic device which form displays (for example, the sub display region 620) on all of the upper, lower, left, and right side surfaces, and does not have a bezel or has a narrower bezel. In various embodiments, when the electronic device 600 operates in the portrait mode, the touch blocking region may be adjusted based on the first sub display region 620 (for example, 621, 622), and, when the electronic device 600 operates in the landscape mode, the touch blocking region may be adjusted based on the second sub display region 620 (for example, 623, 624). For example, the shape of user's hand gripping the electronic device 600 may vary according to an operation mode of the electronic device 600, and the sub display regions 620 and the touch blocking region corresponding thereto may be implemented according to the operation mode of the electronic device 600.

Figure 6F:
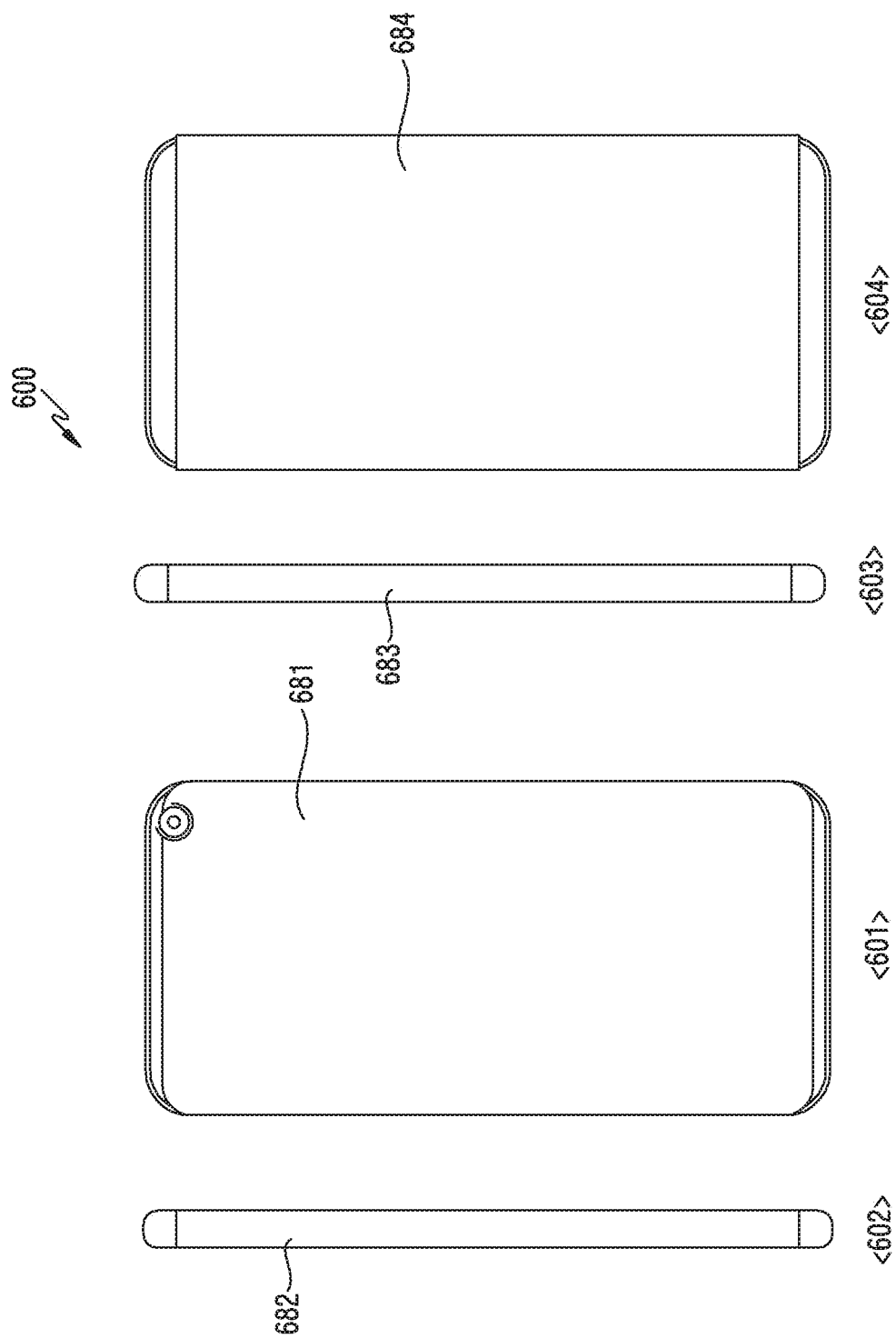
FIGS. 6F, 6G, and 6H are views illustrating still another example of an electronic device according to various embodiments of the present disclosure.
Figure 6G:
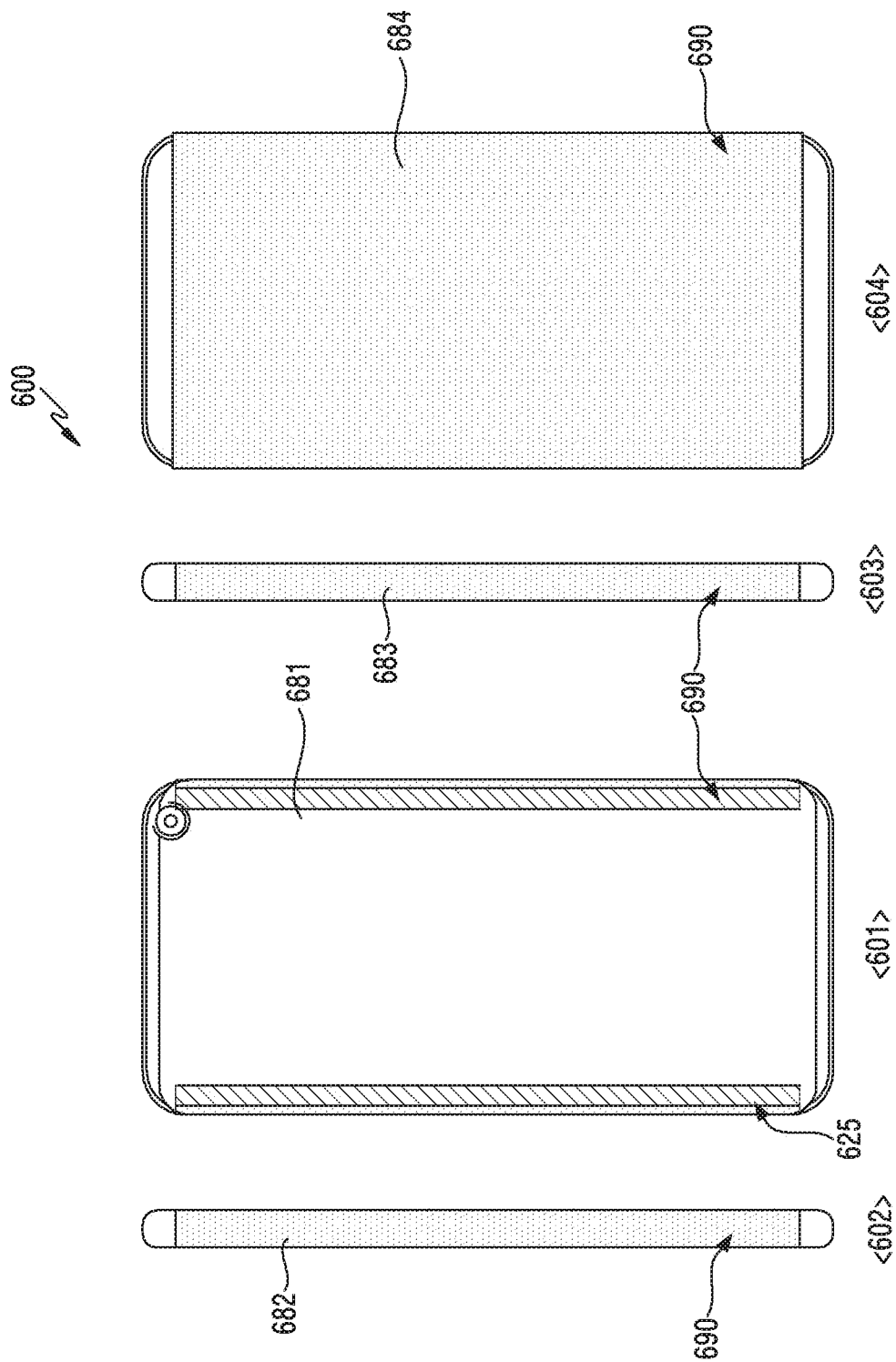
Figure 6H:
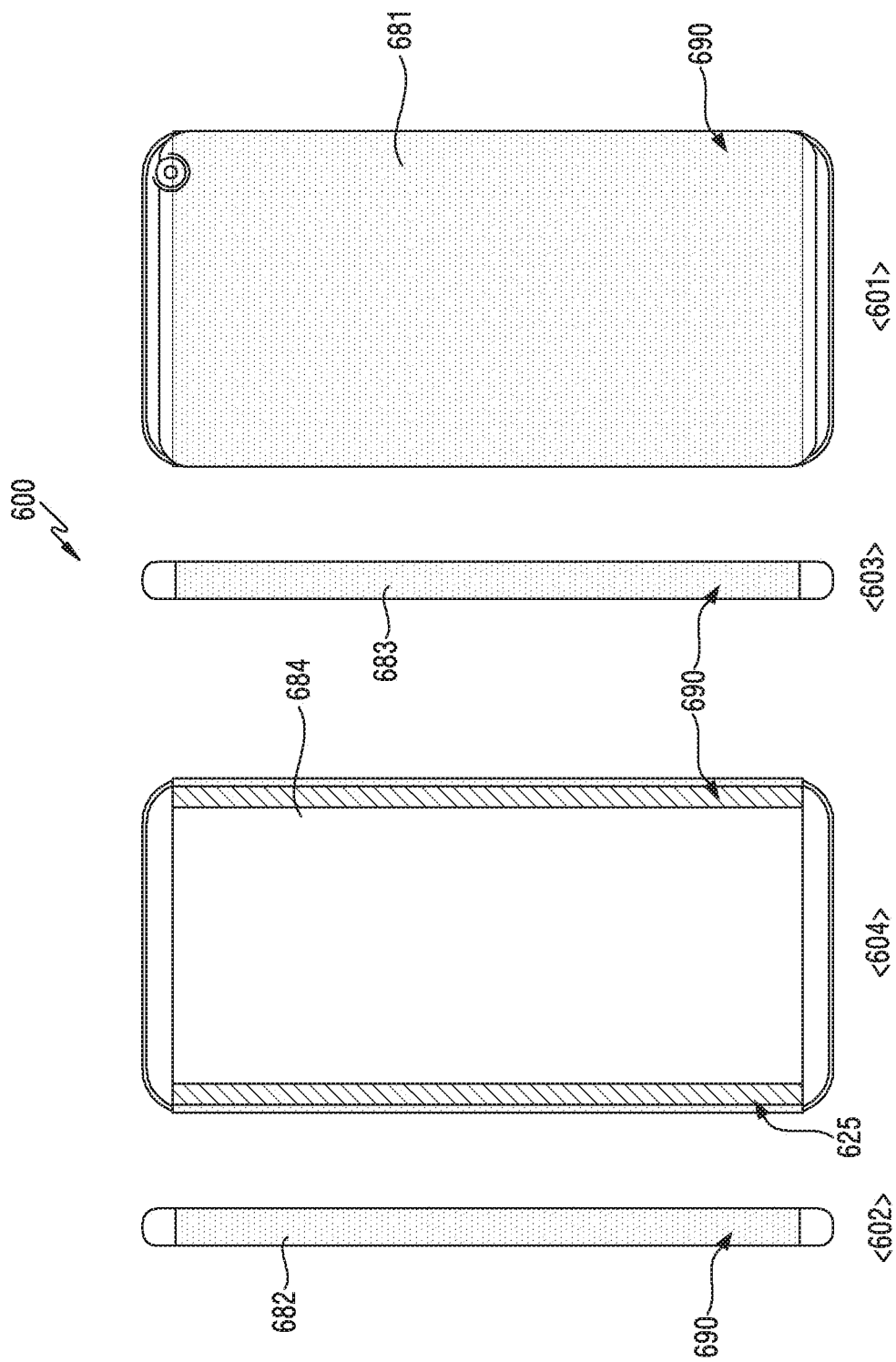

FIGS. 6F, 6G, and 6H are views to illustrate still another example of the electronic device according to various embodiments of the present disclosure.

For example, FIGS. 6F, 6G, and 6H illustrate an example of an electronic device 600 of a different form (for example, the electronic device 101 of FIG. 1, the electronic device 201 of FIG. 2) having a curved display (or a flexible display). For example, the electronic device 600 illustrated in FIGS. 6F, 6G, and 6H may be an example of an electronic device which has a display extended to a rear side surface of the electronic device 600 and has at least three surfaces (for example, a front side surface, a left side surface, a right side surface, a rear side surface, an upper side surface, or a lower side surface) implemented as a display. The electronic device 600 illustrated in FIGS. 6F, 6G, and 6H may be an electronic device (for example, a 4D sided wrap around display) having at least four surfaces (for example, a front side surface, a left side surface, a right side surface, a rear side surface, an upper side surface, or a lower side surface) surrounded by a display. However, this should not be considered as limiting, and the electronic device according to various embodiments may be implemented by using various displays (for example, a 3D sided wrap around display or the like).

As shown in FIG. 6F, the electronic device 600 may include a first display region 681 of a first surface 601 (for example, a front side), a second display region 682 of a second surface 602 (for example, a left side), a third display region 683 of a third surface 603 (for example, a right side), and a fourth display region 684 of a fourth surface 604 (for example, a rear side). In various embodiments, the first display region 681, the second display region 682, the third display region 683, and the fourth display region 684 are distinguished from one another for convenience of explanation, and do not mean as being physically divided. This should not be considered as limiting, and the electronic device 600 according to various embodiments may have the first display region 681, the second display region 682, the third display region 683, and the fourth display region 684 implemented as independent displays, for example, as physically divided displays.

As shown in FIGS. 6G and 6H, the electronic device 600 may distinguish between the display regions according to an operation mode of the electronic device 600 (for example, a front mode (FIG. 6G), or a rear mode (FIG. 6H)).

As shown in FIG. 6G, in the front mode, the electronic device 600 may use the first display region 681 of the first surface 601 (for example, the front side) as a main display region, and may use at least one of the second display region 682 of the second surface 602 (for example, the left side), the third display region 683 of the third surface 603 (for example, the right side), and the fourth display region 684 of the fourth surface 604 (for example, the rear side) as a sub display region. According to various embodiments, in the front mode, the electronic device 600 may set at least part (for example, both side surfaces) of the first display region 681, and all of the second display region 682, the third display region 683, and the fourth display region 684 as touch blocking regions. According to an embodiment, the electronic device 600 may set a part of an edge region of the first display region 681 as a dead zone 690 as described above, and may set all of the second display region 682, the third display region 683, and the fourth display region 684 as dead zones 690. According to various embodiments, the electronic device 600 may change the touch blocking region of the main display region according to a user interface drawn based on the main display region (for example, the first display region 681).

As shown in FIG. 6H, in the rear mode, the electronic device 600 may use the fourth display region 684 of the fourth surface 604 (for example, the rear side) as a main display region, and may use at least one of the second display region 682 of the second surface 602 (for example, the left side), the third display region 683 of the third surface 603 (for example, the right side), and the first display region 681 of the first surface 601 (for example, the front side) as a sub display region. According to various embodiments, in the rear mode, the electronic device 600 may set at least part (for example, both side surfaces) of the fourth display region 684, and all of the second display region 682, the third display region 683, and the first display region 681 as touch blocking regions. According to an embodiment, the electronic device 600 may set a part of an edge region of the fourth display region 684 as a dead zone 690 as described above, and may set all of the second display region 682, the third display region 683, and the first display region 684 as dead zones 690. According to various embodiments, the electronic device 600 may change the touch blocking region of the main display region according to a user interface drawn based on the main display region (for example, the fourth display region 684).

As shown in FIGS. 6G and 6H, a position of the electronic device 600 gripped by the user and the shape of user's hand gripping may vary according to an operation mode of the electronic device 600. In various embodiments, a touch blocking region may be set differently according to an operation mode of the electronic device 600, and the touch blocking region may be changed based on a user interface on the main display region.

Figure 7A:
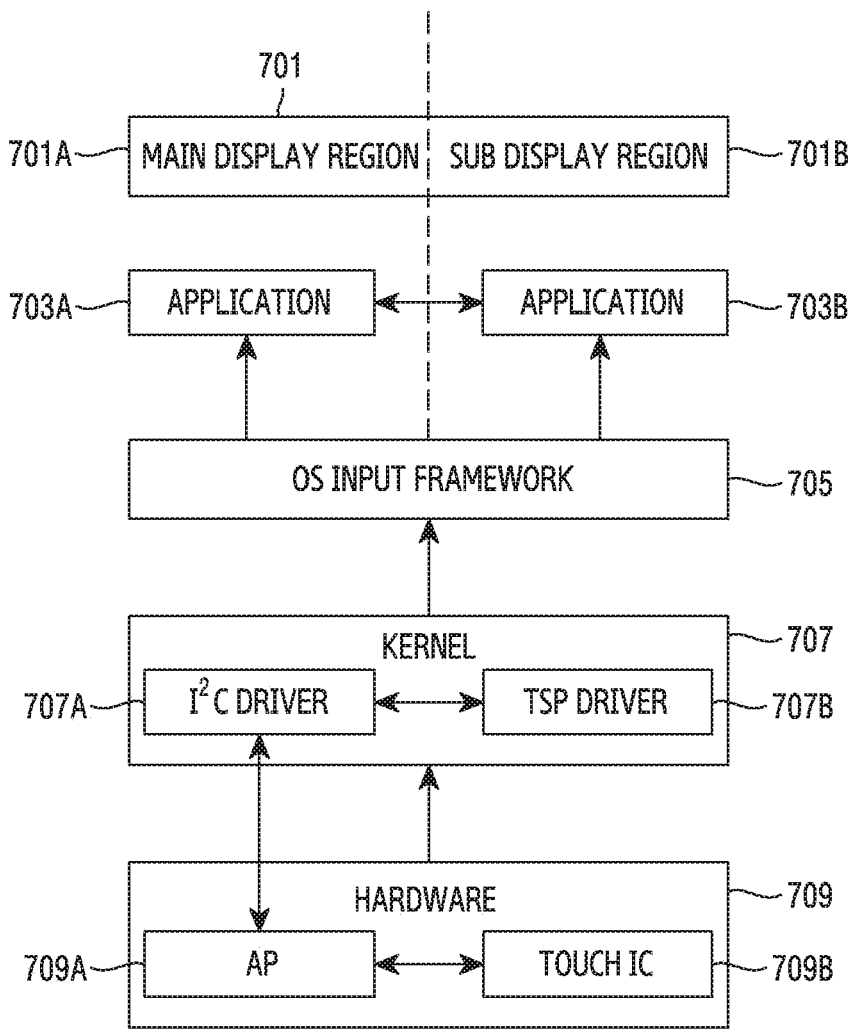
FIG. 7A is a view illustrating an inner structure of an electronic device which processes a touch input according to various embodiments of the present disclosure.

FIG. 7A is a view illustrating an inner structure of an electronic device which processes a touch input according to various embodiments of the present disclosure.

Referring to FIG. 7A, the electronic device may include a display 701 supporting a touch function, and hardware 709 for processing a touch input. According to various embodiments, the electronic device may include various layers on a kernel 707 (for example, the kernel 141) to process the touch input. For example, an OS input framework 705, an application 703A, 703B, or the like may be included in the electronic device.

According to various embodiments, the display 701 may be divided into a main display region 701A and a sub display region 701B. The display 701 may be divided into a first region which is a region where a normal application is executed or a user intentionally inputs a touch event, and a second region which is a region where a user's unintended touch event input occurs relatively easily. Dividing as described above is merely an example, and the display 701 may include the first region and the second region which are functionally distinguished from each other. For example, the display 701 may have the first region which has a flat surface, and the second region which is functionally distinguished from (may be physically connected with) the first region, and has a curved surface extended from the first region. In various embodiments, the first region may correspond to the main display region 701A, and the second region may correspond to the sub display region 701B.

In various embodiments, a touch IC 709B may recognize a touch event occurring on the display 701, and may determine a point (coordinates) where the touch event occurs. The touch IC 709B may determine the occurrence point of the corresponding touch event based on a change in capacitance of a touch panel. For example, the touch IC 709B may be understood as a kind of determination module, and the determination module may determine an occurrence point of an event occurring on a touch panel using a resistive or optical method (for example, an infrared ray method, an ultrasonic method) in addition to a capacitive method. According to an embodiment, the touch IC 709B may receive an input (for example, a gesture, short-range communication, long-range communication data, a speech signal) for determining display coordinates through the module illustrated in FIG. 2, and may determine the occurrence point of the event.

In various embodiments, the touch IC 709B may transmit the touch event (for example, a touch signal) to the kernel 707 in a method such as interrupt through an application processor (AP) 709A. In various embodiments, the AP 709A may be understood as a kind of processing module. The AP 709A may control and process various operations performed in the electronic device. According to an embodiment, when the AP 709A is provided in the form of a system on chip (SoC), the AP 709A may perform graphic processing (for example, a GPU function) and/or communication function (for example, a function of a communication processor (CP)), in addition to an arithmetic operation.

In various embodiments, the AP 709A may determine whether the occurrence point of the touch event corresponds to the main display region 701A or the sub display region 701B, based on the point (coordinates) where the touch event occurs. The AP 709A may include information according to the result of determining, and may provide the touch event to a touch input management module included in the OS input framework 705.

In various embodiments, the touch event received through an I²C driver 707A may be transmitted to the OS input framework 705 (for example, an Android input framework) through a TSP driver 707B. The TSP driver 707B or the touch input management module included in the OS input framework 705 may determine a method for processing the touch event received from the AP 709A as described above with reference to FIG. 4A. Thereafter, the TSP driver 707B or the touch input management module included in the OS input framework 705 may determine whether to store the touch event, to process by deleting by itself, or to transmit the touch event to the application 703A, 703B, according to the determined processing method.

In various embodiments, the application 703A may be executed on the main display region 701A, and the application 703B may be executed on the sub display region 701B. In addition, the application 703A and the application 703B may be different applications, and one application may support a different form or function and the applications may be performed on respective regions. For example, in the case of a video replay application, a video screen (for example, corresponding to the application 703A) may be replayed on the main display region 701A, and a control menu (for example, a list, previous, next, pause, play, mute, or the like) (for example, corresponding to the application 703B) for controlling play/volume may be outputted to the sub display region 701B. In this case, in various embodiments, in response to a touch event inputted to the main display region 701A and/or the sub display region 701B, it may be determined whether the touch event is a user's intended touch event or not by filtering, and a result of determining may be transmitted to the application 703A and/or the application 703B, such that touch malfunction caused by user's unintended touch event can be prevented.

Figure 7B:
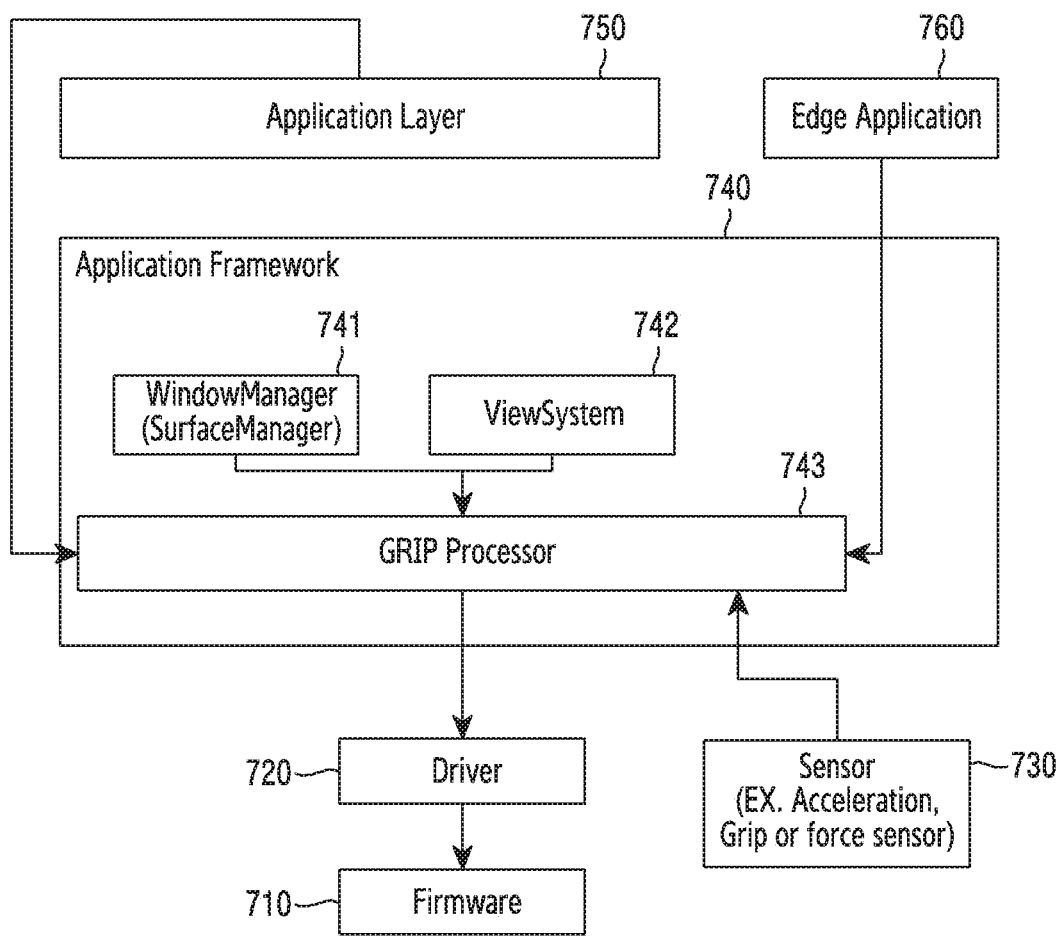
FIGS. 7B and 7C are views illustrating an operation of processing a touch input in the electronic device according to various embodiments of the present disclosure.
Figure 7C:
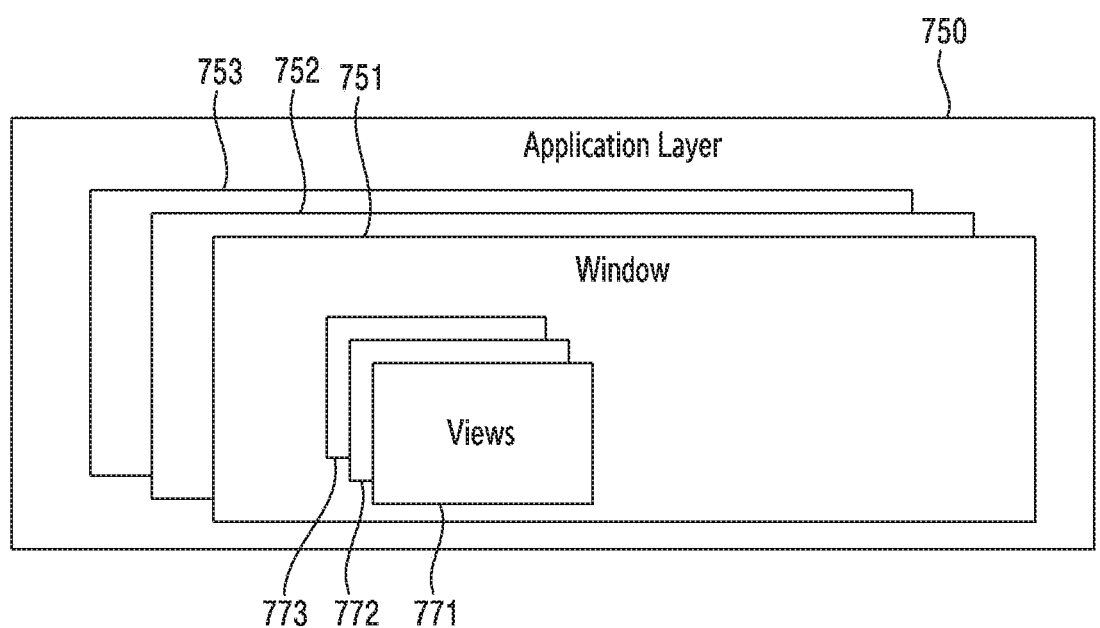

FIGS. 7B and 7C are views to illustrate an operation of processing a touch input in an electronic device according to various embodiments of the present disclosure.

As shown in FIG. 7B, FIG. 7B is a view to illustrate an example of a framework or a platform of the electronic device, for performing operations according to various embodiments. The framework of the electronic device may include an entirety or a part of the program module 310 of the electronic device illustrated in FIG. 3.

Referring to FIG. 7B, the electronic device (for example, the electronic device 101, 201) may include firmware 710, a driver 720, a sensor 730, an application framework 740, an application layer 750, and an edge application 760.

The firmware 710 may include a basic program for controlling hardware. For example, the firmware 710 may perform at least part of functions executed by software or hardware in the electronic device.

The driver 720 may be included in a kernel (for example, the kernel 141). The driver 720 may include a device driver which provides a network interface and various hardware interfaces, in addition to a core system service supporting multitasking and processing memory management and process execution and management. For example, the driver 720 may include various drivers such as a display driver, a camera driver, a keypad driver, a USB driver, a Bluetooth driver, a binder (IPC) driver, audio drivers, or the like.

The sensor 730 may include, for example, an entirety or a part of the sensor module 240 illustrated in FIG. 2. According to an embodiment, the sensor 730 may include an acceleration sensor, a pressure sensor, or a grip sensor.

The application framework 740 may indicate a set of services forming an environment where an application of the electronic device is executed and managed. According to an embodiment, the concept that applications of the electronic device are configured by components which can be reused, can mutually operate and can be replaced may be implemented in the application framework 740. The application framework 740 may include, for example, an entirety or a part of the middleware 330 illustrated in FIG. 3. According to various embodiments, the application framework 740 may include a window manager 741 (for example, the window manager 342 of FIG. 3), a view system 742, and a grip processor 743.

The window manager 741 may manage a window seen on the screen of the electronic device. The window manager 741 may be, for example, an abstraction module regarding a surface manager of a library (not shown). In various embodiments, the window manager 741 may divide the window seen on the screen, and may change setting of a touch blocking region of the edge region 620 according to a value set in the window. According to an embodiment, the window manager 741 may process a region in the touch blocking region that corresponds to the window into an exception region where a touch is effective.

The view system 742 may indicate a set of extendable views which are used to generate a user interface of an application. According to an embodiment, the view system 742 may provide components of a user interface, such as a button, a list, or the like, and may manage event dispatching, layout, drawing, or the like. In various embodiments, the view system 742 may calculate a position and a size of a view, and may change setting of the touch blocking region when the view overlaps the touch blocking region of the edge region 620. According to an embodiment, the view system 742 may process at least some region of the touch blocking region that corresponds to a view into an exception region where a touch is effective.

The grip processor 743 may determine a grip state (for example, a grip intensity, etc.) of the electronic device, and may store a grip region where the grip occurs. The grip processor 743 may set a periphery region of a predetermined range around the grip region as a touch blocking region. According to an embodiment, the grip processor 743 may store information (for example, a touch event) transmitted from at least one of the window manager 741, the edge application 760, or the sensor 730. According to an embodiment, the grip processor 743 may set the periphery region of the predetermined range around the grip region as the touch blocking region, based on priorities of the respective pieces of information transmitted from the window manager 741, the edge application 760, or the sensor 730.

The application layer 750 may use the subordinate kernel or system library through the application framework 740. The application layer 750 may include, for example, an entirety or a part of the application 370 illustrated in FIG. 3. According to an embodiment, the application layer 750 may include the edge application 760. The edge application 760 may process a function of a user interface specified for the edge region 620.

As shown in FIG. 7C, FIG. 7C is a view illustrating an example of a block of the application layer 750 of FIG. 7B. For example, FIG. 7C illustrates examples of components of the respective applications of the application layer 750.

Referring to FIG. 7C, the applications may be provided through a plurality of windows 751, 752, 753. The windows 751, 752, 753 may overlap one another according to the Z-order. Each of the windows 751, 752, 753 may include one or more views 771, 772, 773.

As described above, an electronic device according to various embodiments may include: a display (for example, the display 160, 260) configured to display a user interface; a memory (for example, the memory 230); and a processor (for example, the processor 120, 210) functionally connected with the display and the memory. The processor may be configured to: set a touch blocking region in an edge region of the display; determine an exception region in the touch blocking region, based on the user interface; set a final touch blocking region by removing the determined exception region from the touch blocking region; and process a touch event on the edge region, based on the final touch blocking region.

According to various embodiments, the touch blocking region may be a region that operates in the edge region and may not process a touch event.

According to various embodiments, the processor may be configured to: identify a setting value for a touch blocking region set by an application in response to a screen change; when the setting value exists, set the touch blocking region based on the setting information; and, when the setting value does not exist, set the touch blocking region based on a default setting value.

According to various embodiments, the processor may be configured to determine the exception region in the set touch blocking region, based on at least part of a position or a size of a component of the user interface or whether the component is touchable; and, According to various embodiments, the processor may be configured to remove a region set in an edge application for the edge region from the touch blocking region.

According to various embodiments, the processor may be configured to, when the component receives a touch input and overlaps the touch blocking region of the edge region, process a region in the touch blocking region that corresponds to the component into the exception region.

According to various embodiments, the processor may be configured to implement a touch blocking region differently according to each edge region, according to a form of a user interface provided to a plurality of edge regions.

According to various embodiments, the processor may be configured to: obtain sensor information based on a sensor; and, when the sensor information exceeds a threshold value, increase a range of the touch blocking region.

According to various embodiments, the processor may be configured to, when the electronic device detects a touch event in a grip state of the electronic device, operate a predetermined periphery region with reference to a grip region as a touch blocking region.

According to various embodiments, the processor (or firmware 710) may be configured to; determine whether the touch event is included in the periphery region; and, when the touch event is included in the periphery region, drop the touch event by the touch blocking region.

Figure 8:
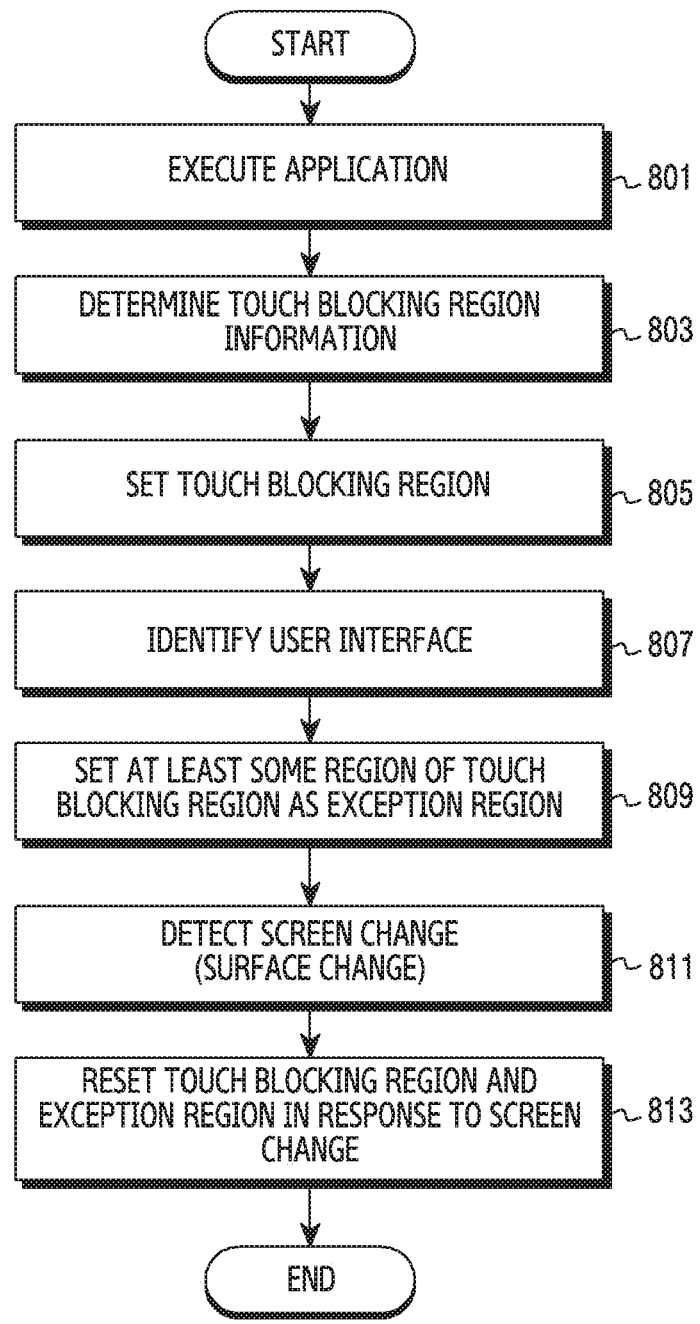
FIG. 8 is a flowchart illustrating an operation method of an electronic device according to various embodiments of the present disclosure.

FIG. 8 is a flowchart illustrating an operation method of an electronic device according to various embodiments of the present disclosure. For example, FIG. 8 illustrates an example to illustrate an operation of setting or extending a touch blocking region in a touch region or a touch-disabled region of a display, when processing a touch input in an electronic device according to various embodiments.

Referring to FIG. 8, in operation 801, a processor (for example, the processor 120, 210 of FIG. 1 or 2, hereinafter, referred to as the processor 210) of the electronic device may execute an application. For example, the processor 210 may execute a specific application based on a user input, and may display a relevant execution screen through the display (for example, the display 160, 260 of FIG. 1 or 2, hereinafter, referred to as the display 260).

In operation 803, the processor 210 may determine information of a touch blocking region based on the application. For example, the processor 210 may determine whether the corresponding application is an application using an edge region based on the type of the application, or may determine setting information of a touch blocking region in an edge region predetermined by the application.

In operation 805, the processor 210 may set a touch blocking region where a touch event is disregarded, based on the touch blocking region information determined in operation 803.

In operation 807, the processor 210 may identify a user interface of the application. According to an embodiment, the processor 210 may identify a component of the user interface configuring the screen currently displayed through the display 260. According to various embodiments, the processor 210 may determine a component positioned on the edge region from among various components of the user interface, and may determine whether a touch is enabled by the corresponding component.

In operation 809, the processor 210 may set at least part of the touch blocking region as an exception region, based on the user interface. For example, with respect to the touch blocking region set as default based on the application, the processor 210 may reset a touch blocking region based on the user interface. According to an embodiment, the processor 210 may remove at least some region of the edge region from the touch blocking region in response to the user interface. According to various embodiments, the processor 210 may set the at least some region as the exception region of the touch blocking region. According to an embodiment, the processor 210 may set a region in the touch region where a component requiring a touch is positioned, as the exception region, for example, may remove the region from the touch blocking region. According to various embodiments, the processor 210 may set at least some region of the other region (for example, a main display region) except for the touch blocking region, as an additional region of the touch blocking region, based on the user interface. According to an embodiment, the processor 210 may additionally set a position of a region or a component which does not require a touch as the touch blocking region.

In operation 811, the processor 210 may detect a screen change. For example, the processor 210 may detect a change (for example, a surface change) of the screen currently displayed. According to various embodiments, the screen change may include a change of the currently displayed screen due to, for example, execution of an application, a change of an application, a page change, or a scroll. According to various embodiments, the screen change may include a change of the position of the component of the user interface.

In operation 813, the processor 210 may reset the touch blocking region and the exception region in response to the screen change being changed. For example, the processor 210 may perform the operation of setting an exception region in the touch blocking region based on a user interface displayed according to the screen change, as described above with reference to operation 809.

Figure 9:
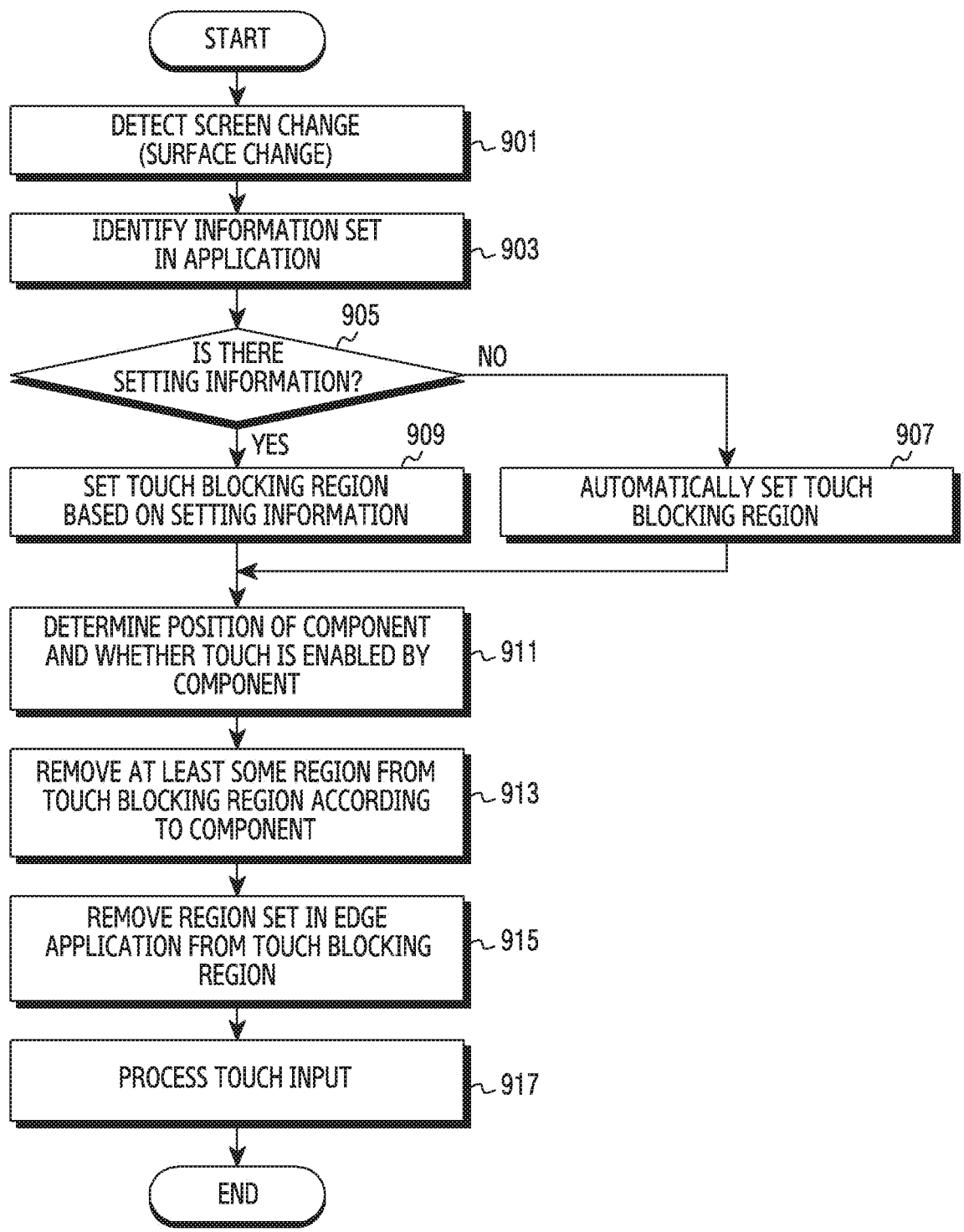
FIG. 9 is a flowchart illustrating an operation method of processing a touch input based on a touch blocking region in an electronic device according to various embodiments of the present disclosure.

FIG. 9 is a flowchart illustrating an operation method of an electronic device according to various embodiments of the present disclosure. For example, FIG. 9 may illustrate an example of an operation of processing a touch input in an electronic device according to various embodiments.

Referring to FIG. 9, in operation 901, the processor 210 of the electronic device may detect a screen change. For example, the processor 210 may detect a change (for example, a surface change) of the screen displayed on the display 260. The screen change may include a change of the currently displayed screen due to, for example, execution of an application, a change of an application, a page change, or a scroll. According to various embodiments, the screen change may include a change of a position of a component position of a user interface.

In operation 903, the processor 210 may identify information set in the application. For example, the processor 210 may determine setting information of a touch blocking region set with respect to an edge region by the application. According to an embodiment, the application may have setting information regarding whether at least part (for example, an upper, lower, left, or right part) of the edge region is used, or whether the used edge region is set as a touch blocking region. For example, when being executed, the application may display the edge region and may set whether a touch can be inputted through the edge region, based on the setting information.

In operation 905, the processor 210 may determine whether setting information by the application exists or not. For example, the processor 210 may determine whether setting information exists in the corresponding application, based on the result of identifying the information in operation 903.

When it is determined that the setting information does not exist in operation 905 (No in operation 905), the processor 210 may automatically set a touch blocking region in operation 907. For example, the processor 210 may set the touch blocking region according to default information. According to an embodiment, the processor 210 may set the edge region (for example, an upper, lower, left, or right region) as the touch blocking region. According to an embodiment, the processor 210 may set the touch blocking region according to an operation mode (for example, a landscape mode, a portrait mode, a front mode, a rear mode, etc.) of the electronic device. The processor 210 may set the touch blocking region, and may proceed to operation 911 to perform operations after operation 911.

When it is determined that the setting information exists in operation 905 (Yes in operation 905), the processor 210 may set a touch blocking region based on the setting information of the application in operation 909. For example, the processor 210 may set an entire region or some region of the edge region as the touch blocking region, based on the setting information of the application. The processor 210 may set the touch blocking region, and may proceed to operation 911 to perform operations after operation 911.

In operation 911, the processor 210 may determine a position of a component and determine whether a touch is enabled by the component. For example, the processor 210 may identify a user interface of the application. According to an embodiment, the processor 210 may identify a component of a user interface configuring the screen currently displayed through the display 260. The processor 210 may determine a component positioned on the edge region from among the various components of the user interface, and determine whether a touch is enabled by the corresponding component.

In operation 913, the processor 210 may remove at least some region of the touch blocking region in the edge region from the touch blocking region, based on the component of the edge region. For example, the processor 210 may set at least part of the touch blocking region as an exception region, based on the user interface. For example, the processor 210 may reset a touch blocking region (for example, a second touch blocking region) based on the user interface, with respect to the touch blocking region (for example, a first touch blocking region) set by the application or automatically set. According to an embodiment, the processor 210 may set a region in the edge region where a component requiring a touch is positioned, as an exception region, for example, may remove the corresponding region from the touch blocking region. According to various embodiments, the processor 210 may set at least some region of the other region (for example, a main display region) except for the touch blocking region, as an additional region of the touch blocking region, based on the user interface. According to an embodiment, the processor 210 may additionally set a position of a region or a component that does not require a touch, as the touch blocking region.

In operation 915, the processor 210 may remove a region that is set by an edge application in the edge region from the touch blocking region. For example, the edge application may operate independently from the currently executed application, and may receive a touch input based on the edge region. Accordingly, the processor 210 may remove some region in the edge region set as the touch blocking region from the touch blocking region according to setting of the edge application, and may set the corresponding region as an exception region.

In operation 917, the processor 210 may process a touch input. For example, the processor 210 may disregard a touch event on the touch blocking region, and may process a touch event on the other region except for the touch blocking region.

FIGS. 10A, 10B, 11, and 12 are views illustrating an example of setting a touch blocking region in an electronic device according to various embodiments of the present disclosure.

Figure 10A:
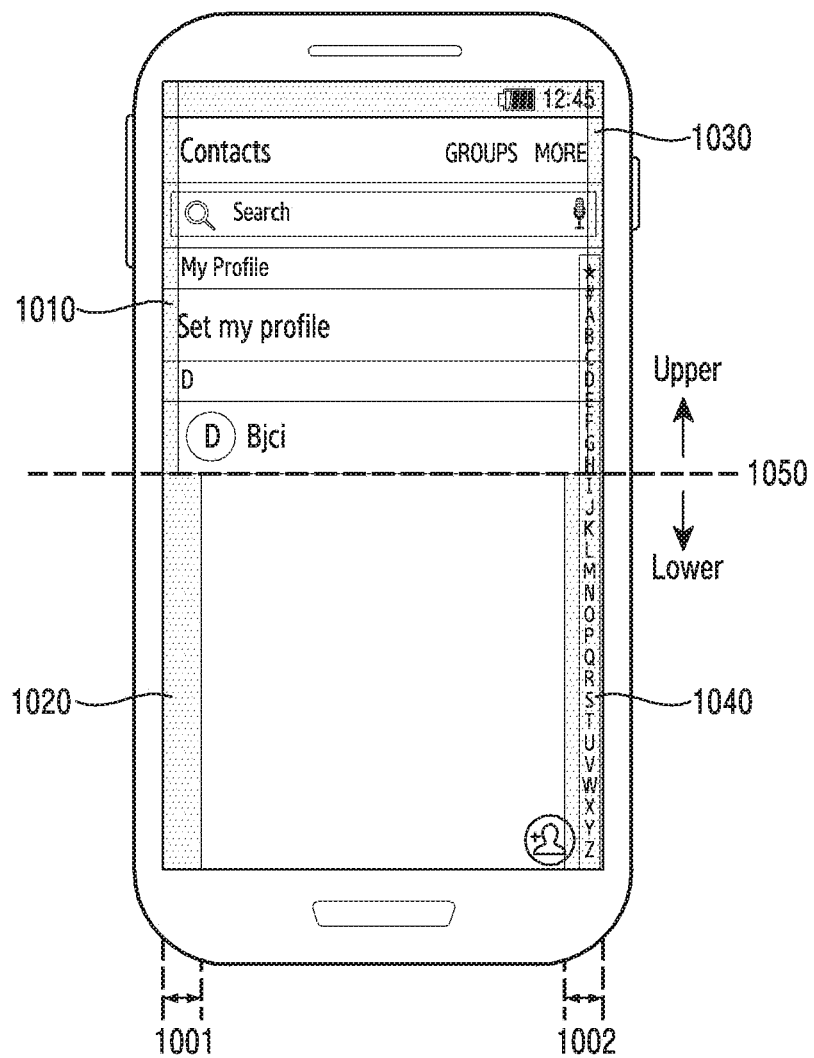
FIGS. 10A, 10B, 11, and 12 are views illustrating an example of setting a touch blocking region in an electronic device according to various embodiments of the present disclosure.
Figure 10B:
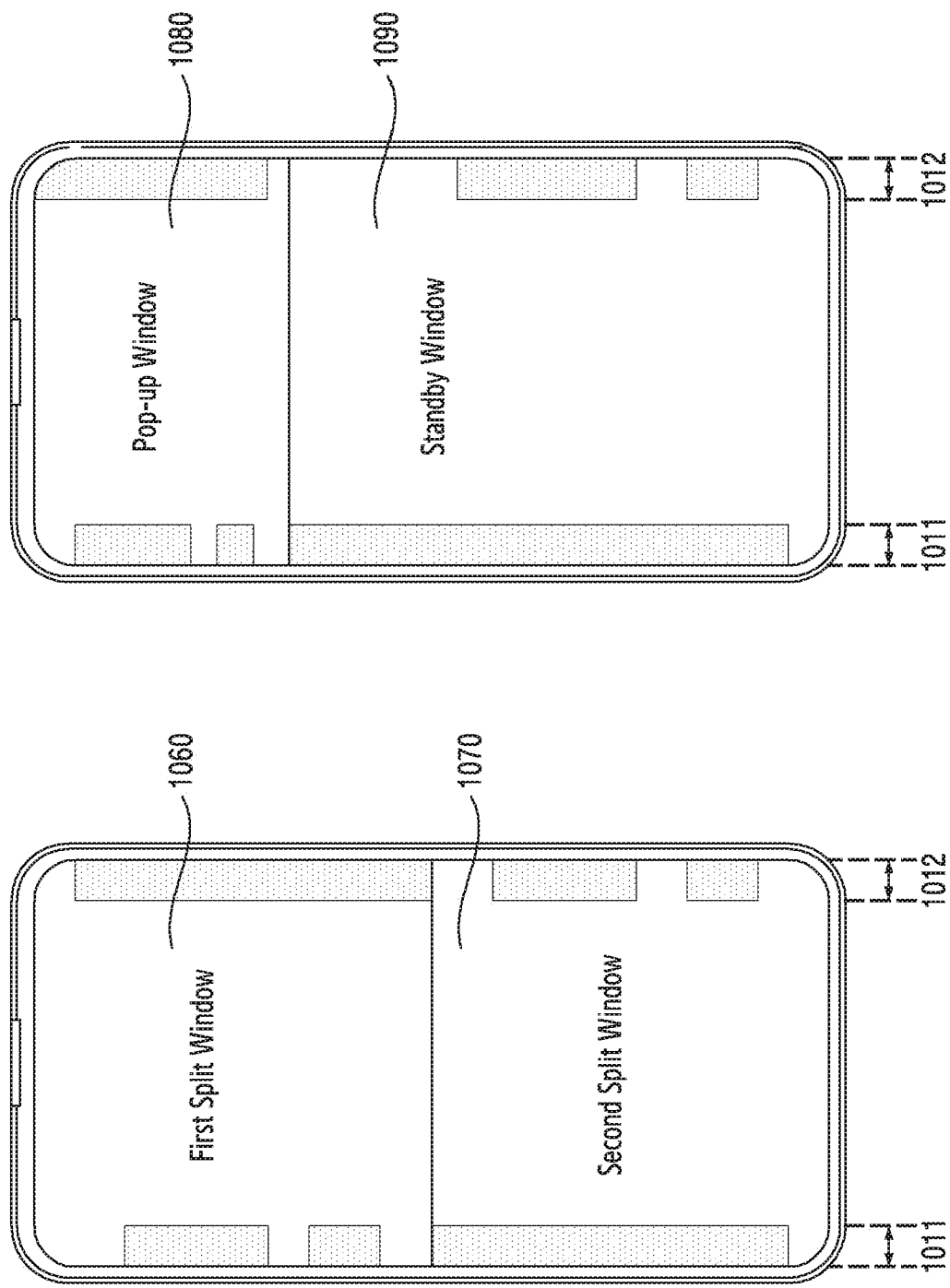
Figure 11:
Figure 12:
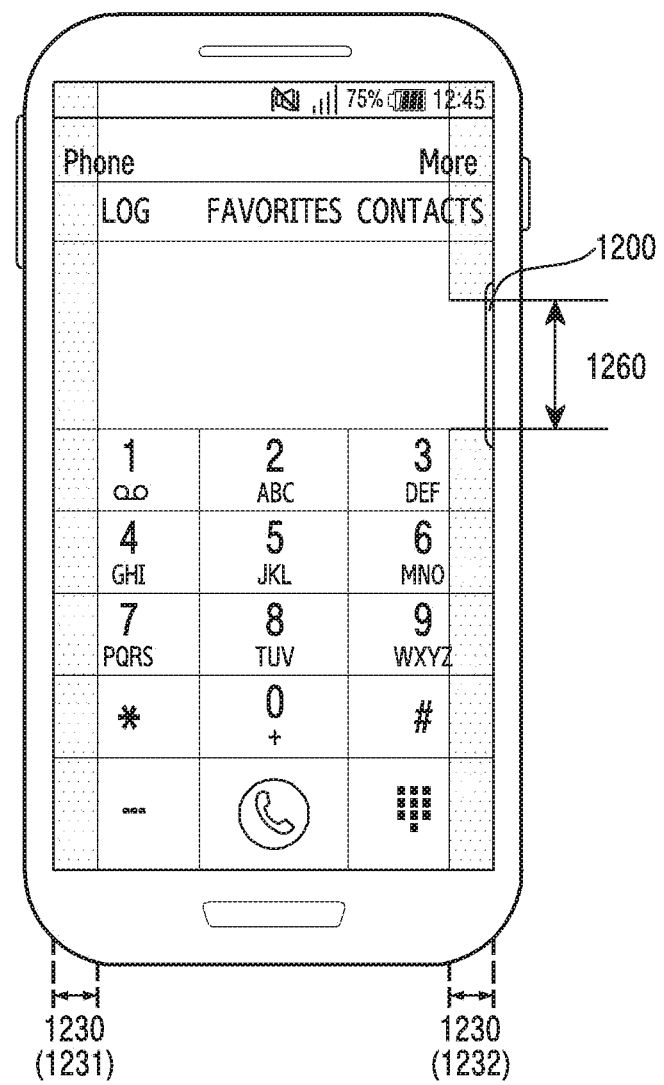

FIGS. 10A, 10B, and 11 illustrate an example of splitting a touch blocking region which makes a touch ineffective or is insensitive, according to a user interface of an application, and FIG. 12 illustrate an example of splitting a touch blocking region according to an edge user interface for an edge region.

According to various embodiments, the electronic device may set various touch blocking regions based on at least one surface of the upper, lower, left, and right side surfaces by using an API in an application, when changing the screen. Alternatively, according to various embodiments, when a touch blocking region is not set in the application, the touch blocking region may be set based on default setting.

Referring to FIG. 10A, the application may split the edge region and may apply at least some regions of the edge region as a touch blocking region, based on a set value corresponding to a user interface. According to an embodiment, the application may split the edge region (for example, a first edge region 1001, a second edge region 1002) into at least one surface such as an upper, lower, left, or right side surface, and may differently set a size of a touch blocking region on each surface. For example, the application may set the first edge region 1001 and the second edge region 1002 as touch blocking regions of different sizes (for example, a width). The application may divide the first edge region 1001 and the second edge region 1002 into an upper end and a lower end with reference to a specific boundary 1050 (for example, a virtual boundary), and may set the edge regions on the upper end and the lower end as touch blocking regions of different sizes. The specific boundary 1050 may be defined as a point for dividing (or splitting) the display region according to a user interface.

As shown in FIG. 10A, the electronic device may set the touch blocking regions based on the first edge region 1001 (for example, a left edge region) and the second edge region 1002 (for example, a right edge region) by default. The electronic device may split the touch blocking regions based on the first edge region 1001 and the second edge region 1002 according to a set value of the application, and may set the touch blocking regions to have different values. According to an embodiment, the electronic device may set, as an exception region, a region where an object (for example, a component) is positioned in the touch blocking region on the left upper end of the first edge region 1001, and may set the other region 1010 except for the exception region as the touch blocking region (for example, a dead zone). The electronic device may set, as the touch blocking region (for example, a dead zone), the entire region 1020 where an object (for example, a component) is not positioned in the touch blocking region on the left lower end of the first edge region 1001. The electronic device may set a region where an object (for example, a component) is positioned in the touch blocking region on the right upper end of the second edge region 1002, as an exception region, and may set the other region 1030 except for the exception region as the touch blocking region (for example, a dead zone). The electronic device may set some region of the touch blocking region on the right lower end of the second edge region 1002 as an exception region (for example, a touch region, an edge zone (insensitive region)), and may set some of the other regions 1040 as the touch blocking region (for example, a dead zone).

Referring to FIG. 10B, the electronic device according to various embodiments may operate at least two applications, simultaneously, based on split windows (or multi windows). Alternatively, the electronic device according to various embodiments may provide a pop-up window (or a mini window) on the full window in the form of pop-up.

According to an embodiment, as shown in example <A> of FIG. 10B, the electronic device may provide a first application (for example, a contact application, etc.) through a first split window 1060, and may provide a second application (for example, a web browser application, etc.) through a second split window 1070. In various embodiments, with respect to the plurality of split windows, touch blocking regions may be set based on a first edge region 1011 (for example, a left edge region) and a second edge region 1012 (for example, a right edge region). The electronic device may set the touch blocking regions by the first edge region 1011 and the second edge region 1012 in the first split window 1060 to have different values according to a set value of the first application. The electronic device may set the touch blocking regions by the first edge region 1011 and the second edge region 1012 in the second split window 1070 to have different values according to a set value of the second application. According to various embodiments, the electronic device may set the touch blocking regions by the first edge region 1011 and the second edge region 1012 in the first split window 1060 and the second split window 1070 to have different values according to respective user interfaces corresponding to the first application and the second application, as shown in the example of FIG. 10B described above.

According to an embodiment, as shown in example <B> of FIG. 10B, the electronic device may provide a third application (for example, a standby screen, a home screen, an application screen, etc.) through the full window 1090, and may provide a fourth application (for example, a call application, etc.) on a certain region of the full window 1090 through a pop-up window 1080 in the form of pop-up. In various embodiments, in the split windows 1080, 1090, the touch blocking regions by the first edge region 1011 and the second edge region 1012 may be set to have different values independently or by interworking with each other. According to an embodiment, as described above with reference to FIGS. 10A and 10B, the electronic device may set the touch blocking regions by the first edge region 1011 and the second edge region 1012 in the respective windows to have different values, according to set values of the respective applications (for example, the third application, the fourth application) of the pop-up window 1080 and the full window 1090. According to various embodiments, as shown in the examples of FIGS. 10A and 10B described above, the electronic device may set the touch blocking regions by the first edge region 1011 and the second edge region 1012 in the pop-up window 1080 and the full window 1090 to have different values, according to respective user interfaces corresponding to the third application and the fourth application.

Referring to FIG. 11, the electronic device may set a part of a touch blocking region as an exception region, based on a component configuring a user interface, or may further extend the touch blocking region.

As shown in FIG. 11, the electronic device may recognize a component (for example, a view, a window, etc.) (for example, a region where an object 1110 is positioned) positioned on an edge region, and may set a touch blocking region (for example, a dead zone) according to the component positioned on the edge region or may set the region in the touch blocking region where the component is positioned as an exception region (for example, a touch region, an insensitive region). For example, the electronic device may remove the region where the component is positioned from the touch blocking region, and may change the corresponding region to a touch-enabled region. According to various embodiments, even when the component is positioned on the touch blocking region, the electronic device may set the position of the component as the touch blocking region or as the exception region, according to whether the component is touchable on the corresponding position. In various embodiments, the electronic device may determine the position of the component, such as a view, a window, etc., configuring the application, and may determine whether the component is touchable, and may change settings of the touch blocking region variously. According to an embodiment, it may be determined whether a touch is enabled by the component, based on whether there is an address linked by the component, or whether the component corresponds to a simply displayed object. Various embodiments are possible.

Referring to FIG. 12, FIG. 12 illustrates an example of setting a touch blocking region based on an edge user interface for an edge region 1230. As shown in FIG. 12, the electronic device may process at least part 1260 of a touch blocking region (for example, a dead zone), separately set in an application, not to operate as the touch blocking region through the API. For example, the electronic device may set a part (for example, a region where an edge handler 1200 is positioned) of the touch blocking region as the exception region (for example, a touch region, an insensitive region) by an edge application. According to an embodiment, the edge application may be operated by the edge handler 1200, and to achieve this, a touch should be effective on the edge handler 1200. Accordingly, the edge application may set the touch blocking region, except for the region 1260 corresponding to the size of the edge handler 1200 in a second edge region 1232 assigned the edge handler 1200 from among edge regions 1230 (for example, a first edge region 1231, the second edge region 1232). For example, the electronic device may process the region 1260 where the edge handler 1200 is positioned not to operate as the touch blocking region.

Figure 13:
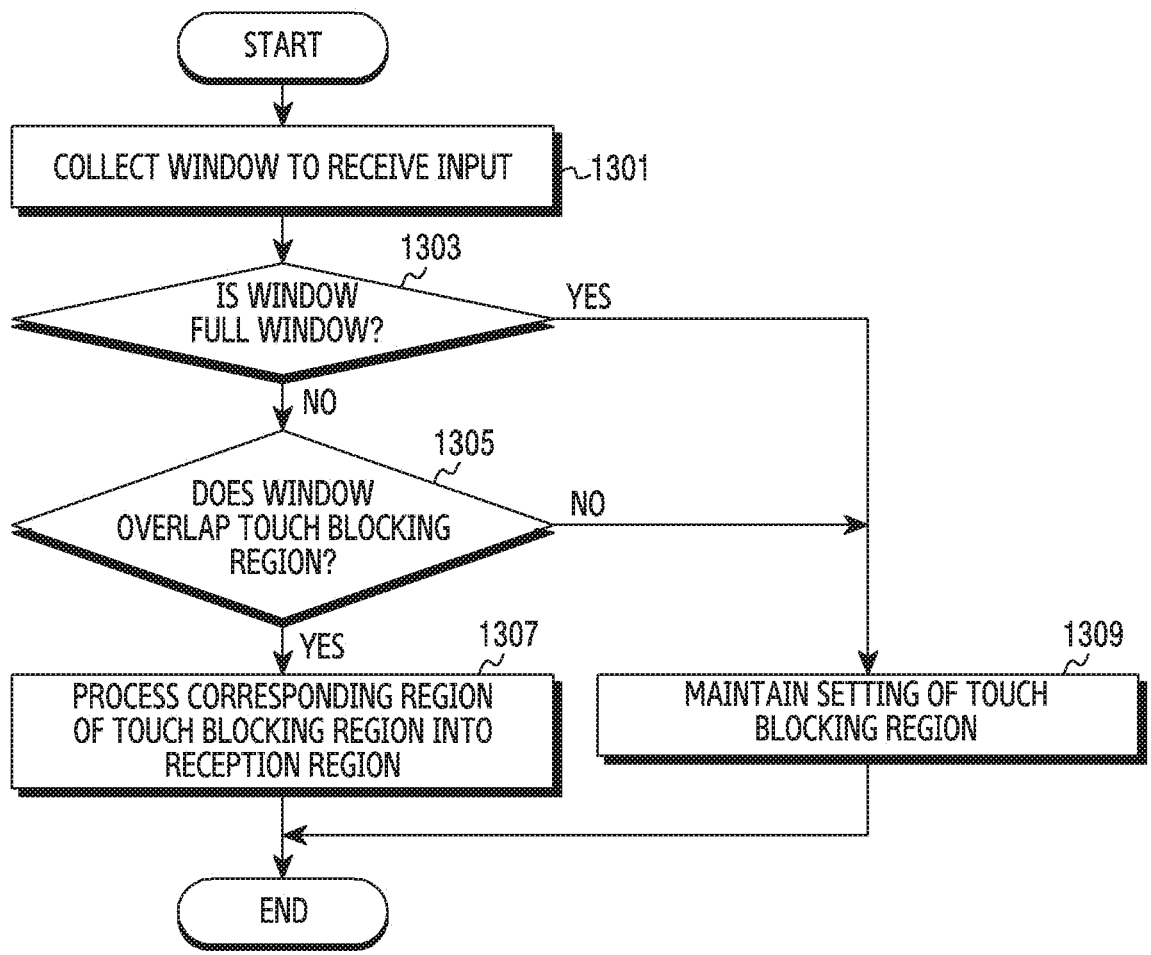
FIG. 13 is a flowchart illustrating an operation of setting an exception region in a touch blocking region based on a window in an electronic device according to various embodiments of the present disclosure.

FIG. 13 is a flowchart illustrating an operation of setting a touch blocking region in an electronic device according to various embodiments.

As shown in FIG. 13, FIG. 13 may illustrate an example of an operation of adding an exception region to a touch blocking region based on a component (for example, a window) of an application according to various embodiments.

Referring to FIG. 13, in operation 1301, the processor 210 of the electronic device may collect a window to receive an input. For example, the processor 210 may determine a window enabling a touch input in a displayed user interface. According to an embodiment, the processor 210 may determine a window capable of receiving a touch input from among one or more windows configurating a user interface of an application.

In operation 1301, the processor 210 may determine whether the collected window corresponds to a full window (for example, a full screen window).

When it is determined that the collected window corresponds to the full window in operation 1301 (Yes in operation 1303), the processor 210 may maintain setting of a touch blocking region in operation 1309. For example, the processor 210 may not set an exception region in the touch blocking region.

When it is determined that the collected window does not correspond to the full window in operation 1301 (No in operation 1303), the processor 210 may determine whether the collected window overlaps a touch blocking region in operation 1305. For example, the processor 210 may determine whether the collected window is positioned on the touch blocking region of the edge region that is set to make a touch ineffective.

When it is determined that the collected window does not overlap the touch blocking region in operation 1305 (No in operation 1305), the processor 210 may maintain setting of the touch blocking region in operation 1309. For example, the processor 210 may not set an exception region in the touch blocking region.

When it is determined that the collected window overlaps the touch blocking region in operation 1305 (Yes in operation 1305), the processor 210 may process at least some region of the touch blocking region that corresponds to the collected window into an exception region. For example, the processor 210 may change a touch blocking region that corresponds to a position (and a size) of the collected window, in the touch blocking region of the edge region set to make a touch ineffective, to a touch-enabled region (for example, a touch region, an insensitive region). An example of this operation is illustrated in FIG. 14.

According to various embodiments, when a component (for example, a window) configurating an application is not displayed on the full screen window, is able to receive a touch, and overlaps the edge region (for example, the touch blocking region of the edge region) as described above with reference to FIG. 13, the touch blocking region of a corresponding region where the window is positioned may be processed not to operate, for example, may be processed to operate as a touch region. This may be automatically processed in a framework of the electronic device.

In various embodiments, operations 1301, 1303, and 1305 are not limited to the above-described sequence (or order), and operations 1301, 1303, and 1305 may be performed serially or in parallel, or may be performed in a different order. For example, operations may be performed in various orders, such as an order of operations 1301, 1305, and 1303.

Figure 14:
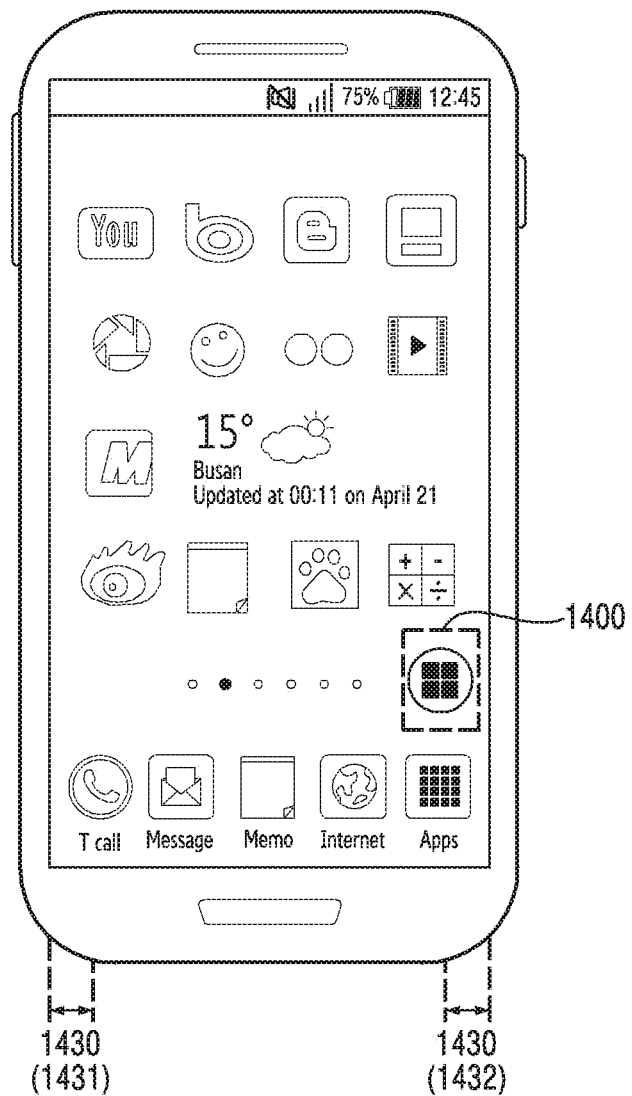
FIG. 14 is a view illustrating an operation of setting an exception region in a touch blocking region based on a window in an electronic device according to various embodiments of the present disclosure.

FIG. 14 is a view to illustrate an operation of setting a touch blocking region in an electronic device according to various embodiments of the present disclosure.

Referring to FIG. 14, the electronic device may collect an independent window 1400 rather than a full window (for example, a window configuring a home screen). In various embodiments, the independent window 1400 may include a window of a different layer (for example, a window configurating a function or application icon) which is independent from the full screen window (for example, the window configuring the home screen) in FIG. 14.

The electronic device may determine whether a touch is enabled by the independent window 1400. For example, the electronic device may determine whether it is possible to receive a touch input through the independent window 1400. The electronic device may determine whether the collected independent window 1400 overlaps a touch blocking region set in an edge region 1430 (for example, a first edge region 1431, a second edge region 1432).

According to various embodiments, when the collected window 1400 is the full screen window, is not able to receive a touch input, or does not overlap the touch blocking region, the electronic device may maintain setting of the touch blocking region.

According to various embodiments, when the collected window 1400 is not the full screen window, is able to receive a touch input, and overlaps the touch blocking region, the electronic device may exclude the corresponding region (for example, a region corresponding to a position and a size of the window 1400 or a larger region) from the touch blocking region. For example, the electronic device may process the corresponding region where the collected window 1400 is positioned into an exception region not to operate as the touch blocking region.

Figure 15:
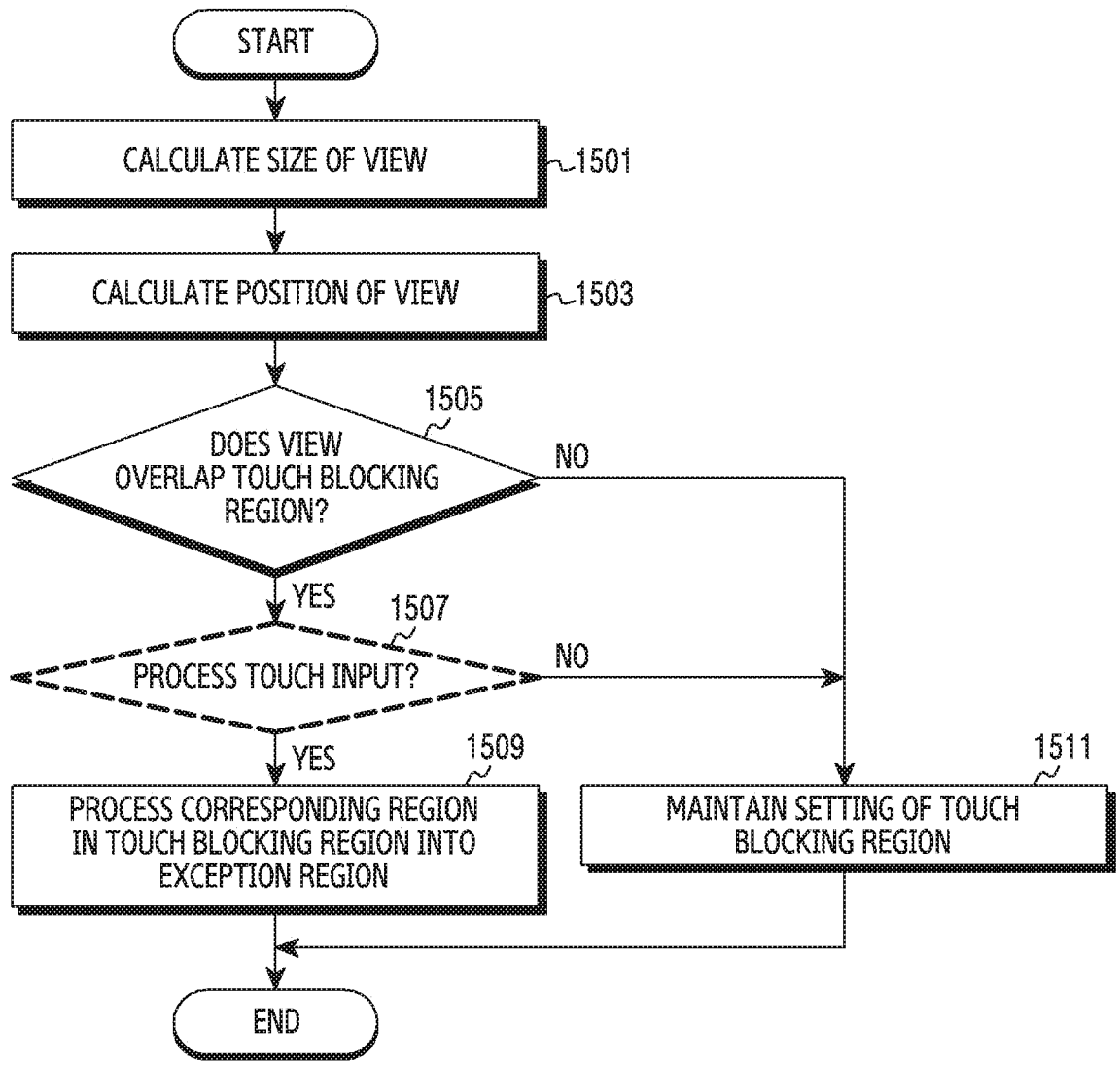
FIG. 15 is a flowchart illustrating an operation of setting an exception region in a touch blocking region based on a view in an electronic device according to various embodiments of the present disclosure.

FIG. 15 is a flowchart illustrating an operation of processing a touch blocking region as an exception region in an electronic device according to various embodiments of the present disclosure.

As shown in FIG. 15, FIG. 15 may illustrate an example of an operation of adding an exception region with respect to a touch blocking region, based on a component (for example, a view) of an application according to various embodiments.

Referring to FIG. 15, in operation 1501, the processor 210 of the electronic device may calculate a size of a view. For example, the processor 210 may calculate respective sizes of one or more views configuring a user interface of an application. According to an embodiment, the processor 210 may determine whether the size of the view is a full screen view or a view of a predetermined size (or a predetermined region). According to an embodiment, when the view is the full screen view, the processor 210 may maintain setting of the touch blocking region. For example, the processor 210 may not set an exception region in the touch blocking region.

In operation 1503, the processor 210 may calculate a position of the view. For example, the processor 210 may determine the position of a view of a predetermined size rather than the full screen view.

In operation 1505, the processor 210 may determine whether the position of the view overlaps the touch blocking region. For example, the processor 210 may determine whether the view is positioned on the touch blocking region which is set to make a touch ineffective in the edge region.

When it is determined that the position of the view does not overlap the touch blocking region in operation 1505 (No in operation 1505), the processor 210 may maintain the setting of the touch blocking region in operation 1511. For example, the processor 210 may not set an exception region in the touch blocking region.

When it is determined that the position of the view overlaps the touch blocking region in operation 1505 (Yes in operation 1505), the processor 210 may determine whether the view is a view processing a touch input in operation 1507. For example, the processor 210 may determine whether the corresponding view is a touch input-enabled view, for example, a view capable of receiving a touch input. In various embodiments, operation 1507 may not be performed. For example, the view is normally able to process a touch input. Accordingly, when it is assumed that the view is a view for a touch input, operation 1507 may be omitted.

When it is determined that the view is not the view processing the touch input in operation 1507 (No in operation 1507), the processor 210 may maintain the setting of the touch blocking region in operation 1511. For example, the processor 210 may not set an exception region in the touch blocking region.

When it is determined that the view is the view processing the touch input in operation 1507 (Yes in operation 1507), the processor 210 may process a region in the touch blocking region that corresponds to the view into an exception region. For example, the processor 210 may change a touch blocking region corresponding to the position and the size of the view, in the touch blocking region set to make a touch ineffective in the edge region, to a touch-enabled region (for example, a touch region). An example of this operation is illustrated in FIG. 16.

According to various embodiments, when the component (for example, a view) configuring the application is not the full screen view, is able to receive a touch input, and overlaps the edge region (for example, the touch blocking region of the edge region) as shown in FIG. 15, the electronic device may process the touch blocking region of the corresponding region where the view is positioned not to operate, for example, to operate as a touch region. This may be automatically processed in a framework of the electronic device.

In various embodiments, operations 1501, 1503, 1505, and 1507 are not limited to the above-described sequence (or order), and operations 1501, 1503, 1505, and 1507 may be performed serially or in parallel, or may be performed in a different order. For example, a view for processing a touch input may be determined from among views positioned on the touch blocking region, and an exception region may be processed.

Figure 16:
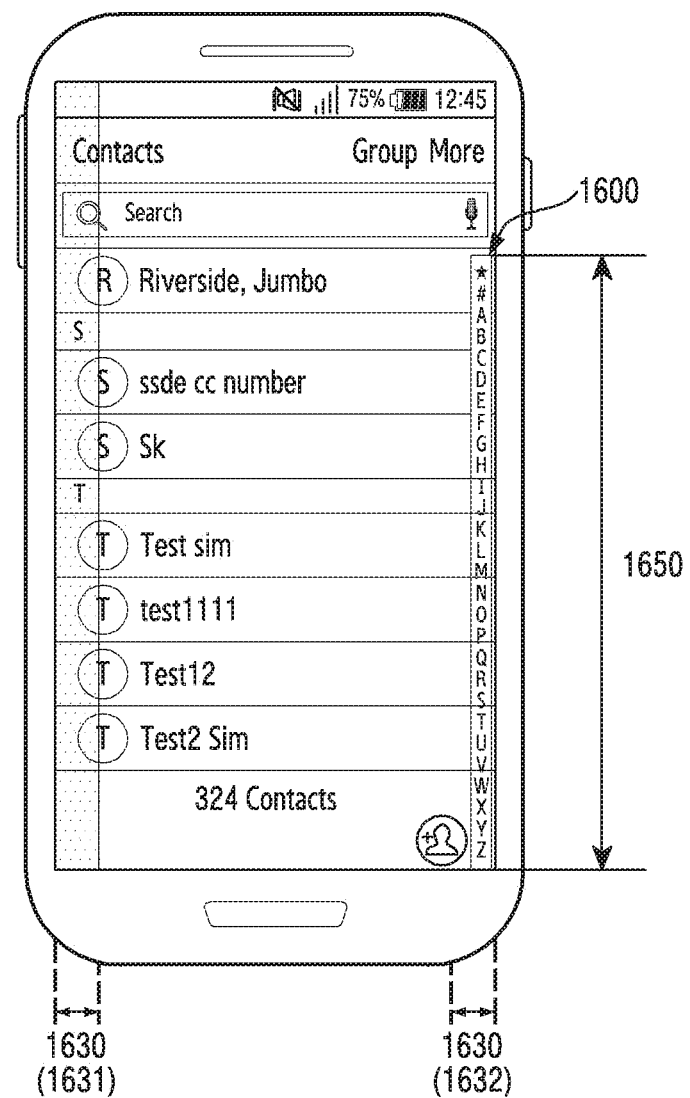
FIG. 16 is a view illustrating an operation of setting an exception region in a touch blocking region based on a view in an electronic device according to various embodiments of the present disclosure.

FIG. 16 is a view to illustrate an operation of setting a touch blocking region in an electronic device according to various embodiments of the present disclosure.

Referring to FIG. 16, the electronic device may extract a view 1600 configuring an application. In various embodiments, the electronic device may extract a touch-enabled view from among views configuring the application.

The electronic device may calculate a size (for example, a length 1650) and a position of the view 1600. When the size of the view 1600 is calculated and the position of the view is calculated, the electronic device may determine whether the view 1600 overlaps a touch blocking region set in an edge region 1630 (for example, a first edge region 1631, a second edge region 1632), based on a result of calculating. In the example of FIG. 16, the view 1600 overlaps the touch blocking region of the second edge region 1632.

According to various embodiments, when the view 1600 is not able to receive a touch input or does not overlap the touch blocking region, the electronic device may maintain setting of the touch blocking region.

According to various embodiments, when the view 1600 is able to receive a touch input and overlaps the touch blocking region, the electronic device may exclude the corresponding region (for example, a region corresponding to the position and the size of the view 1600, or a larger region) from the touch blocking region. For example, the electronic device may process the corresponding region where the view 1600 is positioned into an exception region not to operate as the touch blocking region.

According to various embodiments, when the touch blocking region is set by the application as described above with reference to FIGS. 13, 14, 15, and 16, at least some region (for example, a region corresponding to a position and a size of a window able to receive a touch input) of the touch blocking region may be processed into an exception region, based on the window of the application. According to various embodiments, when the touch blocking region is not set by the application, at least some region (for example, a region corresponding to a position and a size of a view able to receive a touch input) of the touch blocking region may be processed into an exception region, based on a view system of the application.

According to various embodiments as described above, when a component such as a view or a window configuring an application receives a touch input, and is positioned on the touch blocking region set in the edge region, the electronic device may automatically process the touch blocking region (for example, a dead zone) corresponding to the component in the touch blocking region not to operate through a framework.

Figure 17:
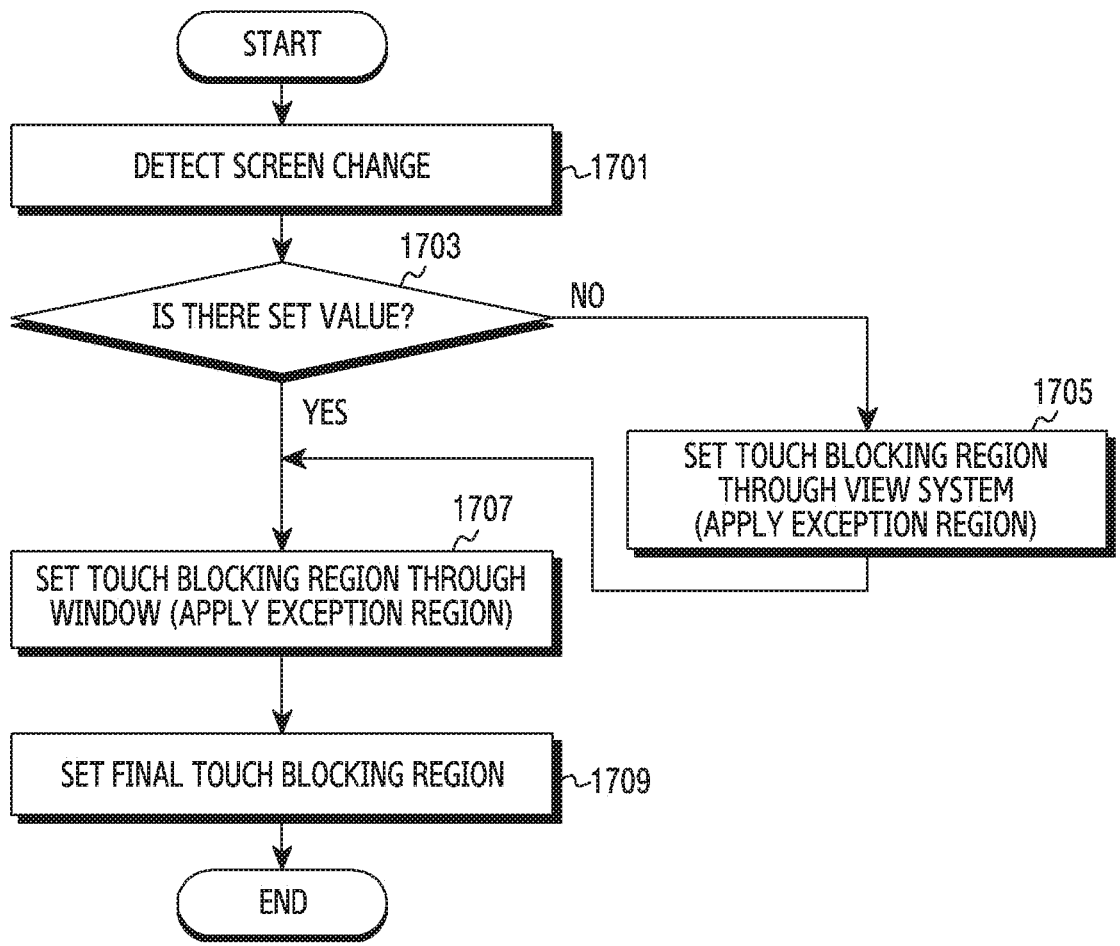
FIG. 17 is a flowchart illustrating an operation method of setting a touch blocking region in an electronic device according to various embodiments of the present disclosure.

FIG. 17 is a flowchart illustrating an operation method of setting a touch blocking region in an electronic device according to various embodiments of the present disclosure.

Referring to FIG. 17, in operation 1701, the processor 210 of the electronic device may detect a screen change. For example, the processor 210 may detect a change (for example, a surface change) of the screen displayed on the display 260. The screen change may include a change of a currently displayed screen due to, for example, execution of an application, a change of an application (for example, a hierarchical change), a page change or a scroll. According to various embodiments, the screen change may include a change of a position of an object of a user interface.

In operation 1703, the processor 210 may determine whether there is a value set in relation to an edge region in an application in response to the screen change being detected. For example, the processor 210 may determine whether there is a value set to allow at least one edge region of upper, lower, left, or right edges to operate as a touch blocking region. According to an embodiment, the processor 210 may determine whether there is a touch blocking region set in a window on the uppermost end of the Z-order.

When there is no value set by the application (for example, a window on the uppermost end) in operation 1703 (No in operation 1703), the processor 210 may set a touch blocking region through a view system in operation 1705. According to an embodiment, the processor 210 may remove at least some region corresponding to the position and the size of the view in the touch blocking region from the touch blocking region as described above. For example, the processor 210 may set the touch blocking region where the view is positioned as an exception region not to operate as the touch blocking region. According to various embodiments, when the touch blocking region is set (for example, the exception region is applied) through the view system of operation 1703, the processor 210 may proceed to operation 1707, and may set a touch blocking region (for example, apply an exception region) through the window in operation 1707.

When there is a value set by the application (for example, the window on the uppermost end) in operation 1703 (Yes in operation 1703), the processor 210 may set a touch blocking region through the window in operation 1707. According to an embodiment, the processor 210 may remove at least some region corresponding to the position and the size of the window in the touch blocking region from the touch blocking region as described above. For example, the processor 210 may set the touch blocking region where the window is positioned as an exception region not to operate as the touch blocking region.

In operation 1709, the processor 210 may set a final touch blocking region based on results of processing in operation 1705 or 1707. For example, the processor 210 may set the final touch blocking region based on the remaining region obtained by removing the exception region from the value or the default value set for the touch blocking region.

Figure 18:
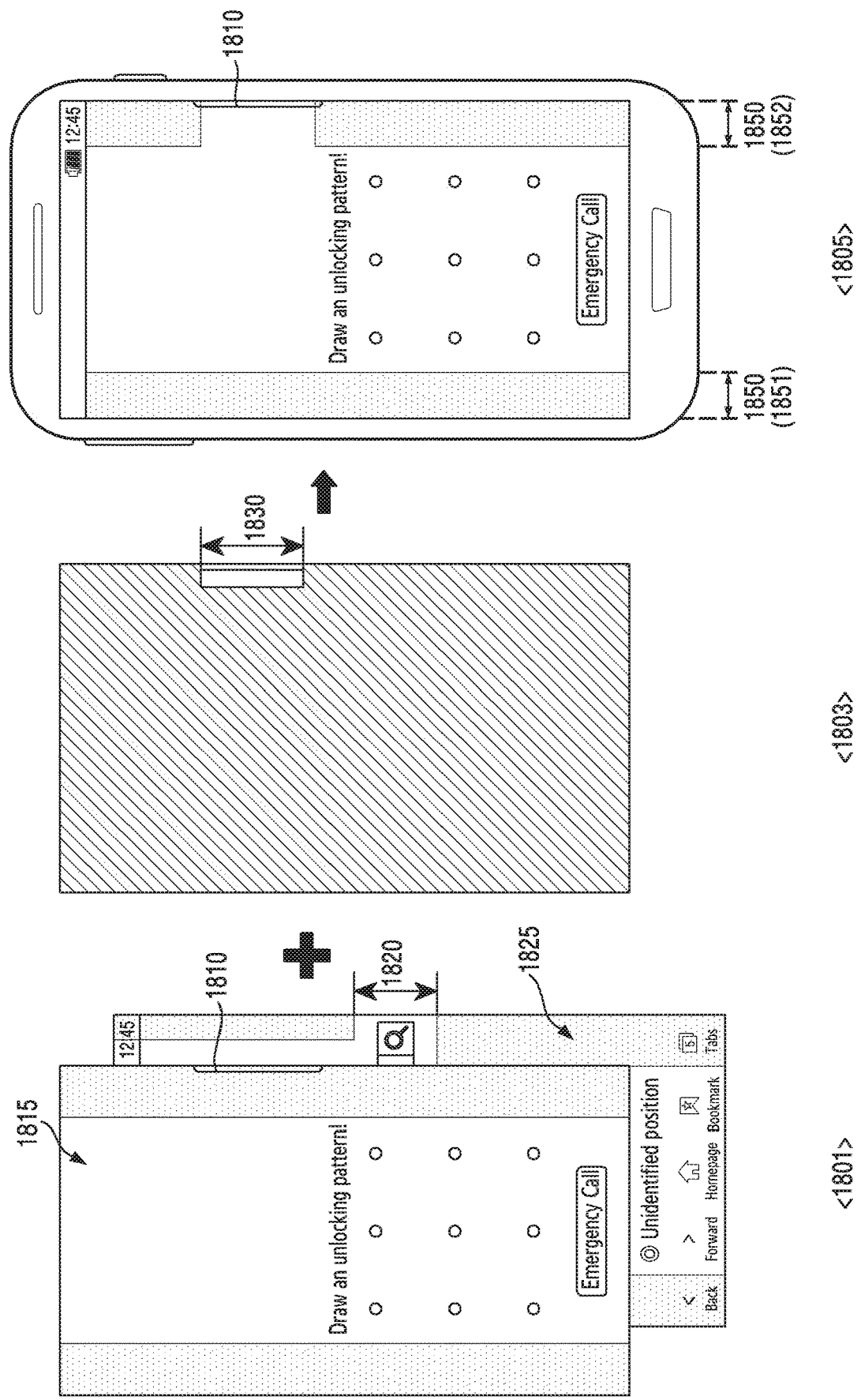
FIG. 18 is a view illustrating an operation of setting a touch blocking region in an electronic device according to various embodiments of the present disclosure.

FIG. 18 is a view to illustrate an operation of setting a touch blocking region in an electronic device according to various embodiments of the present disclosure.

Referring to FIG. 18, FIG. 18 illustrates an example of structurally processing a touch blocking region based on each item of an application and an edge user interface.

As shown in example <1801> of FIG. 18, the electronic device may provide a plurality of windows 1815, 1825 while overlapping the same in a hierarchical structure according to the Z-order. For example, a first window 1815 may be a window on an uppermost end, and a second window 1825 may exit under the first window 1815 according to the Z-order. The first window 1815 and the second window 1825 may overlap each other in part or entirely, or may not overlap each other. For example, when the first window 1815 and the second window 1825 are independent mini windows rather than the full screen windows, the first window 1815 and the second window 1825 may not overlap each other. The Z-order of the independent mini windows may be determined according execution or setting.

According to various embodiments, an exception region may be set in a touch blocking region according to each application according to the Z-order. For example, in the case of the first window 1815, an exception region may be set based on an edge handler 1810 of the touch blocking region. In the case of the second window 1825, an exception region may be set based on a view (or window) 1820 of the touch blocking region. According to various embodiments, an exception region may be processed from the touch blocking region based on at least one of the window or the view of the application as described above with reference to FIG. 17.

As shown in example <1803> of FIG. 18, the electronic device may process an exception region in a touch blocking region by the API. For example, the electronic device may apply some region 1830 (for example, an edge handler region) of the touch blocking region as an exception region, based on the API. According to various embodiments, when a touch should be effective in at least some region 1830 (for example, a region where the edge handler 1810 is positioned in the second edge region 1852) of the edge region 1850 (for example, the first edge region 1851, the second edge region 1852), the electronic device may process the touch blocking region not to operate in some region 1830 through the API.

As shown in example <1805> of FIG. 18, based on the exception region processed in examples <1801> and <1803>, for example, based on the set value or the default value, a final touch blocking region obtained by removing the exception region (for example, the region corresponding to the edge handler 1810 in the second edge region 1852) from the touch blocking region of the edge region 1850 (for example, the first edge region 1851, the second edge region 1852) may be provided. For example, as shown in example <1805>, the electronic device may provide the region of the edge handler 1810 in the touch blocking region of the edge region 1850 not to operate as the touch blocking region, that is, provide as a touch-enabled touch region.

Figure 19:
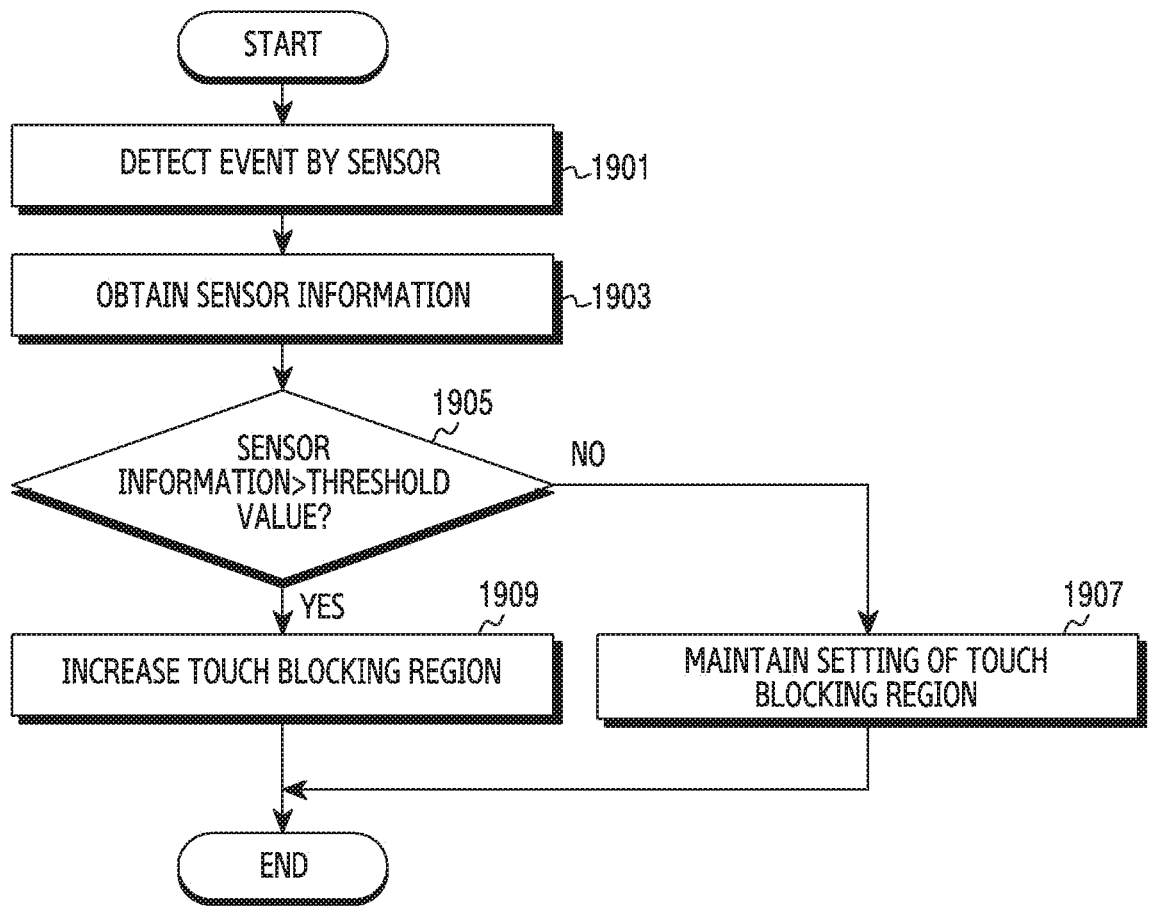
FIG. 19 is a flowchart illustrating an operation method of using sensing information of an electronic device according to various embodiments of the present disclosure.

FIG. 19 is a flowchart illustrating an operation method of using sensing information of an electronic device according to various embodiments of the present disclosure.

Referring to FIG. 19, in operation 1901, the processor 210 of the electronic device may detect an event by a sensor. According to an embodiment, the processor 210 may detect occurrence of an acceleration sensor event based on an acceleration sensor. According to an embodiment, the processor 210 may detect occurrence of a pressure sensor event based on a pressure sensor.

In operation 1903, the processor 210 may obtain sensor information. According to an embodiment, the processor 210 may obtain sensor information (for example, tilt information) sensed from the acceleration sensor. According to an embodiment, the processor 210 may obtain sensor information (for example, pressure information) sensed from the pressure sensor. According to an embodiment, the processor 210 may obtain first sensor information sensed from the acceleration sensor and second sensor information sensed from the pressure sensor.

In operation 1905, the processor 210 may compare the sensor information and a predetermined threshold value. According to an embodiment, the processor 210 may determine whether the tilt information exceeds a specific threshold value. According to an embodiment, the processor 210 may determine whether the pressure information exceeds a specific threshold value.

When it is determined that the sensor information does not exceed the threshold value in operation 1905 (No in operation 1905), the processor 210 may maintain setting of a touch blocking region in operation 1907.

When it is determined that the sensor information exceeds the threshold value in operation 1905 (Yes in operation 1905), the processor 210 may increase (or extend) the touch blocking region. An example of these operations is illustrated in FIG. 20.

Figure 20:
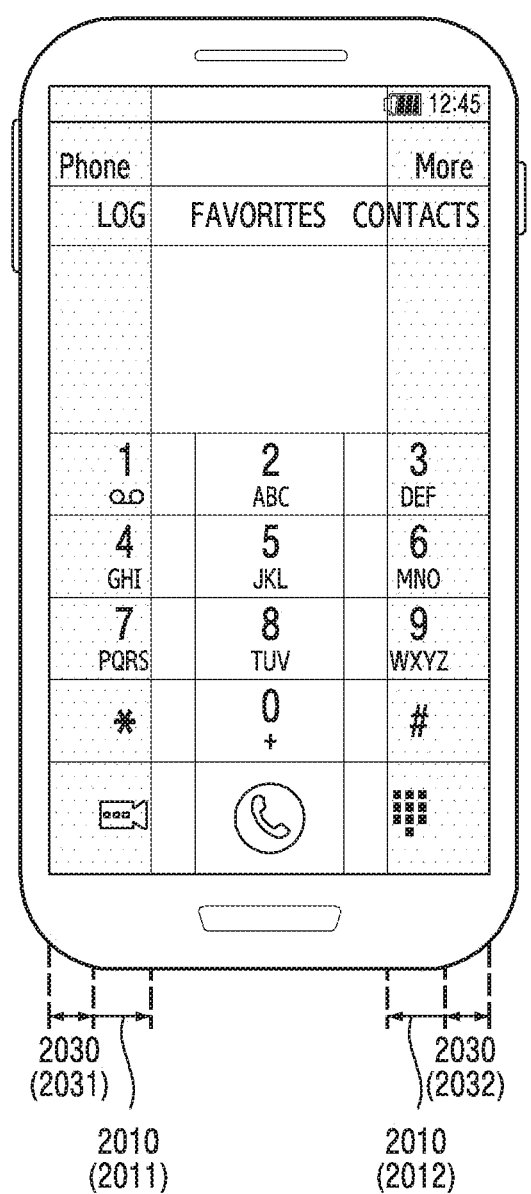
FIG. 20 is a view illustrating an example of setting a touch blocking region based on sensor information in an electronic device according to various embodiments of the present disclosure.

FIG. 20 is a view illustrating an example of setting a touch blocking region based on sensor information in an electronic device according to various embodiments of the present disclosure.

As shown in FIG. 20, FIG. 20 may illustrate an example of a state in which a touch blocking region of an edge region 2030 (for example, a first edge region 2031, a second edge region 2032) set in the electronic device as default increases by a predetermined size 2010 (for example, a first predetermined size 2011, a second predetermined size 2012). According to various embodiments, the predetermined size 2010 for increasing may vary (for example, may be further extended or reduced) based on the sensor information.

According to various embodiments, the predetermined size 2010 for increasing may increase only a certain surface (for example, the first edge region 2031 or the second edge region 2032) of the edge region 2030, or may increase all surfaces (for example, the first edge region 2031 and the second edge region 2032), according to a grip state (for example, a grip area, gripping by the left hand, gripping by the right hand, etc.) of the electronic device. According to an embodiment, the electronic device may increase the touch blocking region on the first edge region 2031 by the first predetermined size 2011, and may increase the touch blocking region on the second edge region 2032 by the second predetermined size 2012. In various embodiments, the first predetermined size 2011 and the second predetermined size 2012 may be set to the same size or different sizes.

When the user uses the electronic device while lying (for example, with the display (or screen) facing downward (for example, in the gravity direction)), the user may use a stronger force and may grip more regions than when the user normally grips the electronic device. Accordingly, in various embodiments, a user's situation may be recognized based on various sensors (for example, the acceleration sensor or the pressure sensor), and the touch blocking region may be changed according to the user situation.

According to an embodiment, in response to the acceleration sensor event by the acceleration sensor, a tilt may be calculated based on a tilt calculation method as shown in Equations 1 and 2 presented below. For example, Equation 1 may indicate a vector sum along three acceleration axes, and Equation 2 may indicate a tilt angle through calculation with the Z-axis. According to various embodiments, when the calculated tilt value exceeds a specific threshold value, the electronic device may determine that the user is lying, and may increase (extend) the touch blocking region. For example, the electronic device may determine a grip state based on the acceleration sensor, and, when it is determined that the user is lying based on the grip state, the electronic device may increase the touch blocking region.

Magnitude=x2+y2+z2　　　　Equation 1

Tilt Angle(Radius)=sin−1ZMagnitude　　　　Equation 2

According to an embodiment, the electronic device may include the pressure sensor in the edge region, and may determine an intensity of a user's grip based on the pressure sensor. According to various embodiments, when the determined intensity of the grip exceeds a specific threshold value, the touch blocking region may be increased (extended). For example, when the intensity of the grip is high, there is a high possibility that malfunction is caused by a touch stretched to the display (or screen). Accordingly, in various embodiments, the electronic device may determine the intensity of the grip based on the pressure sensor, and, when the intensity of the grip exceeds a specific threshold value, the electronic device may increase the touch blocking region.

Figure 21:
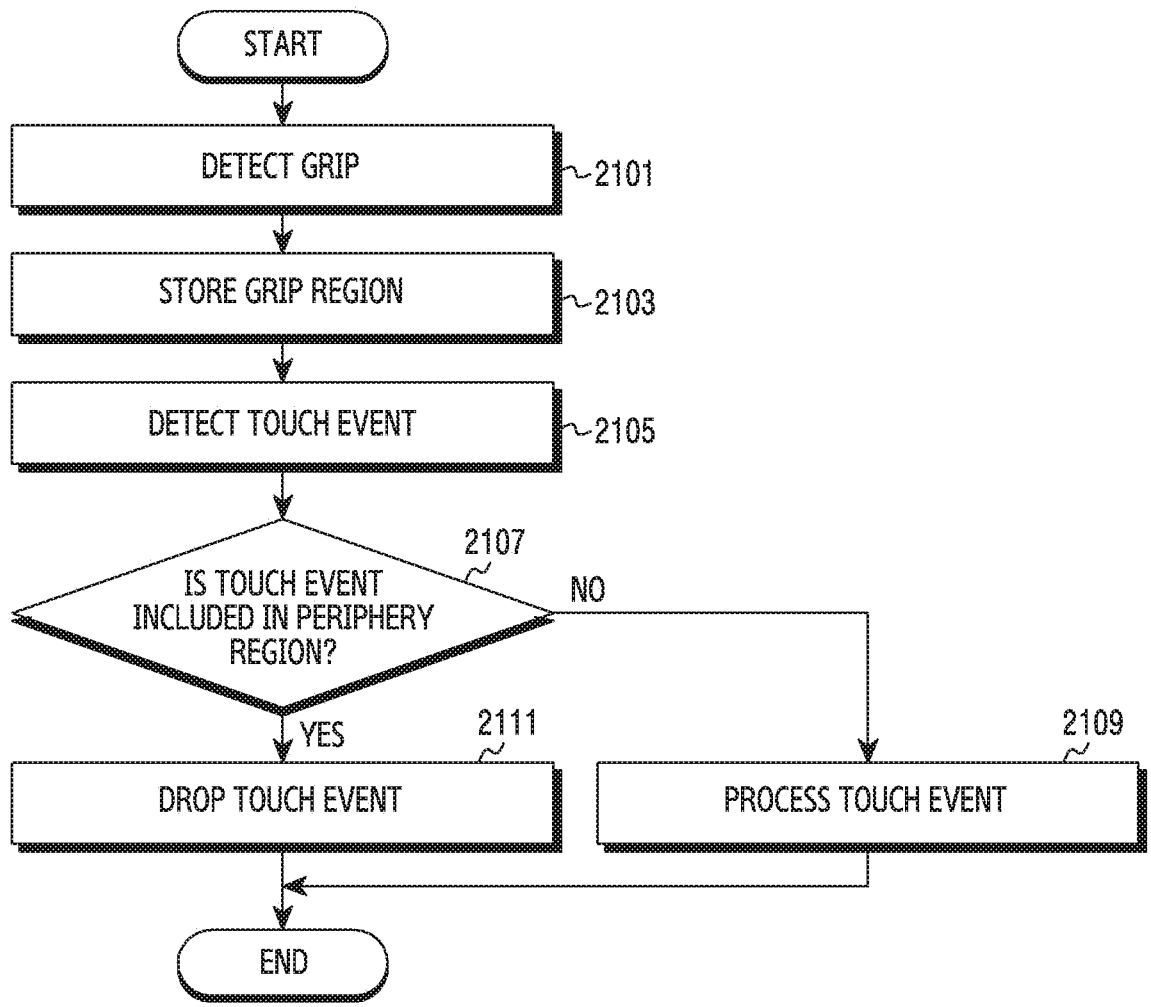
FIG. 21 is a view illustrating an operation method of using sensor information in an electronic device according to various embodiments of the present disclosure.

FIG. 21 is a view illustrating an operation method of using sensor information in an electronic device according to various embodiments of the present disclosure.

Referring to FIG. 21, in operation 2101, the processor 210 of the electronic device may detect a state in which the user grips the electronic device. According to various embodiments, the grip state may be detected by analyzing a touched area based on various sensors (for example, the grip sensor, the pressure sensor, etc.).

Figure 22:
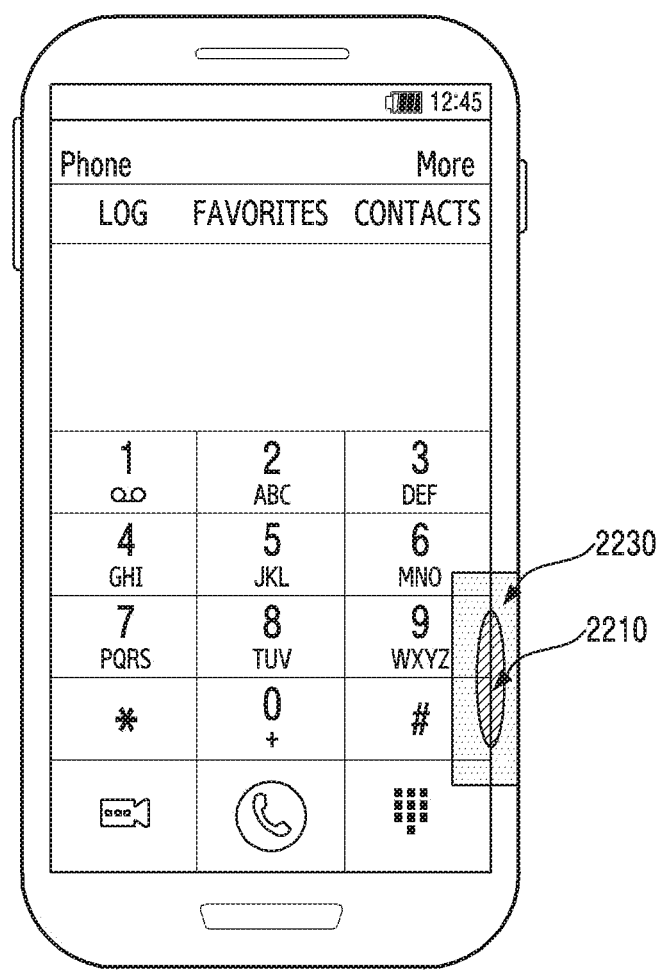
FIG. 22 is a view illustrating an example of setting a touch blocking region based on a grip region in an electronic device according to various embodiments of the present disclosure.

In operation 2103, the processor 210 may store a grip region in response to the grip state being detected. For example, the processor 210 may store a position (for example, a coordinate region) where the grip occurs (for example, a touched region). According to various embodiments, when storing the grip region, the processor 210 may also set a periphery region of a predetermined range with reference to an outer edge of the grip region. In various embodiments, the grip region may correspond to a touch blocking region, and the periphery region may be an increased region of the touch blocking region. According to various embodiments, examples of the grip region and the periphery region are illustrated in FIG. 22.

In operation 2105, the processor 210 may detect a touch event. For example, the processor 210 may detect another additional touch event after detecting the grip state.

In operation 2107, the processor 210 may determine whether a touch region according to the touch event is included in the periphery region of the grip region in response to the touch event being detected. For example, the processor 210 may determine whether the touch region according to the touch event is included in the periphery region or is outside the periphery region.

When the touch region of the touch event is not included in the periphery region in operation 2107 (No in operation 2107), for example, when it is determined that a region other than the periphery region is touched, the processor 210 may process the touch event in operation 2109. For example, the processor 210 may control a relevant function in response to the touch event.

When the touch region of the touch event is included in the periphery region in operation 2107 (Yes in operation 2107), the processor 210 may drop the touch event in operation 2111. For example, when the touch region according to the touch event is included in the periphery region, the processor 260 may determine that an additional input occurs due to a change of the corresponding grip state. Accordingly, the processor 260 may determine the additional input as a touch event by the touch blocking region, and may not process the corresponding touch event.

FIG. 22 is a view illustrating an example of setting a touch blocking region based on a grip region in an electronic device according to various embodiments of the present disclosure.

As shown in FIG. 22, FIG. 22 is a view to illustrate an example of dropping a touch on the periphery region of the grip area when the grip occurs.

Referring to FIG. 22, according to various embodiment, a predetermined periphery region 2230 may be set to operate as a touch blocking region with reference to a grip region 2210. For example, when a touch sensor is in an edge region (or a side surface of the electronic device) of the electronic device, a touch may always occur when the electronic device is gripped. In addition, a touch noise may occur on the periphery of the grip region 2210 where the grip occurs, due to an operation of gripping the electronic device on the palm.

In various embodiments, when the grip is recognized and then an additional touch event occurs, it may be determined whether coordinates according to the touch event are included in the periphery region 2230 set based on the grip region 2210 recognized as a grip. In various embodiments, when the coordinates according to the touch event are included in the periphery region 2230, the corresponding touch events may be all blocked. For example, the periphery region 2230 may be set to operate as the touch blocking region.

As described above, an operation method of an electronic device according to various embodiments may include: setting a touch blocking region in an edge region of a display; determining an exception region in the touch blocking region, based on a user interface; setting a final touch blocking region by removing the determined exception region from the touch blocking region; and processing a touch event on the edge region, based on the final touch blocking region.

According to various embodiments, the touch blocking region may be a region that operates in the edge region and may not process a touch event.

According to various embodiments, determining the exception region may include: in response to a screen change, identifying a setting value for a touch blocking region by an application; when the setting value exists, setting the touch blocking region based on the setting information; and when the setting value does not exist, setting the touch blocking region based on a default setting value.

According to various embodiments, determining the exception region may include determining the exception region in the set touch blocking region, based on at least part of a position or a size of a component of the user interface or whether the component is touchable, and According to various embodiments, setting the final touch blocking region may include removing a region set in an edge application for an edge region from the touch blocking region.

According to various embodiments, setting the final touch blocking region may include, when the component receives a touch input and overlaps the touch blocking region of the edge region, processing a region in the touch blocking region that corresponds to the component into the exception region.

According to various embodiments, a touch blocking region may be differently implemented according to each edge region, according to a form of a user interface provided to a plurality of edge regions.

According to various embodiments, the operation method may further include: obtaining sensor information based on a sensor; and, when the sensor information exceeds a threshold value, increasing a range of the touch blocking region.

According to various embodiments, when the electronic device detects a touch event while being gripped, the electronic device may operate a predetermined periphery region with reference to the grip region as a touch blocking region.

According to various embodiment, operating as the touch blocking region may include determining whether the touch event is included in the periphery region; and, when the touch event is included in the periphery region, dropping the touch event by the touch blocking region.

The embodiments disclosed in the present disclosure and the drawings are suggested for easy explanation and understanding of the disclosed technical features, and are not intended to limit the scope of the present disclosure. Therefore, the scope of the present disclosure should be interpreted as including all changes or modified forms derived based on the technical idea of the present disclosure, in addition to the embodiments disclosed herein.

What is claimed is:

1. An electronic device comprising:
   a display configured to display a user interface;
   a memory configured to store instructions; and
   a processor functionally connected to the display and the memory,
   wherein the processor is configured to execute the instructions to:
   execute a plurality of applications,
   based on information set in an application of the plurality of applications, set a touch blocking region in an edge region of the display,
   identify that at least part of a component of the user interface is displayed at a location in the touch blocking region,
   determine an exception region in the touch blocking region based on the location of the at least part of the component of the user interface, wherein the exception region is set in the touch blocking region according to a Z-order position of the application with respect to a Z-order of each of the plurality of applications,
   set a final touch blocking region by removing the exception region from the touch blocking region, and
   based on the setting of the final touch blocking region, control the display to disregard a touch input received through the final touch blocking region, and process a touch input received through the exception region by processing an operation associated with the component.

2. The electronic device of claim 1, wherein the touch blocking region comprises a region that operates in the edge region.

3. The electronic device of claim 1, wherein the processor is further configured to:
   identify whether a setting value for the touch blocking region has been set by the application,
   based on the setting value being set, set the touch blocking region based on the setting value, and
   based on the setting value not being set, set the touch blocking region based on a default setting value.

4. The electronic device of claim 1, wherein the processor is further configured to:
   determine the exception region in the touch blocking region further based on at least part of a size of the component of the user interface or whether the component is touchable; and
   in response to the component receiving a touch input and the component overlapping the touch blocking region, process a region in the touch blocking region that corresponds to the component into the exception region.

5. The electronic device of claim 1, wherein the processor is further configured to remove a region set in an edge application for the edge region from the touch blocking region.

6. The electronic device of claim 1, wherein the processor is further configured to implement a touch blocking region differently according to each edge region based on a form of the user interface provided to a plurality of edge regions of the display.

7. The electronic device of claim 1, wherein the processor is further configured to:
   obtain sensor information based on a sensor, and
   in response to the sensor information exceeding a threshold value, increase a range of the touch blocking region.

8. The electronic device of claim 1, wherein the processor is further configured to:
   in response to the electronic device detecting a touch event in a grip state of the electronic device, operate a predetermined periphery region with reference to a grip region as the touch blocking region,
   determine whether the touch event is included in the predetermined periphery region, and
   in response to the touch event being included in the predetermined periphery region, drop the touch event included in the touch blocking region.

9. The electronic device of claim 1, wherein windows of each of the plurality of applications overlap each other according to the Z-order.

10. An operation method of an electronic device, the operation method comprising:
    executing a plurality of applications;
    based on information set in an application of the plurality of application, setting a touch blocking region in an edge region of a display of the electronic device;
    identifying that at least part of a component of a user interface is displayed at a location in the touch blocking region of the display;
    determining an exception region in the touch blocking region based on the location of the at least part of the component of the user interface, wherein the exception region is set in the touch blocking region according to a Z-order position of the application with respect to a Z-order of each of the plurality of applications;

setting a final touch blocking region by removing the exception region from the touch blocking region; and based on the setting of the final touch blocking region, controlling the display to disregard a touch input received through the final touch blocking region, and process a touch input received through the exception region by processing an operation associated with the component.

11. The operation method of claim 10, wherein the determining of the exception region comprises:

in response to a screen change, identifying whether a setting value for the touch blocking region has been set by the application;

based on the setting value being set, setting the touch blocking region based on the setting value; and based on the setting value not being set, setting the touch blocking region based on a default setting value.

12. The operation method of claim 10, wherein the determining of the exception region comprises determining the exception region in the touch blocking region further based on at least part of a size of the component of the user interface or whether the component is touchable, and wherein the setting of the final touch blocking region comprises, in response to the component receiving a touch input and the component overlapping the touch blocking region, processing a region in the touch blocking region that corresponds to the component into the exception region.

13. The operation method of claim 10, wherein the setting of the final touch blocking region comprises removing a region set in an edge application for the edge region from the touch blocking region.

14. The operation method of claim 10, wherein the touch blocking region is differently implemented according to each edge region based on a form of the user interface provided to a plurality of edge regions of the display.

15. The operation method of claim 10, further comprising:
obtaining sensor information based on a sensor; and
in response to the sensor information exceeding a threshold value, increasing a range of the touch blocking region.

16. The operation method of claim 10, further comprising:
in response to the electronic device detecting a touch event in a grip state of the electronic device, operating a predetermined periphery region with reference to a grip region as the touch blocking region;
determining whether the touch event is included in the predetermined periphery region; and
in response to the touch event being included in the predetermined periphery region, dropping the touch event included in the touch blocking region.

17. The operation method of claim 10,
wherein the touch blocking region comprises a region that operates in the edge region, and
wherein the touch blocking region does not process specific touch events applied thereto.

18. An electronic device comprising:
a display;
a memory configured to store instructions; and
at least one processor operably coupled to the display and the memory,
wherein the processor is configured to execute the instructions to:
based on a first user interface being displayed in the display, identify that a component of the first user interface is displayed in a first portion within a region of the display,
receive a first touch input within a second portion within the region, the at least one second portion being distinct from the first portion, and
in response to the receiving of the first touch input, perform at least one function regarding the component of the first user interface based on the first touch input,
wherein the performing of the at least one function is restricted in response to a second touch input being received within the first portion, and
wherein the at least one function corresponds to at least one function of an application corresponding to the component.

19. The electronic device of claim 18, wherein the instructions, when executed, further cause the at least one processor to:
in a state that the at least one function is performed based on the first touch input, identify a second user interface distinct from the first user interface,
in response to identifying the second user interface, display the second user interface as being at least partially overlapping the first user interface, and
in response to the displaying of the second user interface, adjust the first portion based on the first portion overlapping the second user interface.

20. The electronic device of claim 18, wherein the instructions, when executed, further cause the at least one processor to:
identify that at least one component of the first user interface is disposed within the first portion, and
based on the identifying that the at least one component is disposed within the first portion, adjust the first portion.

21. The electronic device of claim 20, wherein the first portion is adjusted to exclude the at least one component.

* * * * *